United States Patent [19]

Kurita et al.

[11] Patent Number: 5,587,798
[45] Date of Patent: Dec. 24, 1996

[54] ENCODING AND DECODING METHODS FOR USE IN FACSIMILE

[75] Inventors: Kazuo Kurita, Nagano; Mikio Mizutani, Tokyo; Nobuhiko Noma, Yokohama; Tsukasa Sakai, Tokyo; Osamu Noguchi, Tokyo; Hiroyuki Nemoto, Tokyo; Keiichi Tomita, Tokyo, all of Japan

[73] Assignee: Matsushita Graphic Communication Systems, Inc., Tokyo, Japan

[21] Appl. No.: 556,571

[22] Filed: Nov. 13, 1995

Related U.S. Application Data

[63] Continuation of Ser. No. 923,772, Aug. 3, 1992, abandoned.

[30] Foreign Application Priority Data

Aug. 1, 1991 [JP] Japan .................. 3-192010

[51] Int. Cl.⁶ .................................... H04N 1/32
[52] U.S. Cl. ............................ 358/261.1; 358/427
[58] Field of Search ........................ 358/261.1, 261.2, 358/261.3, 426, 427, 434

[56] References Cited

U.S. PATENT DOCUMENTS 4,688,100 8/1987 Haganuma et al. .
4,845,569 7/1989 Kurahayashi et al. .

FOREIGN PATENT DOCUMENTS 0179203 4/1986 European Pat. Off. .

OTHER PUBLICATIONS

Globecom'82, vol. 1, 2 Dec. 1982, Miami, pp. 427–433,T. Tsuiki et al. 'Image Processing Based On A Runlength Coding And Its Application To An Intelligent Facsimile'.

CCITT, Yellow Book, vol. VII, Fascicle VII.2, 10 Nov. 1980, Geneva, pp. 222–234, 'Telegraph And Telematic Services Terminal Equipment, Recommendations Of The S and T Series, Recommendation T.4'.

AEU ARCHIV Für Elektronik & Ubertragungstechnik, vol. 35, No. 10, Oct. 1981, Wurzburg, Germany, pp. 383–391, G. Renelt 'Zur Zeilensynchronisation Bei Gestorten Ubertragungsdaten Von Lauflangencodierten Faksimilebildern'.

Primary Examiner—Vit W. Miska
Attorney, Agent, or Firm—Lowe, Price, LeBlanc & Becker

[57] ABSTRACT

An encoding (or decoding) method, by which raw data of 1 line is converted into, for example, modified Huffman (MH) code (or MH code is converted into raw data) by obtaining a cumulative run-length code every transition point, at which there occurs a transition or change between a run of white pixels to another contiguous run of black pixels, from the beginning of the line and then converting the cumulative run-length code to the MH code (or converting the MH code to the cumulative run-length code). The cumulative run-length code is defined by both of data, which indicates that a pixel of a run just prior to the transition point is black or white, and data representing a cumulative run-length of the run up to the pixel thereof just prior to the transition point. Thus, an encoding or decoding processing can be performed at a high speed.

6 Claims, 57 Drawing Sheets

RUN-LENGTH CODE (2 BYTES)
LENGTH IS OF CUMULATIVE FORMAT

LENGTH (0~8191)

0 : WHITE
1 : BLACK

TERMINATING CODE (X'8000')

PRACTICAL EXAMPLE
(RUN-LENGTH TABLE IN CASE THAT 1 LINE
HAS 864 BLACK BITS & 864 WHITE BITS)

W00    B864    W1728

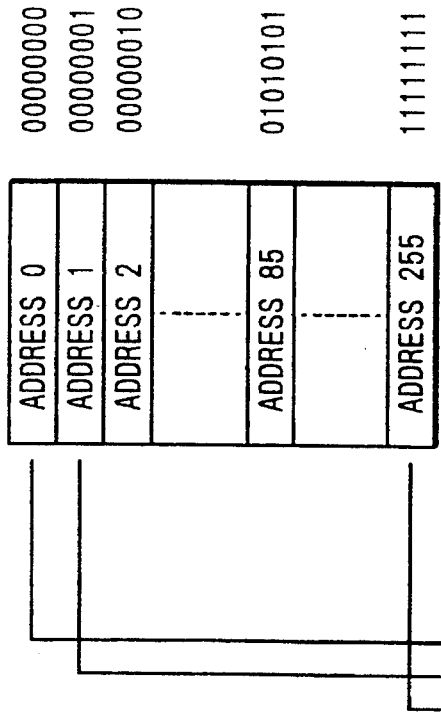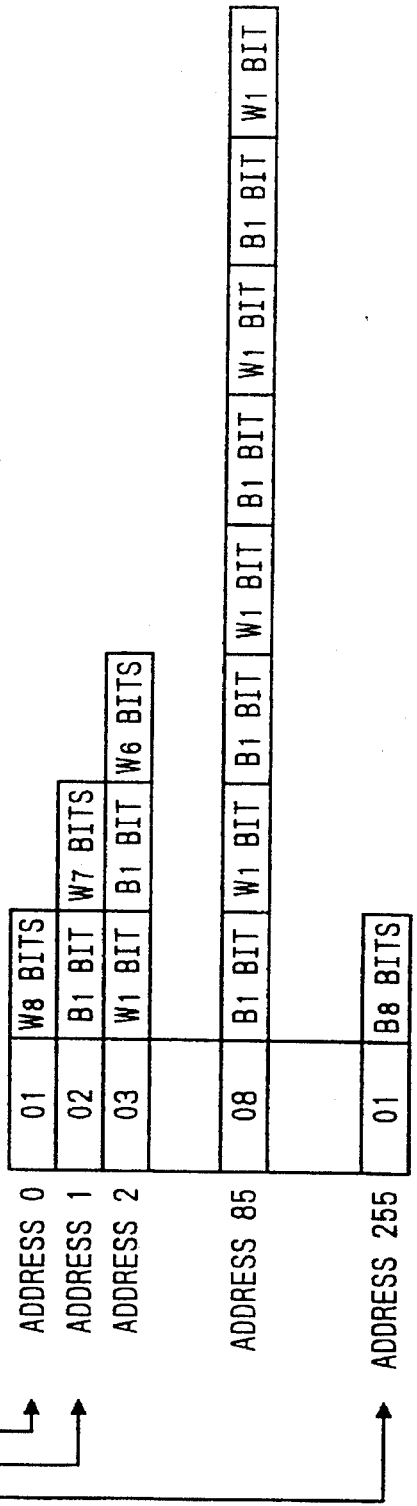

FIG. 20(a)
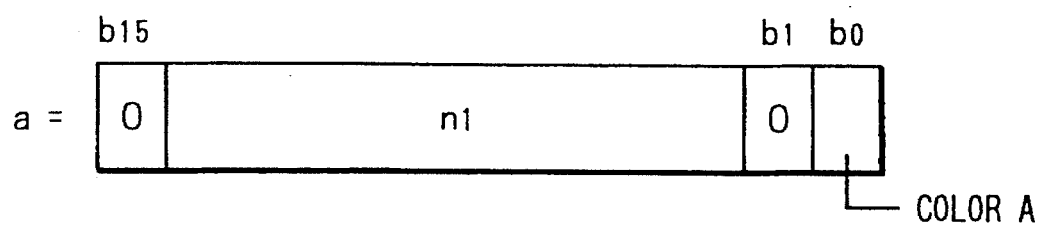
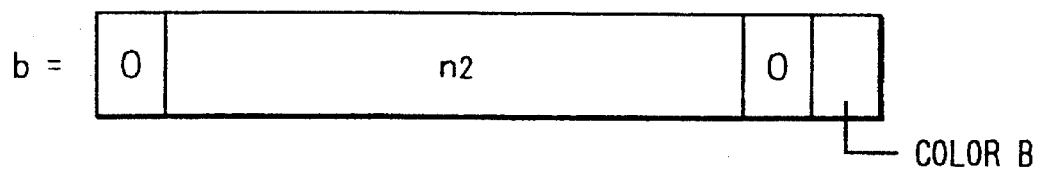
FIG. 20(b)
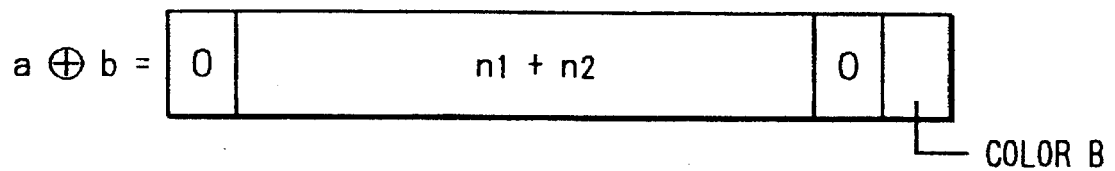
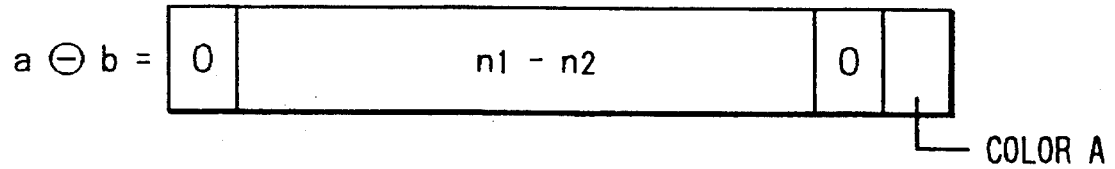

WMT : WHITE-MAKING-UP-TABLE

WTT : WHITE TERMINATING CODE TABLE

BMT : BLACK-MAKING-UP TABLE

FIG. 29(a)

RL → MH CONVERSION TABLE
WHITE TERMINATING-CODE TABLE

| RL CODE | EBN | MH CODE |
|---|---|---|
| 0 | 08 | XXXXXXXX10101100 |
| 1 | 06 | XXXXXXXX11111000 |
| 2 | 04 | XXXXXXXXXXXX1110 |
| 3 | 04 | XXXXXXXXXXXX0001 |
| ------ | ------ | ------ |
| 62 | 08 | XXXXXXXX11001100 |
| 63 | 08 | XXXXXXXX00101100 |

EBN : EFFECTIVE BIT NO.

FIG. 29(b)

WHITE MAKING-UP TABLE

| RL CODE | EBN | MH CODE |
|---|---|---|
| 64 | 05 | XXXXXXXXXXX11011 |
| 128 | 05 | XXXXXXXXXXX01001 |
| 192 | 06 | XXXXXXXXXX111010 |
| 256 | 07 | XXXXXXXXX1110110 |
| ------ | ------ | ------ |
| 2496 | 0C | XXXX011110000000 |
| 2560 | 0C | XXXX111110000000 |

EBN : EFFECTIVE BIT NO.

FIG. 30(a)

BLACK TERMINATING-CODE TABLE

| RL CODE | EBN | MH CODE |
|---|---|---|
| 0 | 0A | XXXXXX1110110000 |
| 1 | 03 | XXXXXXXXXXXXX010 |
| 2 | 02 | XXXXXXXXXXXXXX11 |
| 3 | 02 | XXXXXXXXXXXXXX10 |
| ------- | ------- | ------- |
| 62 | 0C | XXXX011001100000 |
| 63 | 0C | XXXX111001100000 |

FIG. 30(b)

BLACK MAKING-UP-CODE TABLE

| RL CODE | EBN | MH CODE |
|---|---|---|
| 64 | 0A | XXXXXX1111000000 |
| 128 | 0C | XXXX000100110000 |
| 192 | 0C | XXXX100100110000 |
| 256 | 0C | XXXX110110100000 |
| ------- | ------- | ------- |
| 2496 | 0C | XXXX011110000000 |
| 2560 | 0C | XXXX111110000000 |

FIG. 47(a)

MH → RL CONVERSION TABLE (WHITE)

| MH CODE | EBN | TRL |
|---|---|---|
| 0 0 0 0 0 0 0 0 | 0 0 | 1 |
| 0 0 0 0 0 0 0 1 | 0 4 | 0 0 0 C |
| 0 0 0 0 0 0 1 0 | 0 5 | 0 0 2 C |
| ⋮ | ⋮ | ⋮ |
| 1 1 1 1 1 1 1 1 | 0 4 | 0 0 1 C |

FIG. 47(b)

| MH CODE | EBN | TRL |
|---|---|---|
| 0 0 0 0 | 8 0 | ⋮ |
| ⋮ | ⋮ | |
| 1 0 0 0 | 0 C | 8 0 0 0 |
| ⋮ | ⋮ | ⋮ |
| 1 1 1 1 | 8 0 | |

FIG. 48(a)

MH → RL CONVERSION TABLE (BLACK)

| MH CODE | EBN | TRL |
|---|---|---|
| 0 0 0 0 0 0 0 0 | 0 0 | 1 |
| 0 0 0 0 0 0 0 1 | 0 2 | 0 0 0 D |
| 0 0 0 0 0 0 1 0 | 0 3 | 0 0 0 5 |
| ⋮ | ⋮ | ⋮ |
| 1 1 1 1 1 1 1 1 | 0 2 | 0 0 0 9 |

FIG. 48(b)

| MH CODE | EBN | TRL |
|---|---|---|
| 0 0 0 0 0 0 0 0 | 8 0 | |
| 0 0 0 0 0 0 0 1 | 0 8 | 0 0 3 5 |
| 0 0 0 0 0 0 1 0 | 0 A | 0 0 4 9 |
| ⋮ | ⋮ | ⋮ |
| 1 1 1 1 1 1 1 1 | 0 8 | 0 0 3 9 |

FIG. 59

EXAMPLE OF B4 → A4 CONVERSION

ENCODING AND DECODING METHODS FOR USE IN FACSIMILE

This application is a continuation of application Ser. No. 07/923,772 filed Aug. 3, 1992 now abandoned.

BACKGROUND OF THE INVENTION

1. Field of The Invention

This invention relates to encoding and decoding methods for use in a facsimile.

2. Description of The Related Art

In case of compressing raw data (namely, Non-Coded Format data (hereunder abbreviated as NC data)), which is read by a scanner, in a conventional facsimile, the NC data is converted or encoded en bloc into Modified Huffman (hereunder abbreviated as MH) data or Modified Read (hereunder abbreviated as MR) data. Further, in case of expanding MH data or MR data received by a conventional facsimile, NC data is decoded en bloc from the MH or MR data. Such an encoding or decoding operation is performed by using a large scale integrated circuit (LSI) dedicated to an encoding or decoding. Alternatively, such an encoding or decoding is effected by a general purpose arithmetic and logic unit by using a central processing unit (CPU) of the conventional facsimile.

Further, image information corresponding to each line of a draft, which is read by the scanner of the conventional facsimile, is written to a memory as a bit string, of which each bit corresponds to a pixel. In case of performing a conversion of resolution of such image information (for example, condensing a draft image, of which the size is B4, into a converted image, of which the size is A4), for example, a thinning of bits of a bit string corresponding to each line is performed at predetermined thinning intervals (for instance, every sixth bit, every seventh bit, every seventh bit and every sixth bit corresponding to first, second, third and fourth lines, respectively).

When using LSI dedicated to an encoding or decoding (hereunder sometimes referred to as an encoding/decoding LSI), a control operation of an LSI fitted on the outer surface of such an encoding/decoding LSI should be performed in addition to a providing of the encoding/decoding LSI for effecting an encoding or decoding operation. Further, when accepting data, means for performing an interruption/Direct Memory Access (DMA) operation/a polling operation are required for accepting the data. This results in increase in burden to the CPU of the conventional facsimile. In contrast, in case of employing a general purpose arithmetic and logic unit, a compressing/expanding of data can be effected only when the burden to the CPU is small.

Moreover, as described above, a conversion of resolution is attended with operations such as a thinning of bits of a bit string corresponding to each line of an image. This complicates a processing to be performed in connection with the conversion of resolution. For example, in case where the conventional facsimile is provided with a memory for storing a received message, the conversion of resolution should be effected after MR code or data is decoded or coded back to NC data.

The present invention is accomplished to resolve the above described problems of the conventional facsimile.

It is, therefore, an object of the present invention to provide decoding and encoding methods for performing conversions among NC, MH and MR data by using a cumulative run-length as what is called an intermediate code without using hardware for an encoding and decoding.

SUMMARY OF THE INVENTION

To achieve the foregoing object and in accordance with an aspect of the present invention, there is provided an encoding method, by which raw data of 1 line is converted into MH code by obtaining a cumulative run-length code every transition point, at which there occurs a transition or change between a run of white pixels to another contiguous run of black pixels, from the beginning of the line and then converting the cumulative run-length code to the MH code. The cumulative run-length code defined by both of data representing achromatic color (namely, black or white) of a pixel of a run just prior to the transition point and data representing a cumulative run-length of the run up to the pixel thereof just prior to the transition point.

Further, in another aspect of the present invention, there is provided another encoding method, by which raw data of 1 line is converted into MR code by obtaining the cumulative run-length code, which is defined as above described, every transition point, at which there occurs a transition or change between a run of white pixels to another contiguous run of black pixels, from the beginning of the line and then converting the cumulative run-length code to the MR code. In case of an embodiment of this method, when the cumulative run-length is converted into the MR code, a predetermined number of run-length codes from a run-length code subsequent to the run-length code corresponding to the last transition point are serially searched for a current transition point $b_1$ on a reference line after a horizontal mode is selected as a transition-point mode. If not detected, the current transition point is detected by effecting a binary search (to be described later).

Moreover, in a further aspect of the present invention, there is provided a decoding method, by which MH code is converted into raw data by converting the MH code into the cumulative run-length code, which is defined as above described, every transition point, at which there occurs a transition or change between a run of white pixels to another contiguous run of black pixels, from the beginning of the line and then converting the cumulative run-length code to the raw data. In case of an embodiment of this method, the MH code is converted into the cumulative run-length code after an end-of-line (EOL) is detected from the MH code. In case of another embodiment of this method, if the length of data to be converted exceeds the number of pixels of 1 line when MH code is converted into the cumulative run-length code, it is determined that the conversion corresponding to a current line is an error and that the conversion corresponding to the next line is performed by setting a bit, which is prior to the last bit of the data corresponding to the current line by 3 bits, as a starting bit, from which the conversion corresponding to the next line is started.

Furthermore, in still another aspect of the present invention, there is provided a decoding method, by which MR code is converted into raw data by converting the MR code into the cumulative run-length code, which is defined as above described, every transition point, at which there occurs a transition or change between a run of white pixels to another contiguous run of black pixels, from the beginning of the line and then converting the cumulative run-length code to the raw data. In case of an embodiment of this method, the MR code is converted into the cumulative run-length code after an EOL is detected from the MR code.

In case of another embodiment of this method, if the length of data to be converted exceeds the number of pixels of 1 line when MR code is converted into the cumulative run-length, it is determined that the conversion corresponding to a current line is an error and that the conversion corresponding to the next line is performed by setting a bit, which is prior to the last bit of the data corresponding to the current line by 3 bits, as a starting bit, from which the conversion corresponding to the next line Is started.

Additionally, in yet another aspect of the present invention, there is provided a decoding method, by which MH code is converted into MR code by converting the MH code into the cumulative run-length code, which is defined as above described, every transition point, at which there occurs a transition or change between a run of white pixels to another contiguous run of black pixels, from the beginning of the line and then converting the cumulative run-length code to the MR code.

Further, in additional aspect of the present invention, there is provided a decoding method, by which MR code is converted into MH code by converting the MR code into the cumulative run-length code, which is defined as above described, every transition point, at which there occurs a transition or change between a run of white pixels to another contiguous run of black pixels, from the beginning of the line and then converting the cumulative run-length code to the MH code.

Moreover, in case of an encoding or decoding method embodying the present invention, the cumulative run-length code is enlarged or reduced by being multiplied by a magnification ratio.

Furthermore, in case of another encoding or decoding method embodying the present invention, when the cumulative run-length code is converted into the MH or MR code, or when the MH or MR code is converted into the cumulative run-length, or when the run-length code is enlarged or reduced by being multiplied by the magnification ratio, or when the MH or MR code is converted into the cumulative run-length code after the EOL is detected therefrom, a facsimile responds to an interruption in a predetermined step.

Thus conversions among NC, MH and MR data are performed by using cumulative run-length codes employed as intermediate codes. Therefore, an encoding or decoding processing can be performed by executing software, namely, by issuing and executing instructions respectively corresponding and dedicated to six kinds of conversions (namely, a conversion from an MH code to a cumulative run-length code, a conversion from a cumulative run-length code to an MH code, a conversion from an MR code to a cumulative run-length code, a conversion from a cumulative run-length code to an MR code, a conversion from an NC code to a cumulative run-length code and a conversion from a cumulative run-length code to an NC code). Further, an encoding or decoding processing can be performed at a high speed by executing microprograms which define the dedicated instructions. Thereby, the dedicated encoding/decoding LSI can be saved or omitted.

Further, the reduction and expansion of an image can easily be performed by multiplying cumulative run-length code by a magnification ratio. Thereby, a conversion of the size of input draft image (namely, input source to a facsimile) can be easily performed.

Moreover, an EOL can be effectively detected by converting an MH or MR code into a cumulative run-length code after the EOL is detected from the MH or MR code.

Furthermore, as described above, if the length of data to be converted exceeds the number of pixels of 1 line when an MR or MH code is converted into a cumulative run-length, it is determined that the conversion corresponding to a current line is an error and that the conversion corresponding to the next line is performed by setting a bit, which is prior to the last bit of the data corresponding to the current line by 3 bits, as a starting bit, from which the conversion corresponding to the next line is started. As the result, such an error does not affect the conversion corresponding to the next line. According to a table of terminating codewords based on T. 4 Recommendation of CCITT, each of the codewords has a format like "x x x 000". Thus there is no white or black run-length code, of which the lowest three or more bits are zero. Therefore, a correct conversion can be performed from the EOL of the next line by turning back a starting bit of the conversion by 3 bits.

Further, as described above, when the cumulative run-length is converted into the MR code, a predetermined number of run-length codes from a run-length code subsequent to the run-length code corresponding to the last transition point are serially searched for a current transition point $b_1$ on a reference line after a horizontal mode is selected as a transition-point mode. Furthermore, if not detected, the current transition point is detected by effecting a binary search. Thereby, usually, a current transition point can be detected in the predetermined number of the run-length codes. Even if not detected therein, a detection of the current transition point can effectively be effected.

Additionally, when the cumulative run-length code is converted into the MH or MR code, or when the MH or MR code is converted into the cumulative run-length, or when the run-length code is enlarged or reduced by being multiplied by the magnification ratio, or when the MH or MR code is converted into the cumulative run-length code after the EOL is detected therefrom, a facsimile is adapted to respond to an interruption in a predetermined step. Thus a prompt and appropriate response to an interruption can be achieved.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which:

FIGS. 19(a)–(b) are a diagram for illustrating a table used for converting raw data into a cumulative run-length code;

FIG. 20 is a diagram for illustrating an addition and subtraction to be performed on data stored in the work area CHKBIT;

FIGS. 29(a)–(b) are a diagram for illustrating a table used for a white run-length code to an MH code;

FIGS. 30(a)–(b) are a diagram for illustrating a table used for a black run-length code to an MH code;

FIGS. 47(a)–(b) are a diagram for illustrating a table used to convert an MH code to a white cumulative-run-length code;

FIGS. 48(a)–(b) are a diagram for illustrating a table used to convert an MH code to a black cumulative-run-length code;

FIG. 59 a diagram for illustrating a practical example of a conversion of a cumulative run-length code into raw data;

DETAILED DESCRIPTION OF THE PREFERRED EMBODIMENT

Hereinafter, the preferred embodiment of the present invention will be described in detail by referring to the accompanying drawings.

Figure 1:
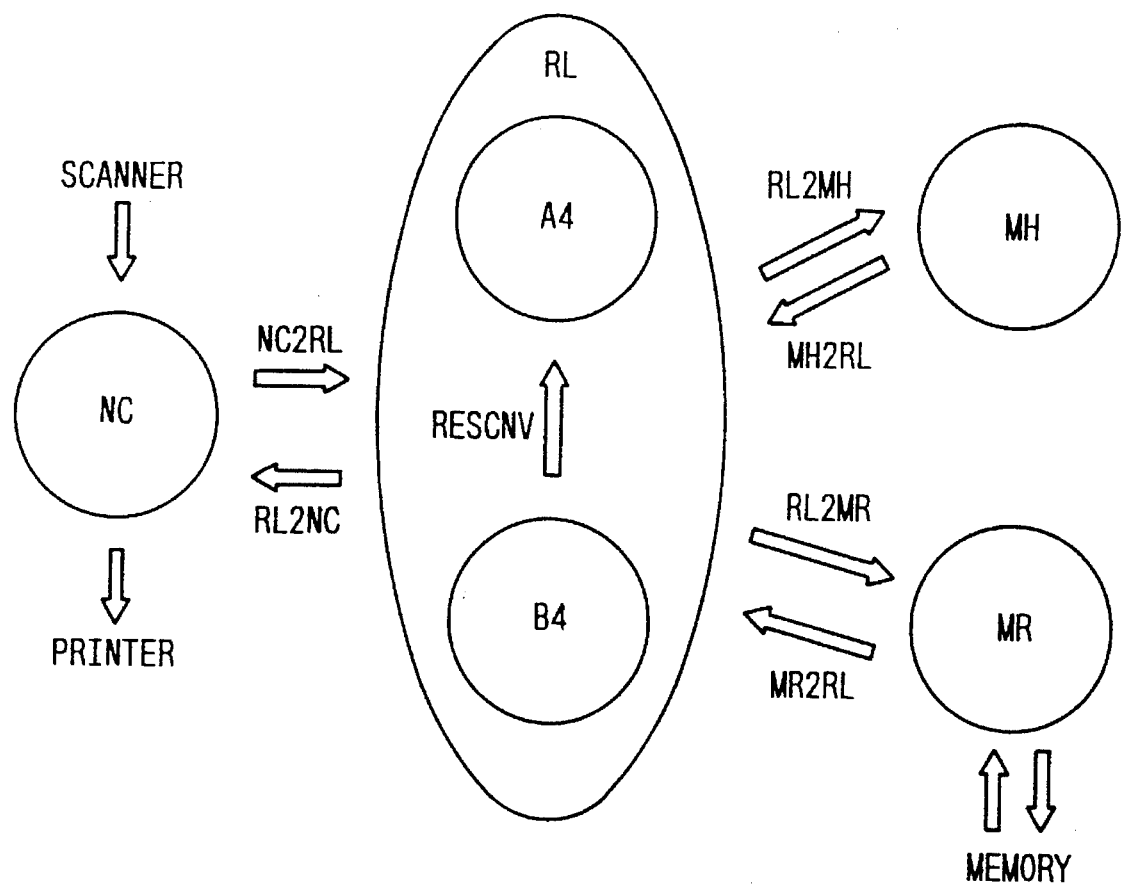
FIG. 1 is a diagram for illustrating a code conversion system according to the present invention.

FIG. 1 is a diagram for illustrating the relation between an encoding (or coding) instruction and a decoding instruction. In this figure, reference character NC is an abbreviation of "Non-Format" and denotes image data read by a scanner with no format, namely, what is called raw data. Further, RL represents a cumulative run-length code having a run-length format. Moreover, MH and MR respectively designate an MH code and an MR code specified in the T.4 Recommendation of CCITT. Furthermore, NC2RL denotes a conversion from an NC code to an RL code; MH2RL a conversion from an MH code to an RL code; and RESCNV a conversion of resolution to be effected by multiplying an RL code by a magnification ratio. Additionally, an arrow drawn from B4 to A4 represents a conversion of a draft, the size of which is B4, to a reduced image, the size of which is A4. In case of a facsimile with a memory, input data to the facsimile is stored in the memory as an MR code. In this way, by using an intermediate code (namely, an RL code), a conversion is performed among NC, MH and MR codes.

Figure 2:
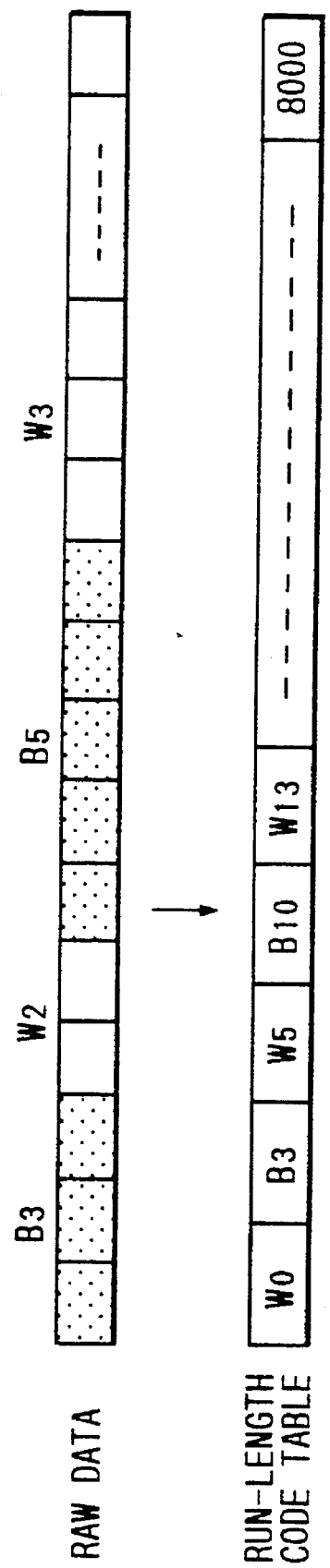
FIG. 2 is a diagram for illustrating a table of cumulative run-lengths according to the present invention.

FIG. 2 is, a diagram for illustrating a case where a cumulative run-length code RL is generated from raw data NC. In the raw data, strings of white pixels and strings of black pixels are arranged alternately. If there is no white pixel at the beginning of raw data of 1 line, the length of a string or run of white pixels is set as zero. Thus, as shown in this figure, the RL always starts with a string of white pixels. In case of this example, "W0" indicates that a string of no white pixels. Next, three black pixels of the raw data are represented by "B3". Subsequent two white pixels of the raw data are represented by "W5". Incidentally, a code "8000" is written to the RL as a terminating code representing the end of the raw data of 1 line.

Figure 3:
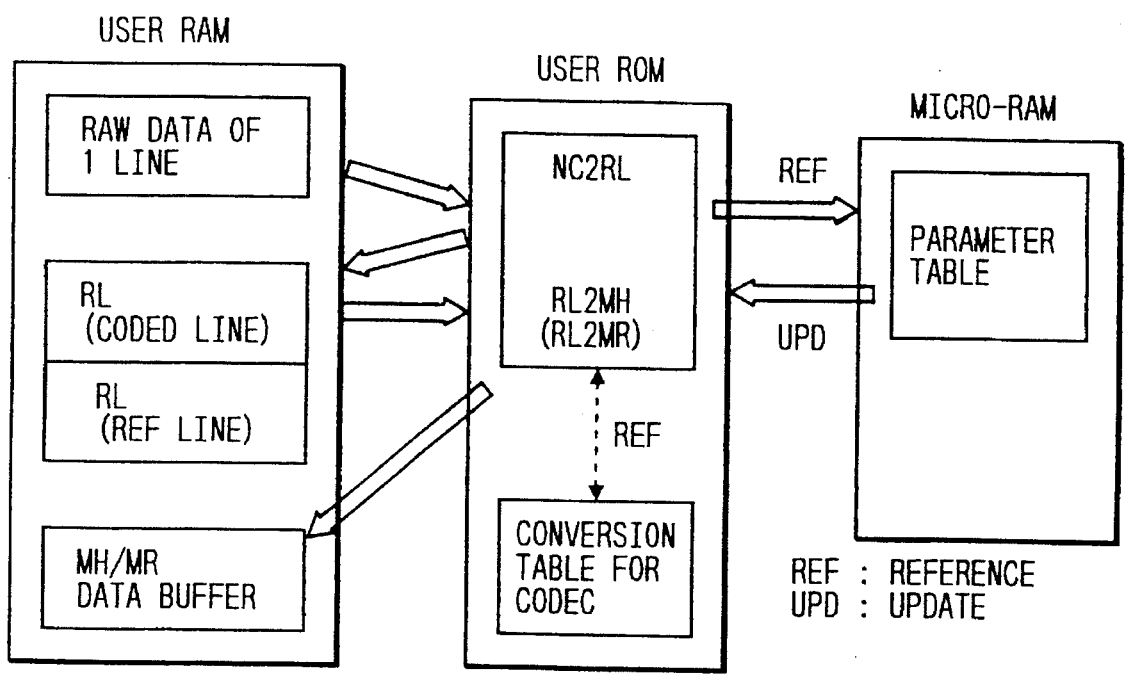
FIG. 3 is a diagram for illustrating the arrangement of memories used for executing encoding or coding type instructions.

FIG. 3 shows the arrangement of memories used for executing a coding (or encoding) instruction. A parameter table including parameters used for executing each of coding/decoding (CODEC) instructions is established in a micro-random-access-memory (RAM), A translation table for CODEC instructions, which is referred to at the time of executing each CODEC instruction, is provided in a user-random-access-memory (ROM). Further, a run-length code (hereunder sometimes referred to as a run-length table code or as a run-length table) is provided in a user RAM. Thereby, raw data of 1 line is read and then a conversion NC2RL is performed. Subsequently, another conversion RL2MH or RL2MR is effected, and MH or MR data obtained as a result of this conversion is :stored in an MH/MR data buffer of the user RAM. A coding of the raw data is performed by repeating this process.

Figure 4:
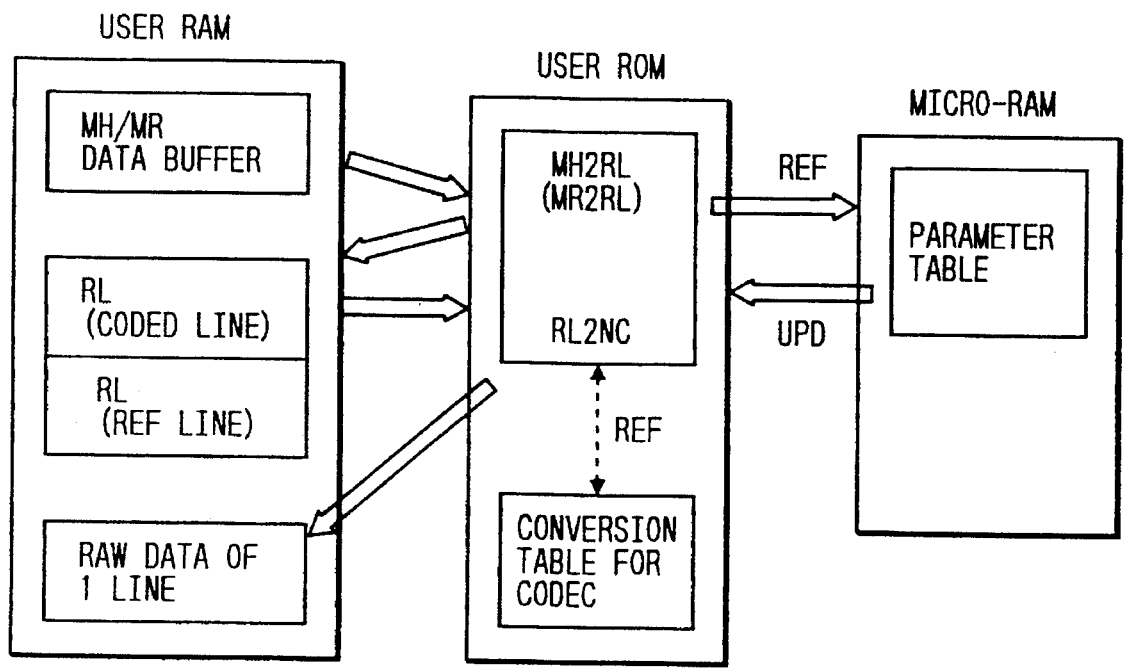
FIG. 4 is a diagram for illustrating the arrangement of memories used for executing decoding type instructions.

FIG. 4 shows the arrangement of memories used for executing a decoding instruction. A decoding of the data stored in the MH/MR data buffer of the user RAM is performed by converting the MH or MR data into raw data of 1 line repeatedly.

Figure 5:
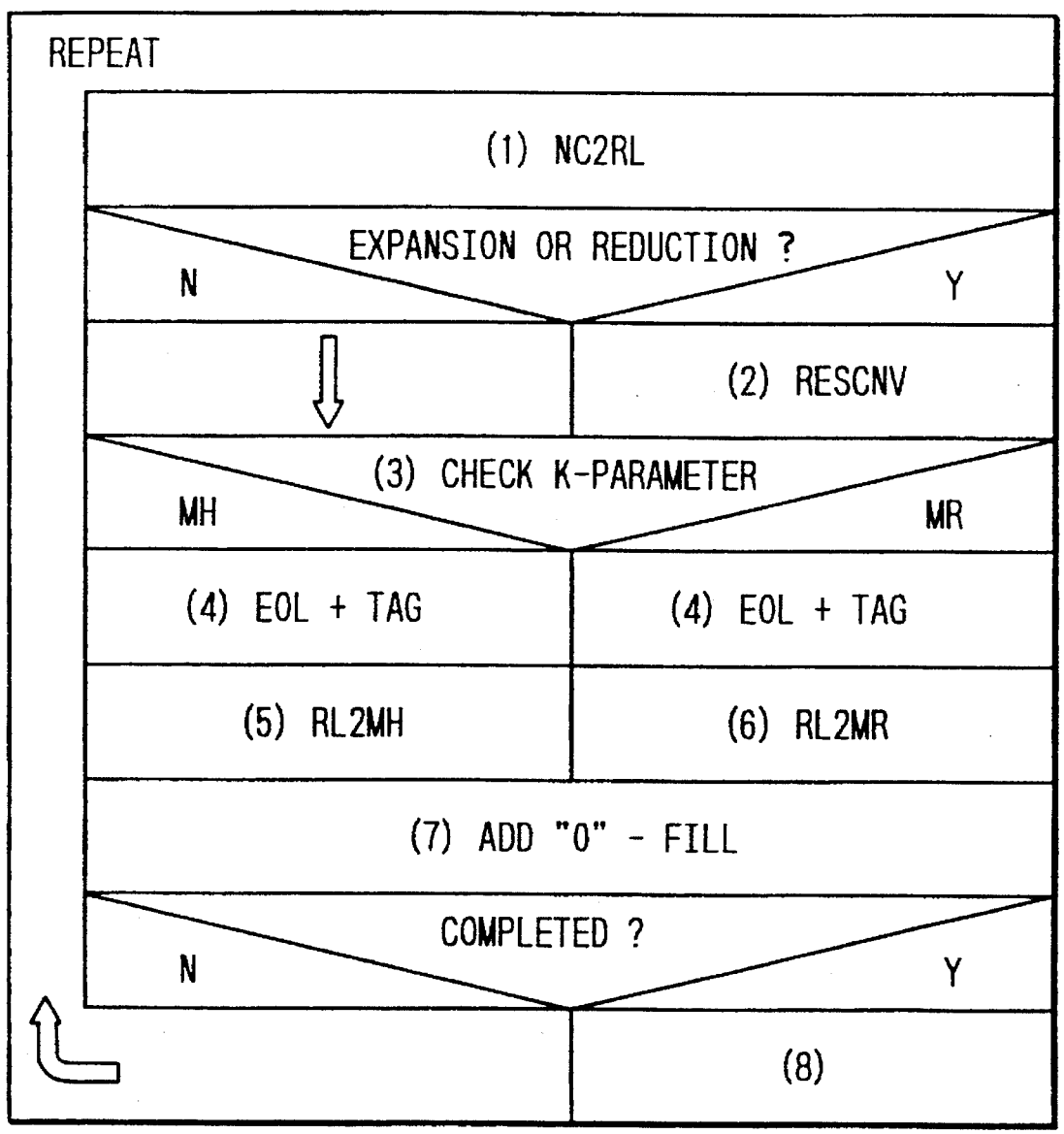
FIG. 5 is a diagram for illustrating an operation of converting raw data into MR data or code.

FIG. 5 is a diagram for illustrating a coding operation. In step or stage (1), a run-length table, which is a group of cumulative run-length codes as illustrated in FIG. 2, is generated from raw data. Then, in step (2), a run-length table corresponding to the conversion of the size of an input draft from B4 to A4 is produced. Subsequently, in step (3), a program for performing this operation is branched according to what is called a K-parameter specified in the T. 4 Recommendation of CCITT into a branch corresponding to an MH code and another branch corresponding to an MR code. Further, in step (4), EOL and a tag-bit are set by performing an application program. Then, in step (5), an MH code is produced from the run-length table. Alternatively, in step (8), an MR code is produced from the run-length table. Further, a 0 Fill code is added by performing an application program. Finally, a RTC code for a return control is further added by performing an application program.

Figure 6:
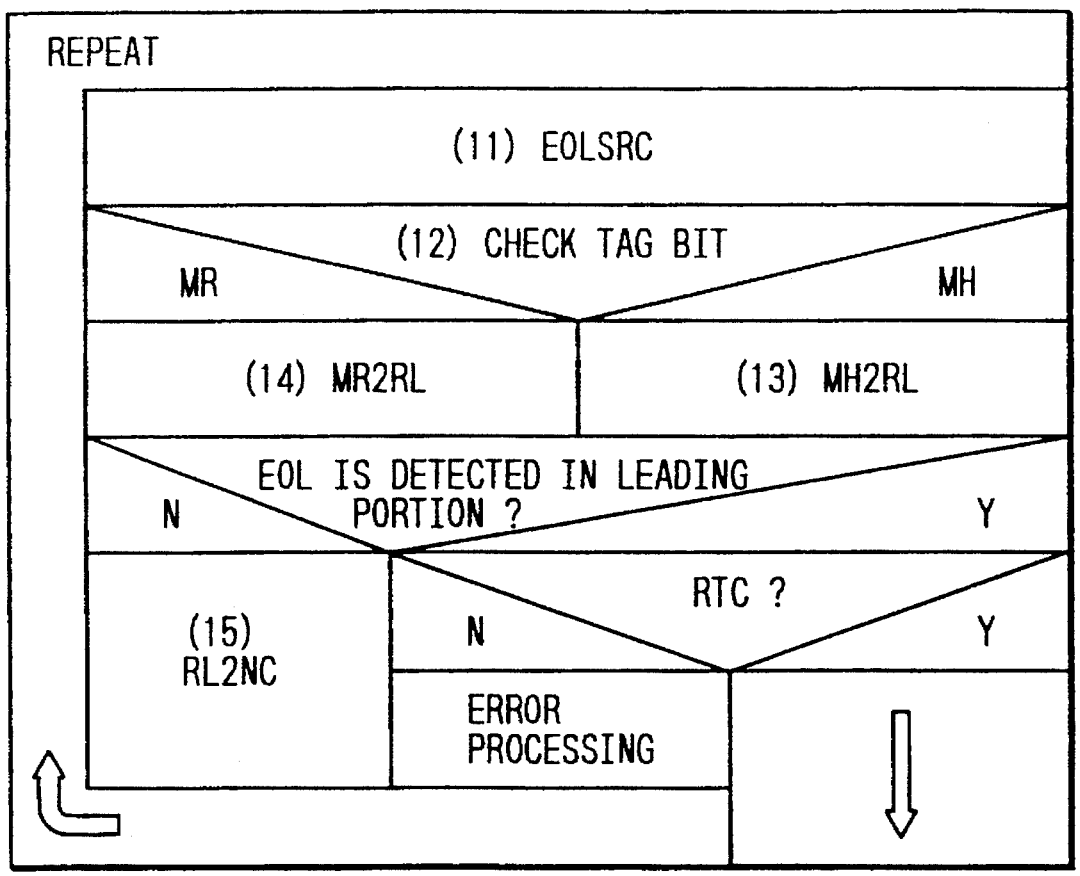
FIG. 6 is a diagram for illustrating an operation of decoding MR data Or code.

FIG. 6 is a diagram for illustrating a decoding operation. First, in step (11), compressed data, which is received by the facsimile, is searched for an EOL. Then, a tag bit is checked in step (12). If the tag bit indicates 1, data of the next line indicates an MH code. In contrast, if the tag bit indicates 0, data of the next line indicates an MR code. Subsequently, the MH code is converted into a run-length table in step (13). In contrast, the MR code is converted into a run-length table in step (14). Then, the run-length table is converted into raw data in step (15).

Figure 7:
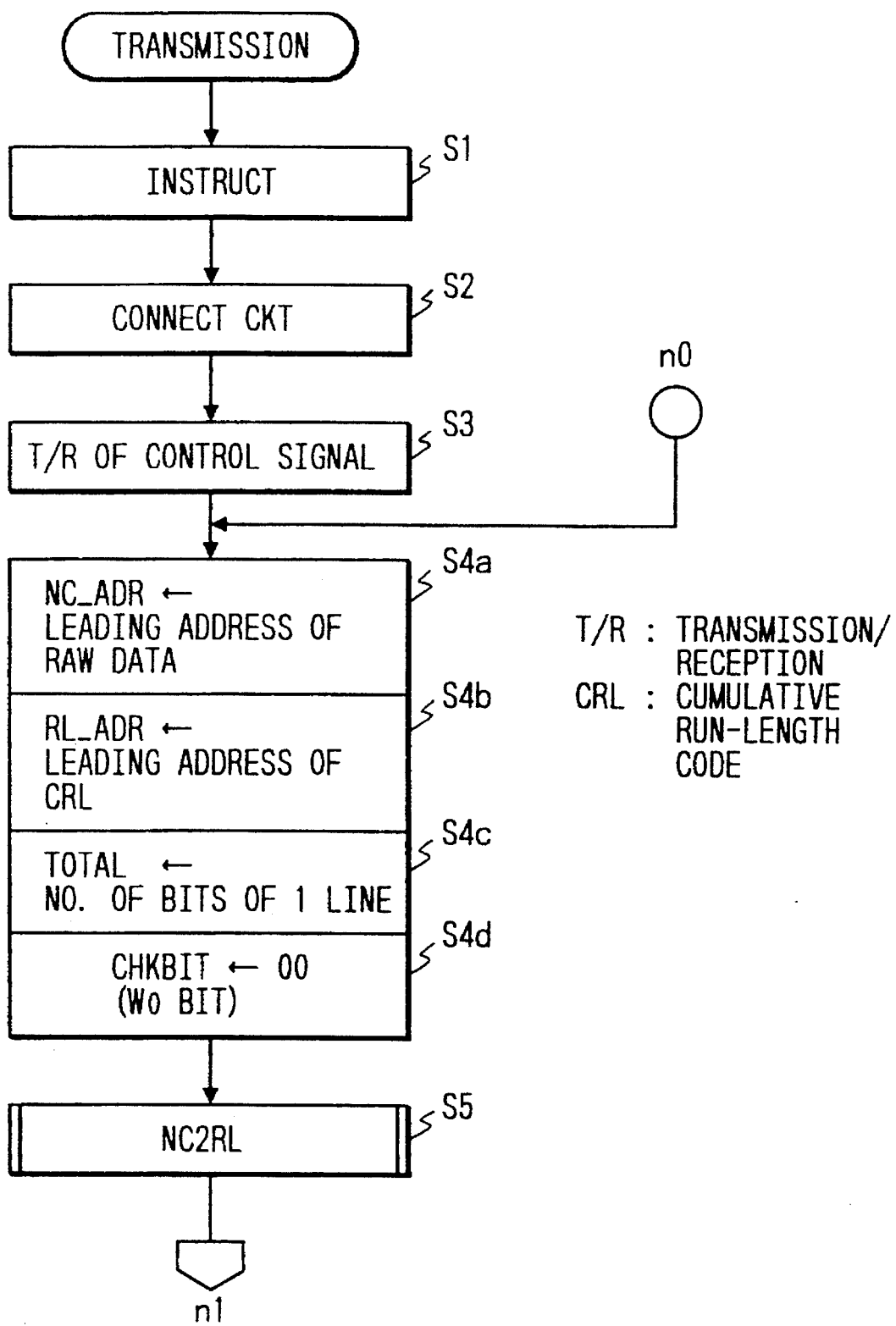
FIGS. 7, 8 and 9 are flowcharts for illustrating an operation of transmitting a draft or message.
Figure 8:
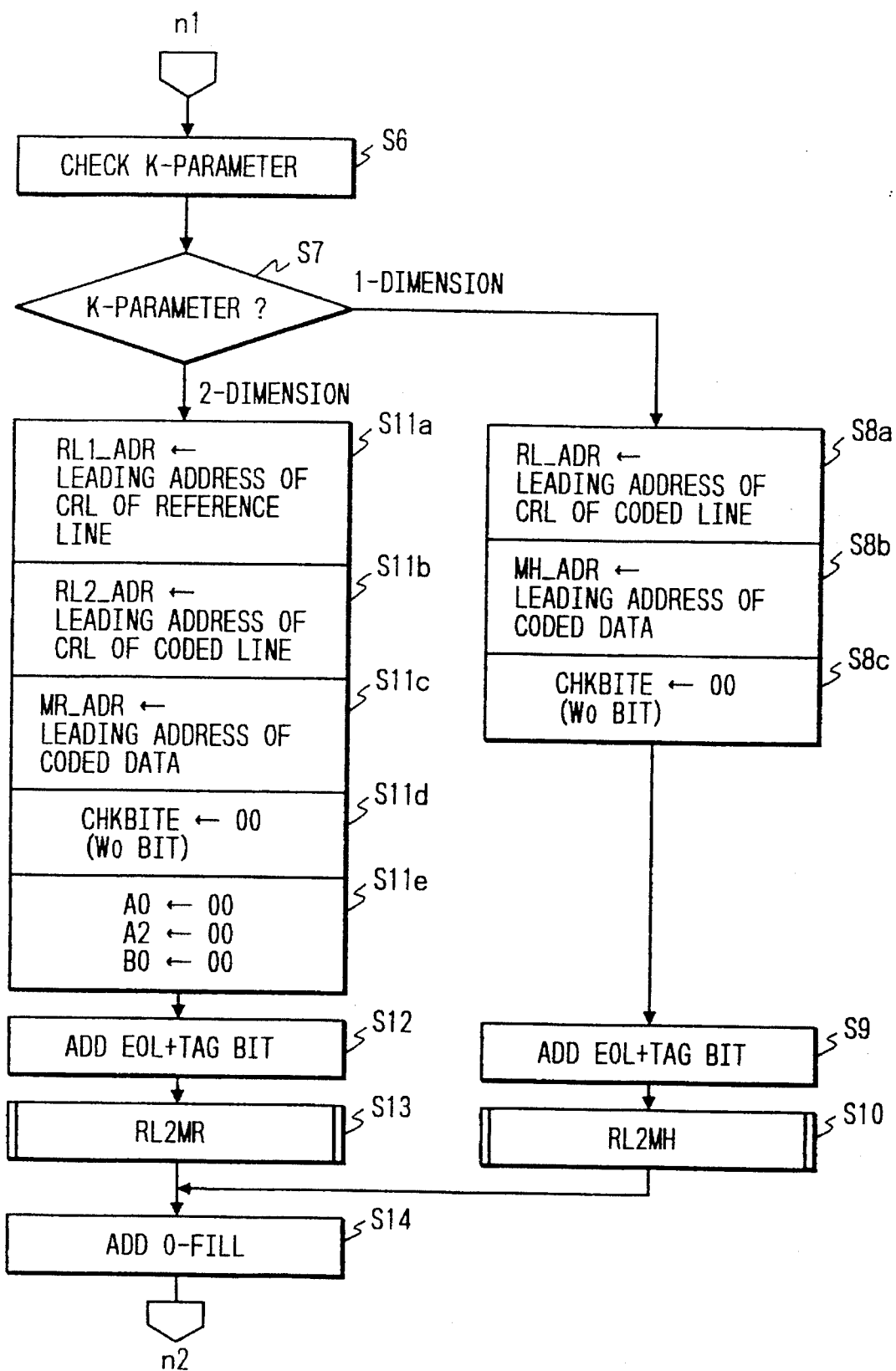
Figure 9:
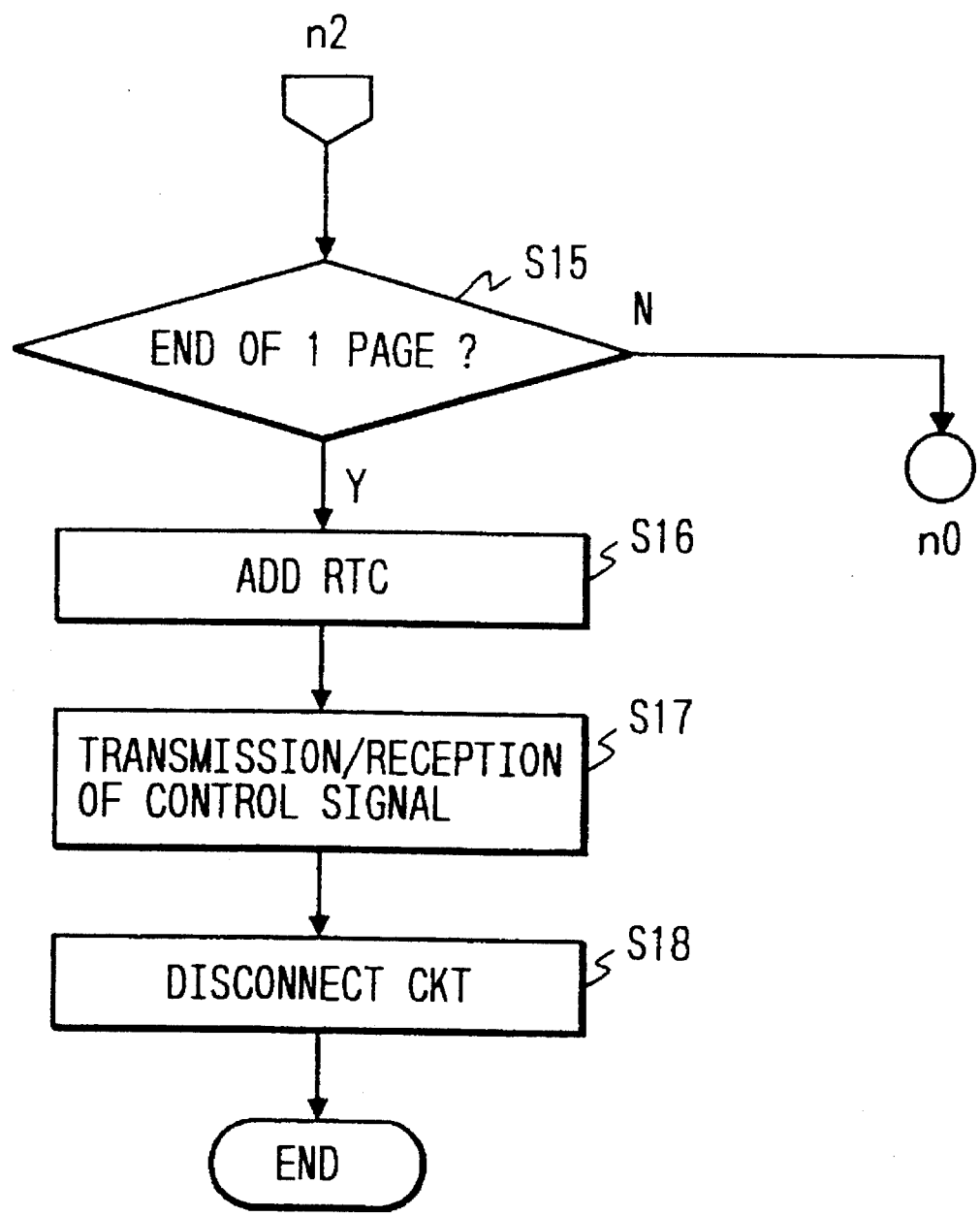

FIGS. 7 to 9 are flowcharts for illustrating an operation of transmitting a draft or message, which illustrate the details of the process of FIG. 5.

As shown in FIG. 7, when a transmission of a message or draft is instructed by an operator, a control signal is sent to a facsimile of a called party (see steps S1, S2 and S3).

Figures 10A, 10B:
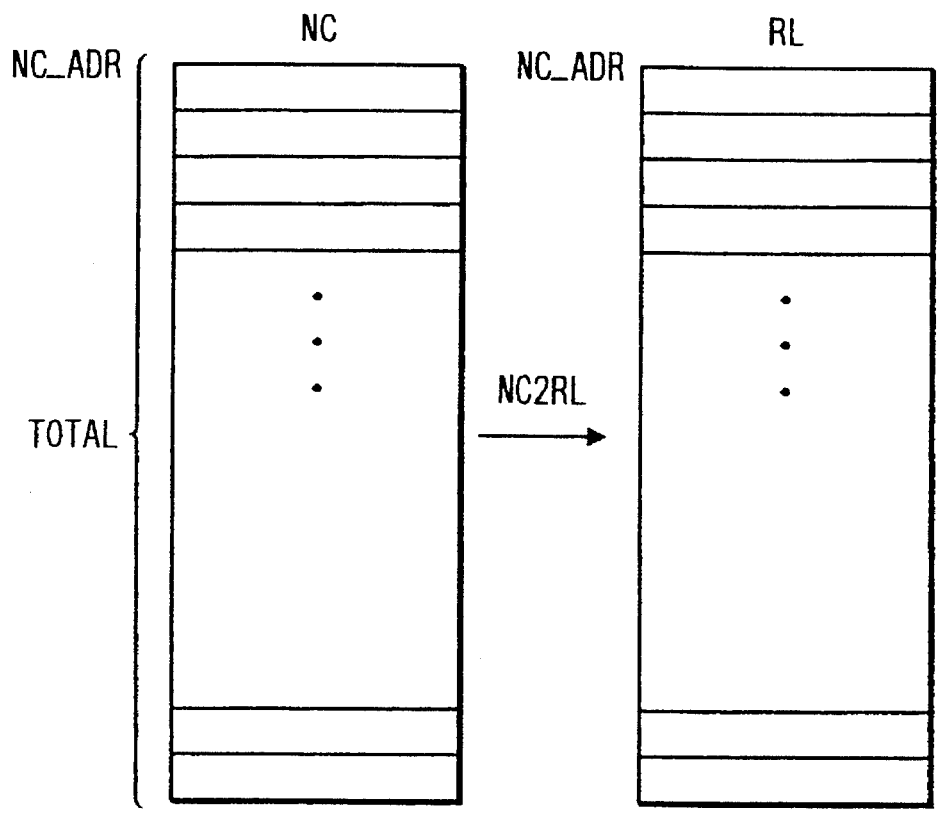
FIGS. 10(a)–(c) are a diagram for illustrating formats used to store raw data and cumulative run-length code and a format of a working area CHKBIT.
Figure 10C:
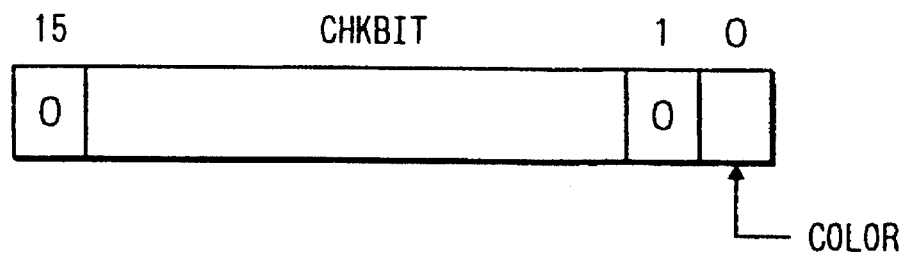

FIG. 10 illustrates a format of data stored in a memory. FIG. 10(a) shows a state in which raw data read by a scanner is stored in each address "NC ADR" using 1 byte. Incidentally, data TOTAL represents the number of bits of 1 line. FIG. 10(b) shows a state in which a cumulative run-length code RL is stored in each address "RL APR" using 2 bytes. FIG. 10(c) shows a format of a working area CHKBIT for producing RL, which has two bytes. This format is the same as that of RL of FIG. 15.

Turning back to FIG. 7, a leading address of raw data is set in step S4a. Further, a leading address of a cumulative run-length code is set in step S4b. Moreover, data representing the number of bits of 1 line is set in step S4c. Furthermore, data 00 is set in the working area CHKBIT in step S4d. As described above, a leading bit of the RL should correspond to a white pixel. Thus data COLOR of FIG. 10(c) is set as 0. Subsequently, in step S5, a conversion NC2RL is effected. This, however, will be described in detail later.

Next, as shown in FIG. 8, K-parameter of a receiving or called party is checked in steps S6 and S7. If the K-parameter is one-dimensional (namely, corresponds to an MH code), a leading address of the cumulative run-length code of a line to be converted is set in step S8a. Further, a leading address of coded data, namely, of the MH code generated as a result of a conversion RL2MH is also set in step S8b. Moreover, data 00 is set in a working area CHKBITE corresponding to the conversion RL2MH, similarly as in step S4d. Next, EOL and a tag bit 1 are added in step S9. Then, a conversion RL2MH (to be described later),is effected in step S10.

In case where it is found in step S7 that the K-parameter is two-dimensional (namely, corresponds to an MR code), a leading address of a cumulative run-length code corresponding to a reference line is set in step S11a. Further, a leading address of a cumulative run-length code corresponding to a coded line in step S11b. Moreover, a leading address of coded data to be stored in a working area used for producing an MR code is set in step S11c. Furthermore, data 00 is set in the area CHKBITE in step S11d, similarly as in step S4d. Additionally, data 00 is set in each of working areas A0, A2 and B0 respectively corresponding to parameters (hereunder sometimes referred to as pixels or as points) $a_o$, $a_2$ and $b_o$ in step S11e. Next, EOL and a tag bit 0 are added in step S12. Then, a conversion RL2MR is effected in step S13. Finally, data 0–Fill is added in step S14.

In this way, a coding of each line is effected as illustrated in FIG. 9. When a coding of 1 page is completed in step S15, a code RTC is added in step S16. Then a transmission/reception of a control signal is effected in step S17. Further, a circuit or communication line is disconnected in step S18.

Figure 11:
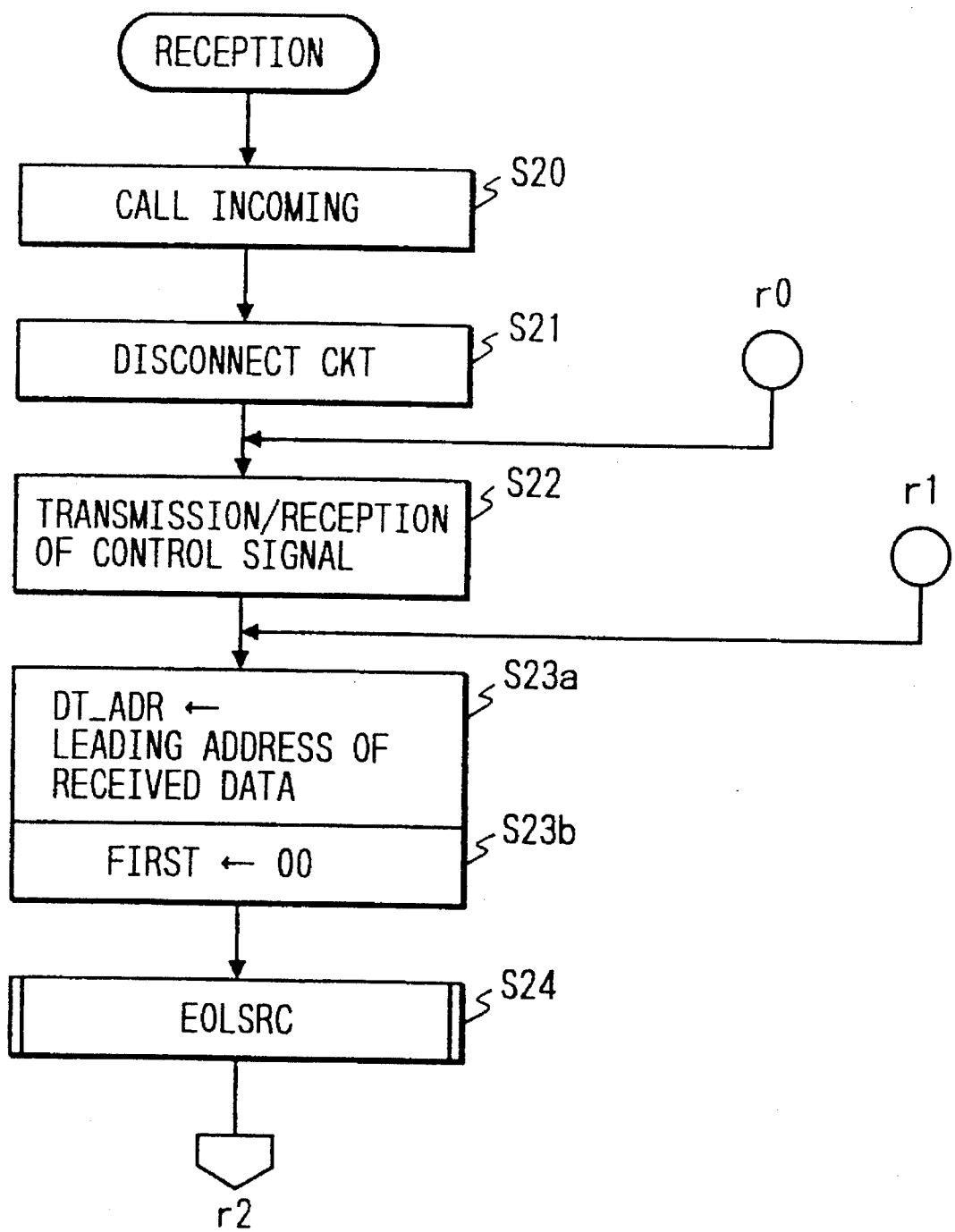
FIGS. 11, 12, and 13 are flowcharts for illustrating an operation of receiving a draft or message.

Next, a receiving operation will be described hereinbelow by referring to FIGS. 11 to 13 which show the details of the process of FIG. 6. As shown in FIG. 11, when a coming call occurs in step S20 and further the circuit is connected in step S21, a transmission/reception of a control signal is effected in step S22. Subsequently, in step S23b, a leading address of received data is set in step S23a and data 00 is set in a 1-byte working area "first" for storing data which indicates whether or not the received data is first data of 1 line. Next, an operation EOLSRC of searching for EOL is performed in step S24.

Figure 12:
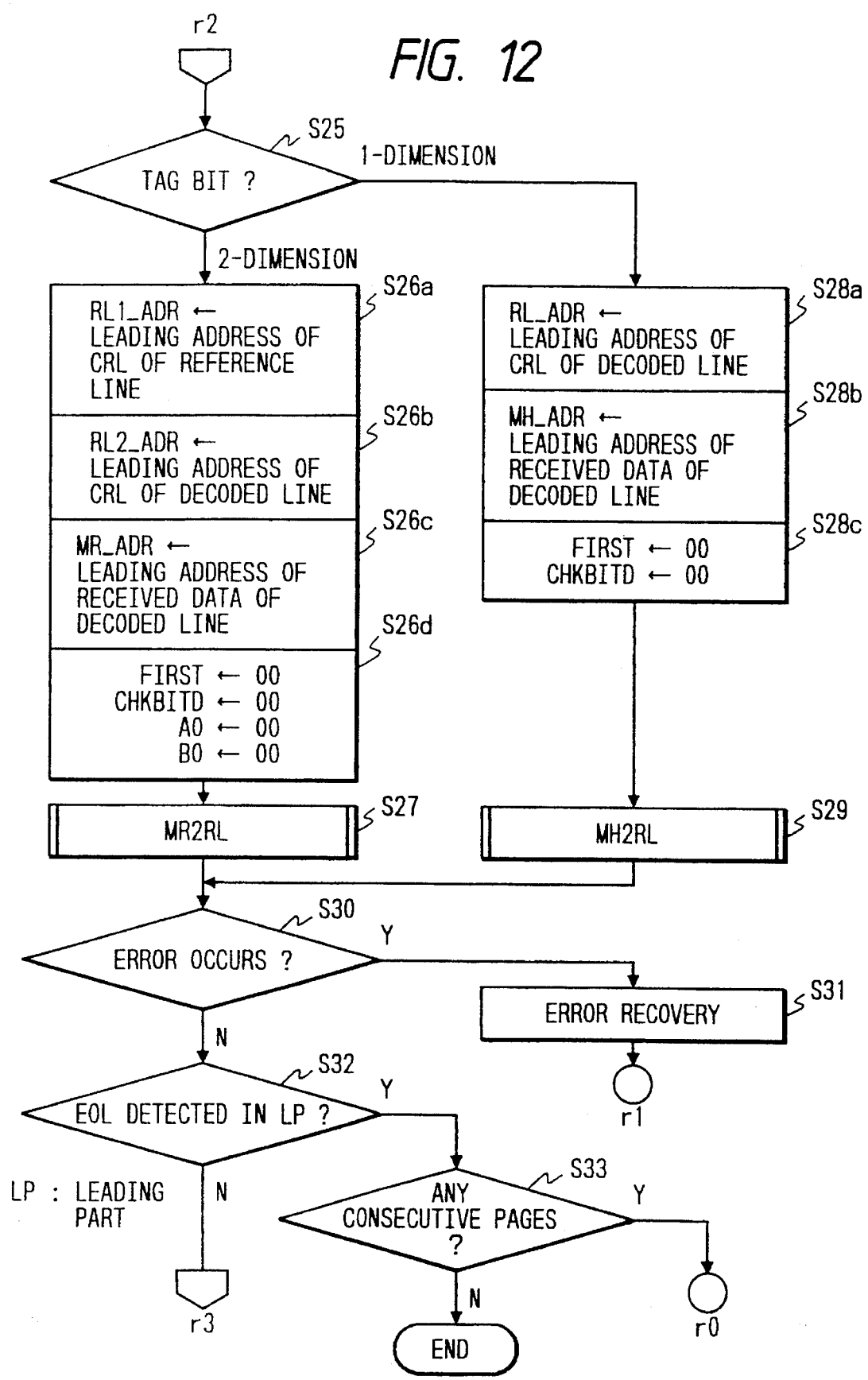

Then, as illustrated in FIG. 12, if a tag bit is 0, an operation corresponding to two-dimensional data (namely, an MR code) is selected in step S25. To perform a conversion MR2RL, a leading address of a cumulative run-length code corresponding to a reference line is set in step S26a and a leading address of a cumulative run-length code corresponding to a decoded line is set in step S26b. Further, a leading address of received data of a line to be decoded is set in step S26c. Then, data 00 is set in each of the working areas "first", CHKBITD, A0 and B0 in step S26d. Subsequently, the conversion MR2R1 (to be described later) is effected. On the other hand, if a tag bit is 1, an operation corresponding to one-dimensional data (namely, an MH code) is selected in,step S25. Then, a leading address of a cumulative run-length code corresponding to a decoded line is set in step S28a. Further, a leading address of received data of a line to be decoded is set in step S28b. Then, data 00 is set in each of the working areas "first" and CHKBITD in step S28c to perform initialization. Subsequently, the conversion MH2R1 (to be described later) is effected in step S29.

Then, in step S30, it is checked whether or not an error occurs in the conversion MR2R1 and MH2RL. If occurs, an error recovery processing is effected in step S31.

Figure 14:
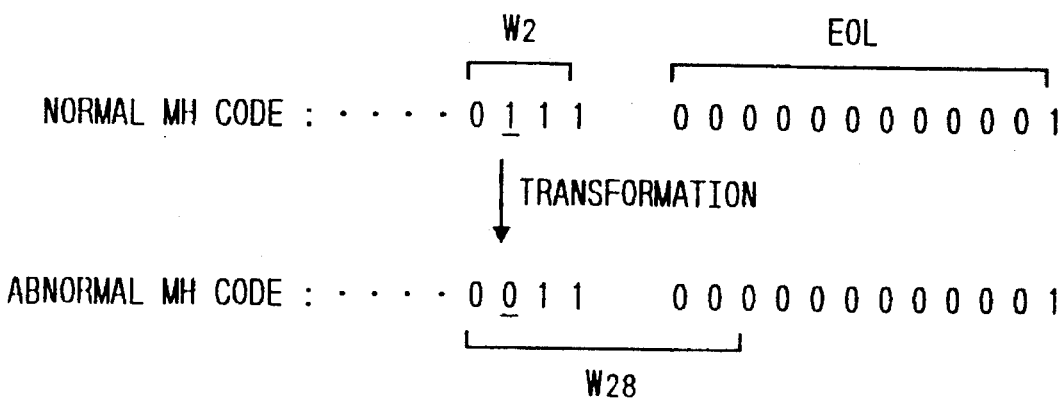
FIG. 14 is a diagram for illustrating an example of an occurrence of an error.

FIG. 14 illustrates an example of a processing to be performed in case where an error occurs. In this example, 1 line consists of 1728 bits. If the last data 0111 (corresponding to "W2" of the above described terminating codeword system of the T. 4 Recommendation of CCITT) is transformed into 0011 due to some cause, a string of bits 0011000 obtained by adding a leading part 000 of EOL at the end of the line to the transformed data indicates W28 of the terminating codeword system of the T. 4 recommendation of CCITT. In this case, if the last data is W2, a resultant code of 1 line consists of 1728 bits. However, because the transformed data represents W28, the number of bits composing the resultant code becomes 1754 and thus exceeds the number of bits of 1 line (namely, 1728). Thus it is determined that an error has occurred. In this case, if a conversion of the next line is started from the remaining part 000000001 of EOL of the next line, which remains after the leading three bits 000 of this EOL are added to the transformed data 0011, no EOL can be detected. Thus, it will be also determined in case of a conversion of the next line that an error occurs. This, however, can be prevented by turning back a starting bit of data to be first converted in the conversion of the next line by three bits (in this case, the leading three bits 000 of the EOL of the next line), namely, by commencing the conversion of the next line from the leading part of the EOL thereof (000000000001). The reason why the number of bits to be turned back is determined to be three is because of the fact that it is most frequent for the terminating codes, the second half of each of which includes successive zeroes, to have three successive zeroes in the second half thereof, according to the terminating-code table specified by the T.4 Recommendation of CCITT.

If no error is detected in step S30, it is determined in step S32 whether or not another EOL is detected in a leading portion of data to be searched. If another EOL is detected therein, it is further determined whether or not there are consecutive pages. If consecutive pages are present, it is determined in step S33 that the program returns to step S22. If not present, the processing is finished. Further, if no EOL is detected in the leading portion of the data to be searched, the next processing is started.

Figure 13:
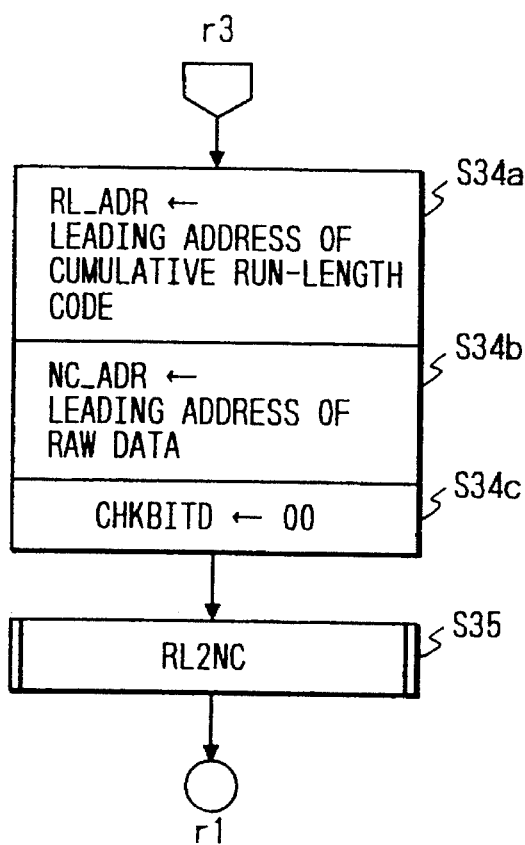

Next, as illustrated in FIG. 13, for the purpose of making preparations for a conversion RL2NC, a leading address of a cumulative run-length code is set in step S34a and a leading address of the raw data is set in step S34b. Further, data 00 is set in the working area CHKBITD in step S34c and the conversion RL2NC is effected in step S35. Upon completion of this conversion, a processing of a subsequent line is started.

Next, the details of the conversions occurring in the transmission/reception will be described hereinafter. First, a conversion from raw data NC to a cumulative run-length will be described hereunder.

Figure 15A:
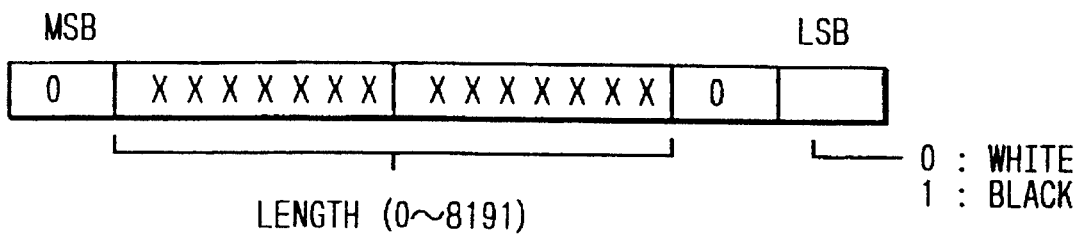
FIGS. 15(a)–(c) are a diagram for illustrating a format of a cumulative run-length code.
Figure 15B:
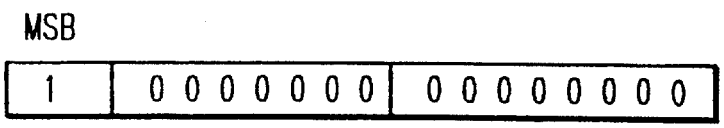
Figure 15C:
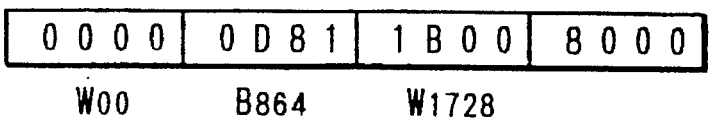

FIG. 15 illustrates the contents of the run-length table code. Namely, as shown in FIG. 15(a), the cumulative run-length code RL is comprised of 2 bytes and the run length is accumulated as described by referring to FIG. 2. The most significant bit (MSB) of each run-length code is 0, while the MSB of the terminating code of FIG. 15(b) is 1. Further, the least significant bit (LSB) of the run-length code corresponding to a white pixel is 0. Moreover, the LSB of the run-length code corresponding to a black pixel is 1. Furthermore, the next bit on the left side of LSB is always zero. Moreover, intermediate 13 bits are used to represent the run length "Length". Thus, the value of the run length of from, 0 to 8191 can be represented. FIG. 16(c) shows a practical example of the run-length table code, namely, the run-length table corresponding to raw data of 1 line which consists of 864 bits corresponding to black pixels and 864 bits corresponding to white pixels.

The conversion NC2RL will be summarized as follows. First, the raw data of 1 line is read one byte by one byte. Then, a run-length table code RL corresponding to 1 line of the raw data is produced detecting transition points. Further, data 8000 is stored in the last word of the run-length table code as a terminating code representing the end of 1 line.

When raw data of all bits of 1 line is read, the conversion is then finished. Further, interruptions are sampled each time 1 byte of raw data is read.

Figure 16:
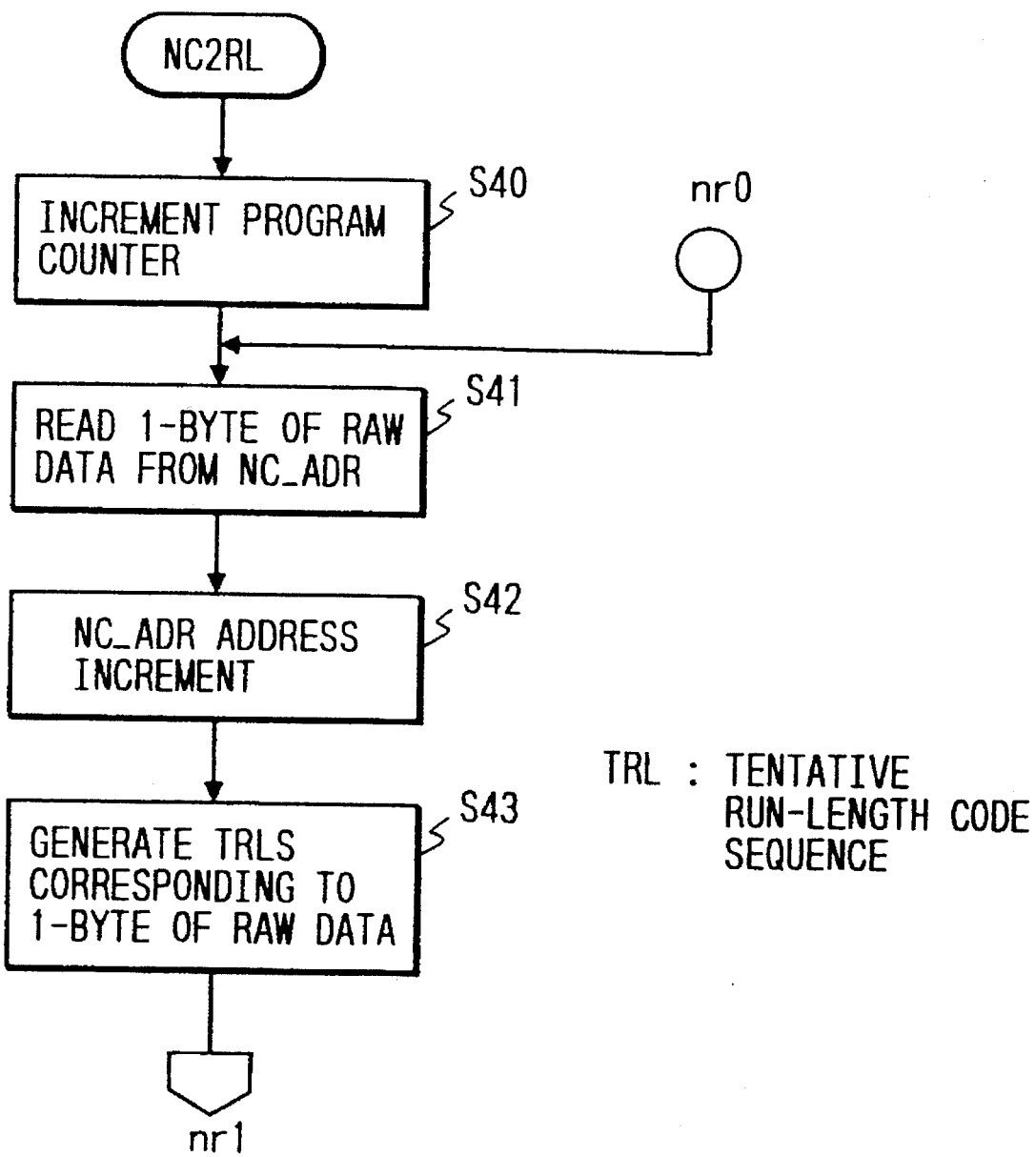
FIGS. 16, 17 and 18 are flowcharts for Illustrating an operation of converting raw data NC to cumulative run-length code RL.
Figure 17:
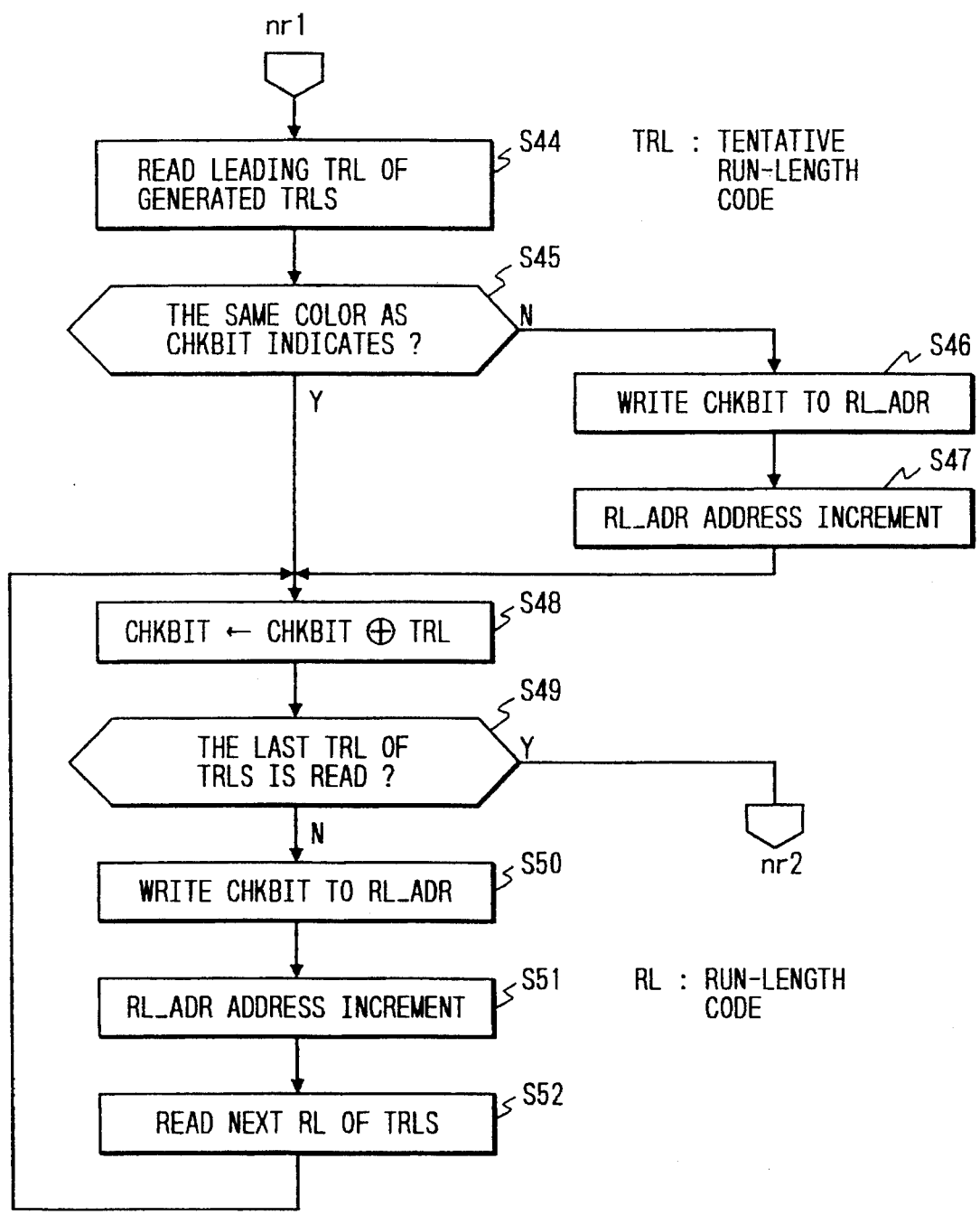
Figure 18:
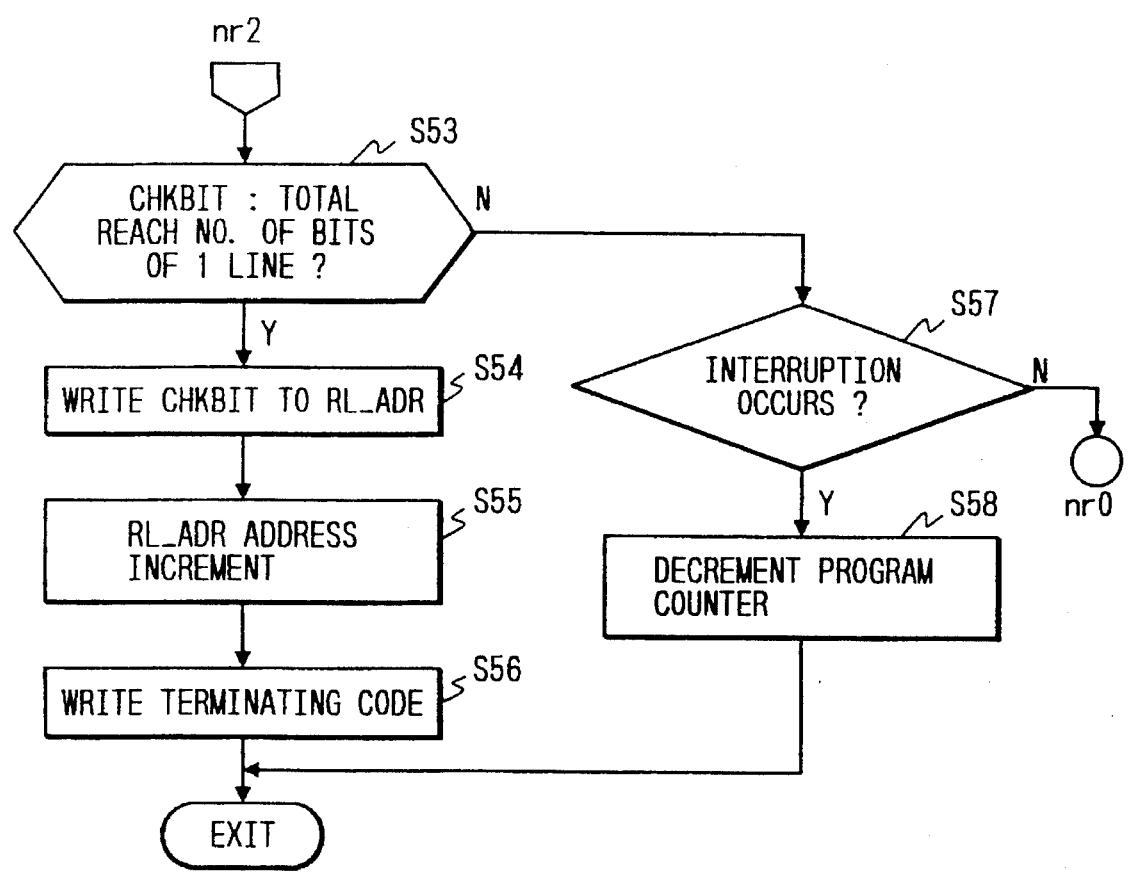
Figure 21:
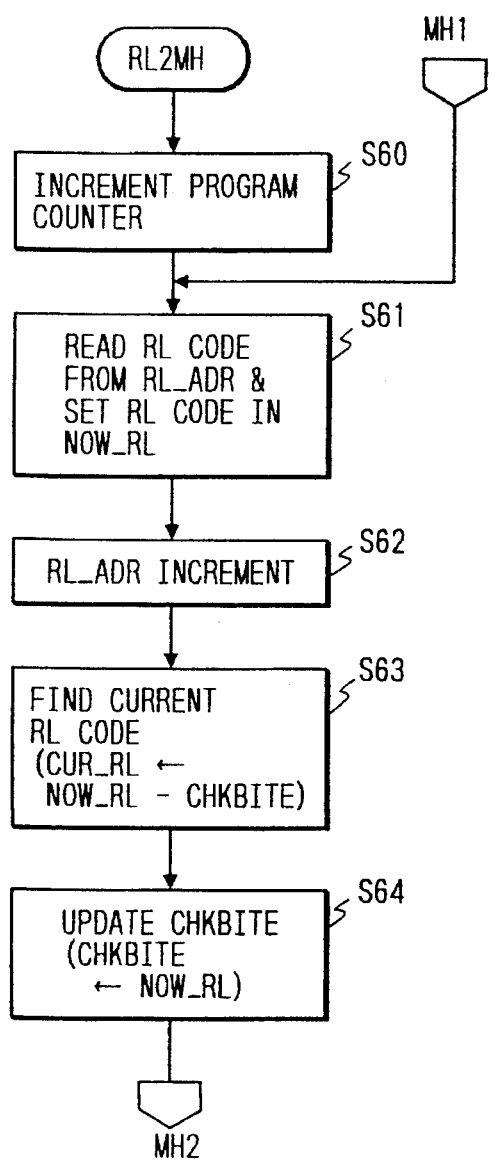
FIGS. 21 to 28 are flowcharts for illustrating an operation of converting cumulative run-length code to an MH code.

FIGS. 16 to 18 are flowcharts for illustrating the conversion NC2RL.

As shown in FIG. 16, when the facsimile is instructed to perform a conversion from raw data to a cumulative run-length code, a program counter is incremented in step S40 for turning to the next program when this processing is completed. Then, in step S41, 1 byte of the raw data from the address "NC ADR", which has been read by a scanner and stored in the buffer memory, is read. Further, the address "NC ADR" is incremented in step S42 for making preparations for the next reading of the raw data.

FIG. 19 shows the contents of a table used for converting raw data to an cumulative run-length code. As shown in FIG. 19(a), 256 states represented by 8 bits of read raw data are addressed therein. FIG. 19(b) shows combinations of strings of bits corresponding to black pixels (hereunder sometimes referred to as black bit strings) and strings of bits corresponding to white pixels (hereunder sometimes referred to as white bit strings), which correspond to such addresses, respectively. In FIG. 19(b), numeral described in each cell of a central column indicates the number of white and black bit strings included in a corresponding state (or address). Further, at the right side of each cell of the central column, the arrangement of corresponding 8-bit white bit strings /8-bit black bit strings is shown. For instance, in case of an address 1, there are two bit strings, namely, an 8-bit black bit string, in which only one bit (hereunder sometimes referred to as a black bit) corresponds to a black pixel, and an 8-bit white bit string, in which seven bits (hereunder sometimes referred to as a white bit) correspond to white pixels. Such a white or black bit string will be referred to as a tentative run-length hereinafter. Thus a code sequence of tentative run-length codes, each of which corresponds to 1 byte of the raw data, is obtained from this table in step S43.

Subsequently, as shown in FIG. 17, a leading tentative run-length code of the tentative run-length code sequence produced from a table of FIG. 19 is read in step S44 whereupon it is checked whether or not the color indicated by the read code is the same as that represented by the data, which is stored in the area CHKBIT in step S4d of FIG. 7. If the same, it is determined that the tentative run-length code including an eighth bit of the preceding raw data and the leading tentative run-length code correspond to the same run or string of bits (namely, white or black pixels). If not the same, the eighth bit of the preceding raw data is the last bit of a cumulative run-length RL. Therefore, in the latter case (namely, if not the same), the stored data CHKBIT is written to a location corresponding to the address "RL ADR" in step S46 as the cumulative run-length code. Then, the address "RL ADR" is incremented in step S47 in such a fashion that the next cumulative run-length code can be written thereto.

In the former case, the data stored in the area CHKBIT should be followed by the tentative run-length code generated from the table of FIG. 19 and thus this tentative run-length code is added thereto in step S48.

FIG. 20 is a diagram for illustrating an addition and a subtraction between the data $\underline{a}$ stored in the area CHKBIT and the tentative run-length code $\underline{b}$. If added, a value obtained as a result of the addition becomes $(n_1 + n_2)$ and the color indicated by 0th bit is $\underline{b}$. In contrast, if subtracted, a value obtained as a result of the subtraction becomes $(n_1 + n_2)$ and the color becomes $\underline{a}$ indicated by the data stored in the area CHKBIT. In case where there are many tentative run-length code sequences as an address 85 of FIG. 19, a cumulative run-length is generated correspondingly to each tentative run-length code sequence RL. Therefore, it is checked in step S49 whether or not the last run-length code of the tentative run-length code sequence is read. If the last run-length code is not read, the cumulative run-length code obtained in step S48 is written to the address "RL ADR" i step S50. Then, the next address "RL ADR" is prepared in step S51, and further the next tentative run-length code sequence is read in step S52. Subsequently, the program turns back to step S48, whereupon the read code is added to the data stored in the area CHKBIT to make the cumulative run-length code RL.

Then, as shown in FIG. 18, it is checked in step S53 whether or not the value of the CHKBIT, in which the cumulative run-length code RL is stored, reaches the number of bits established in step S4c of FIG. 7. If reaches, the contents of the area CHKBIT, in which the last code RL corresponding to this line is stored, are written to the address "RL APR" in step S54. Subsequently, the address "RL ADR" is incremented for making preparations for a writing of the next code RL in step S55. Then, in step C56, a writing of a terminating code is effected.

If not reach in step S53, it is checked in step S57 before reading the next byte of the raw, data whether or not an interruption is caused. If caused, the program counter, which has been incremented in step S40 of FIG. 16, is decreased in step S58 to the value held therein before incremented. This is because the processing of 1 line is not finished and thus a processing by the next program cannot be started.

Next, another conversion RL2MH (see step S10) of FIG. 8 will be described hereinbelow.

In case of this conversion RL2MH, a run-length code RL corresponding to 1 line of the raw data is first converted into an MH code by referring to a conversion or translation table. When run-length codes of all bits of 1 line is read, the conversion is then finished. Further, interruptions are sampled each time a cumulative run-length code corresponding to a transition point is processed.

FIGS. 21 to 28 are flowcharts for illustrating the conversion RL2MH.

When the facsimile is instructed to perform a conversion from a cumulative run-length code RL to an MH code, a program counter is incremented in step S60 in such a manner that the next program can be executed. Then, in step S61, a cumulative run-length code RL is read from the address "RL ADR" set in step S8a of FIG. 8 and is then set in the working area "NOW RL". Further, in step S62, the address "RL ADR" is incremented. Here, a tentative run-length code, which has been described by referring to FIG. 19, namely, B3, W2 or the like of the raw data of FIG. 2 is referred to as a current RL code and is represented by "CUR RL". This "CUR RL" is obtained as the difference between an RL and a just preceding RL. Namely, the "CUR RL" is obtained in step S63 by subtracting the value indicated by the area CHKBITE, which is defined in step S8c of FIG. 8 and an RL just prior to the "NOW RL", from the "NOW RL". Further, the contents of the area CHKBITE is updated by the value indicated by the area "NOW RL" in step S64.

Figure 22:
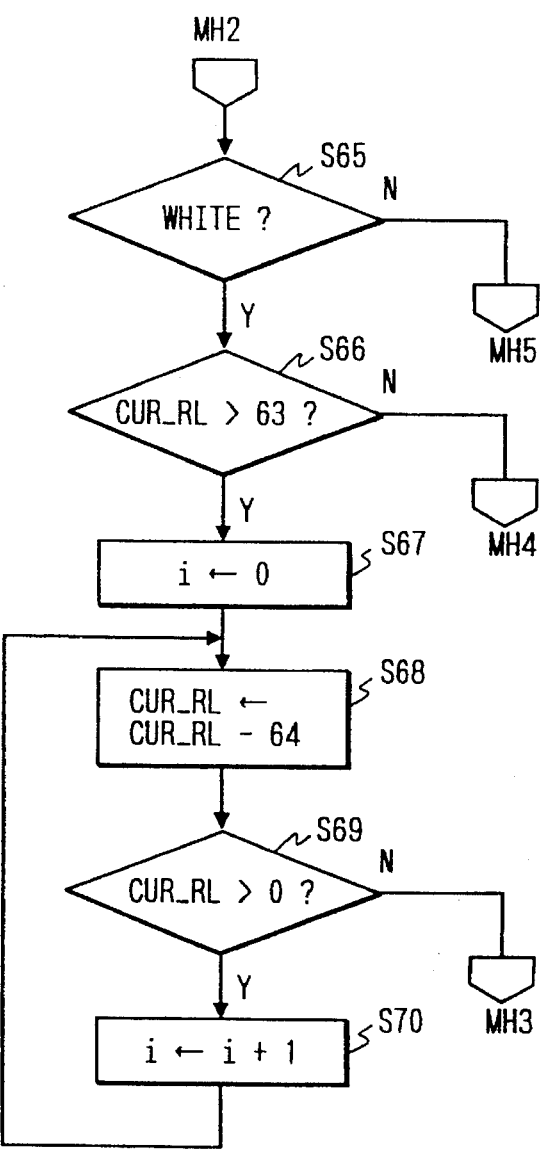

As shown in FIG. 22, it is determined in step S65 whether or not the obtained "CUR RL" corresponds to white pixels. If corresponds to white pixels, it is judged in step S66 whether or not the "CUR RL" is represented only by terminating codes specified by the T.4 Recommendation of CCITT (namely, is less than 64) or whether or not what is called making-up codes are required for representing the "CUR RL" in addition to the terminating codes. If equal to or greater than 64, the value of the "CUR RL" is counted as that of "i" to find how many times as large as 64 the "CUR RL" is and to obtain the making-up codes (see steps 67 to 70).

Figure 23:
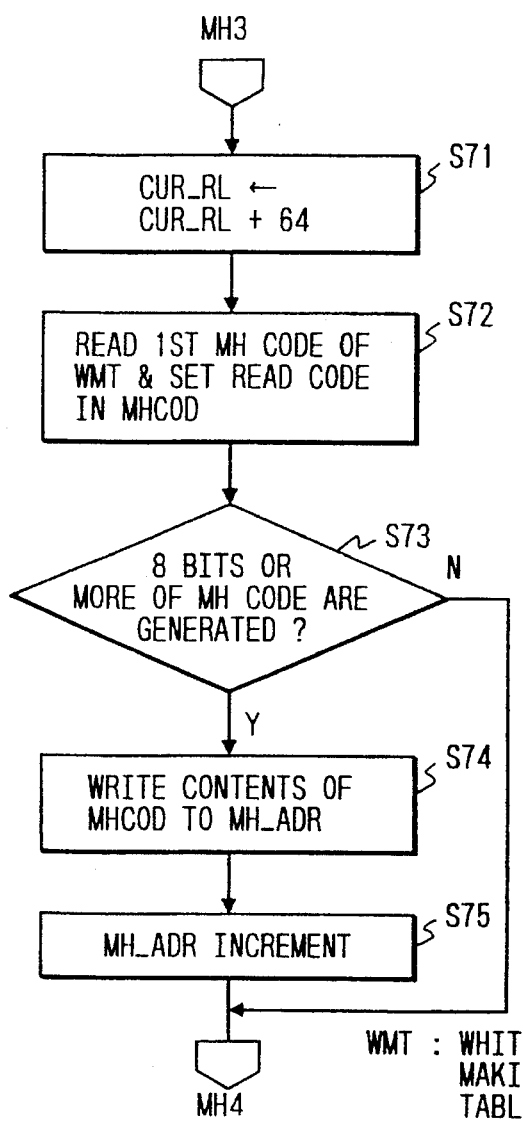

As shown in FIG. 23, if equal to or less than 0, 64 is added in step S71 to the "CUR RL" in such a manner that the terminating code table can be read.

FIG. 29 shows a white terminating-code table and a white making-up code table. Incidentally, in these tables, x denotes an indefinite number. Further, "effective bit No." indicates the number of effective bits in a corresponding 16-bit MH code. Furthermore, each MH code is represented in what is called an "LSB First" manner, in which all bits are arranged in inverse order in comparison with the representation thereof employed in the table of the T.4 Recommendation of CCITT. First, an ith MH code (see FIG. 22) is read from the white making-up code table of FIG. 29(b) and is then written to an address "MH ADR" set in step S8b of FIG. 8. In this embodiment, it is predetermined that an area MHCOD is treated such that each 8-bit region thereof is addressed. Thus the area MHCOD is partitioned into groups of 8-bit subareas. Therefore, it is checked in step S73 whether or not the number of bits of an MH code becomes equal to or greater than 8. If equal to or greater than 8, data represented by 8 bits of the area MHCOD is written to the address "MH ADR". Further, the address "MH ADR" is incremented in step S75 to obtain the next address.

Figure 24:
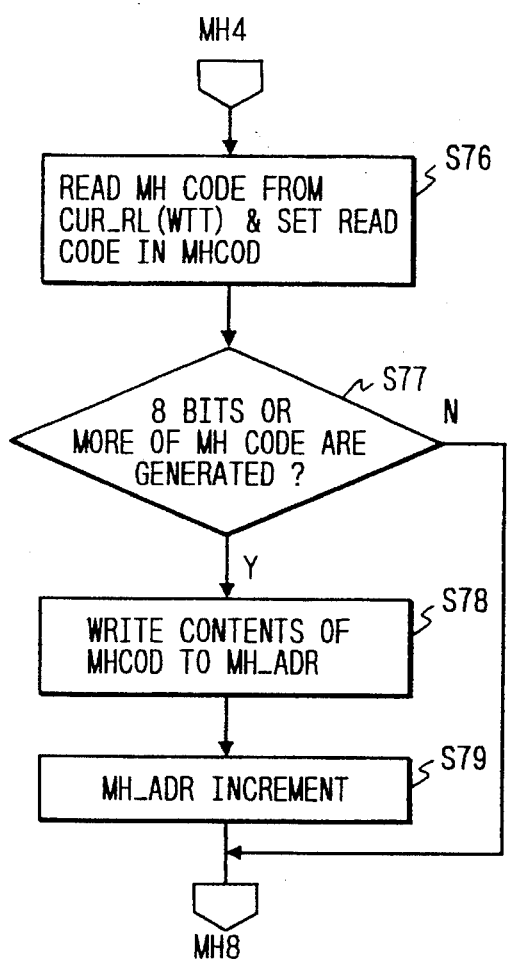

As shown in FIG. 24, when it is determined in step S66 of FIG. 22 that the "CUR RL" is equal to or less than 63, or when the processing of FIG. 23 is completed, an MH code is read from FIG. 29(a) correspondingly to the "CUR RL" and then is set in the area MHCOD in step S76. If it is found in step S78 that the number of bits of the MH code is equal to or greater than 8, 8 bits thereof are written to the address "MH ADR" in step S78 and further the address "MH APR" is incremented in step S79.

Figure 25:
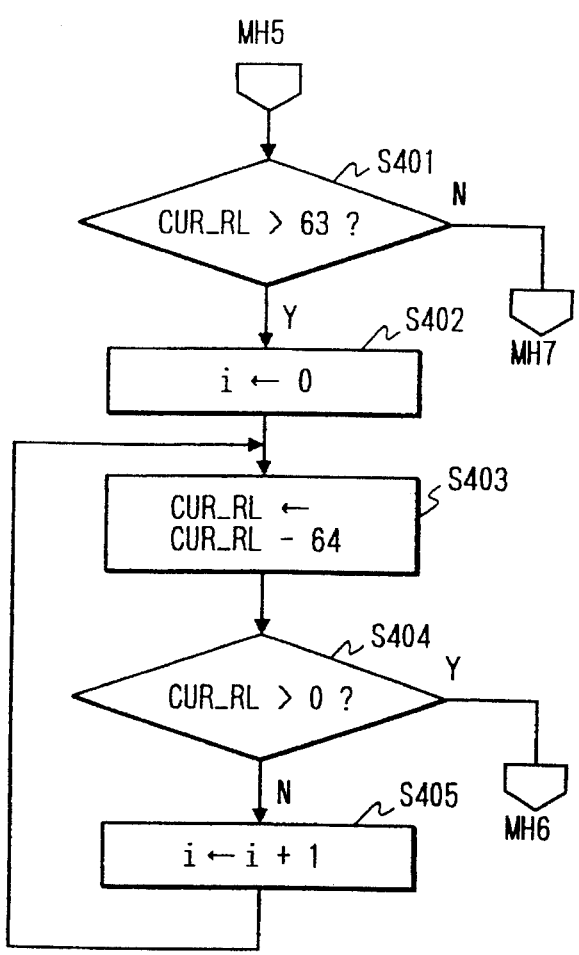
Figure 26:
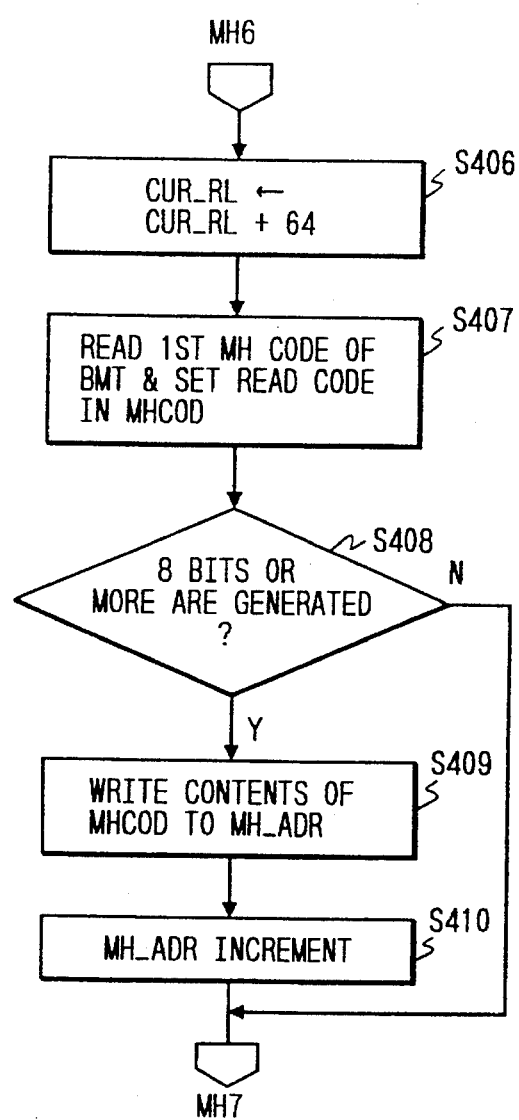
Figure 27:
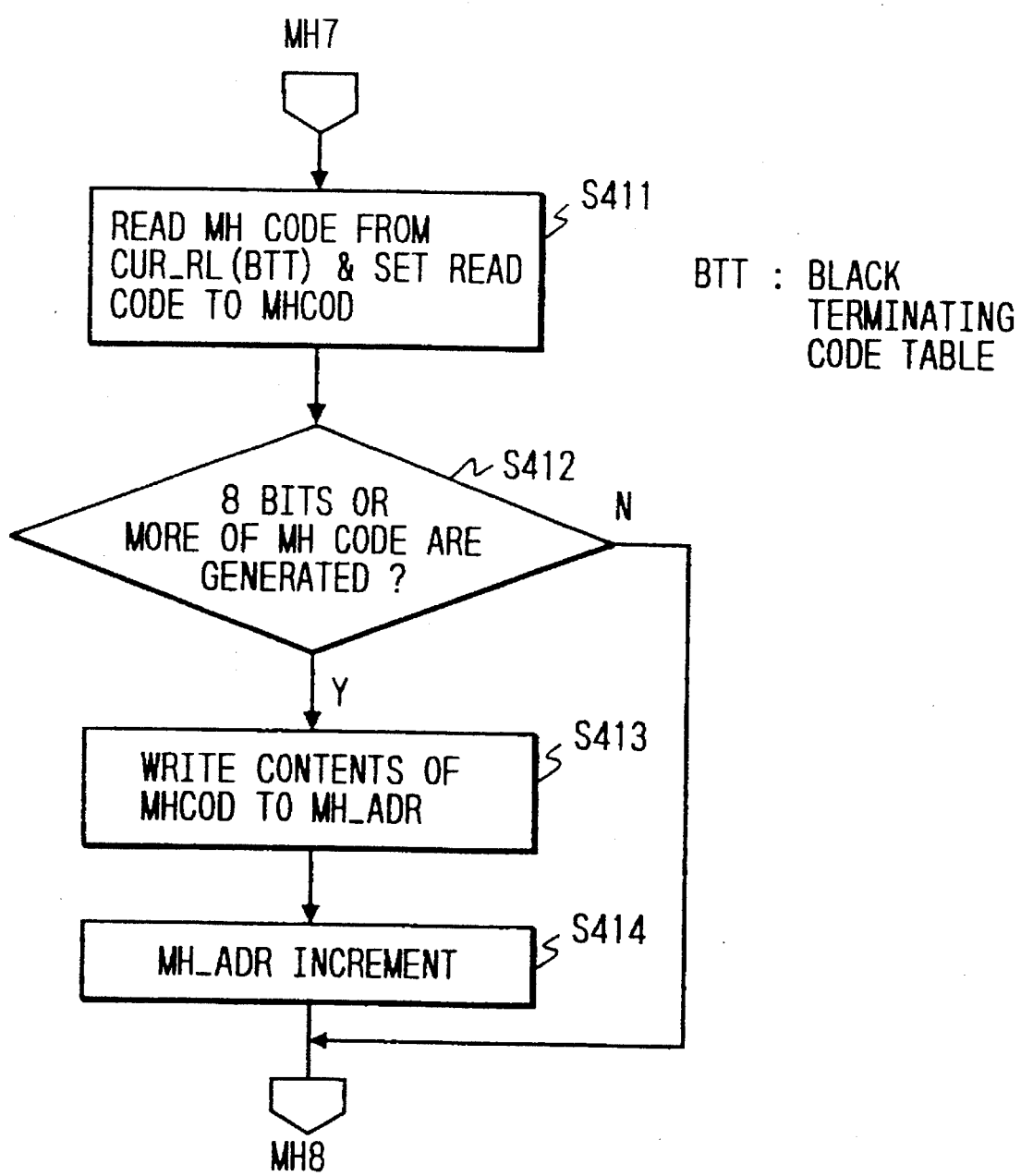

FIGS. 25 to 27 illustrates a process in case where it is found in step S65 that the "CUR RL" corresponds to a run of black pixels (namely, a black bit string). The contents of the process of FIGS. 25 to 27 (namely, steps S401 to S414) are similar to those of the above described process of FIGS. 22 to 24. Further, FIG. 30(a) shows a black terminating code table; and FIG. 30(b) a black making-up code table. incidentally, in these tables, x denotes an indefinite number. Further, "effective bit No." indicates the number of effective bits in a corresponding 16-bit MH code. Furthermore, each MH code is represented in what is called an "LSB First" manner, in which all bits are arranged in inverse order in comparison with the representation thereof employed in the table of the T.4 Recommendation of CCITT.

Figure 28:
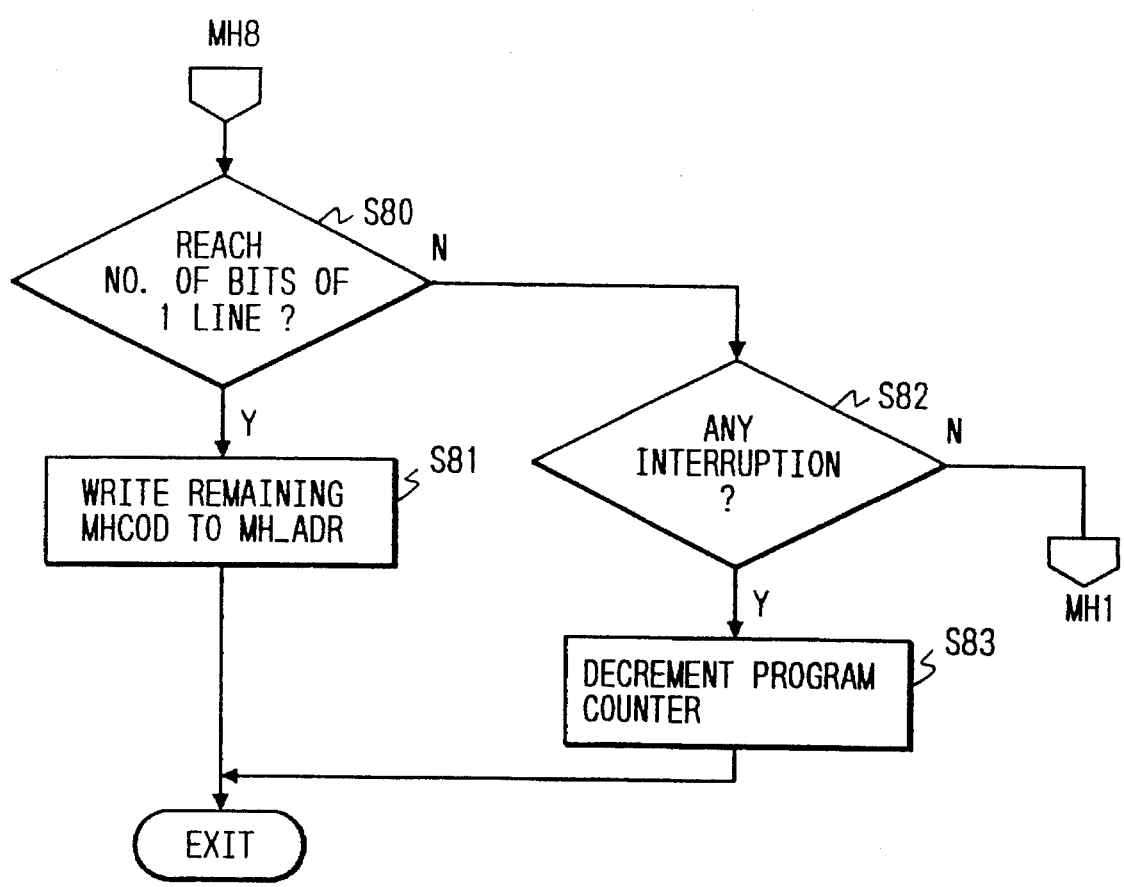

Then, as shown in FIG. 28, it is checked in step S80 whether or not the number of bits of the MH code reaches the number of bits of 1 line, which is set in step S4c of FIG. 7. If reaches, the remaining bits of the data stored in the area MHCOD are written to the address "MH ADR" in step S81. Thus the processing of 1 line is completed. In contrast, if not reach, it is checked, in step S82 whether or not an interruption is caused. If an interruption is caused, the program counter is decremented back in step S83.

Next, the conversion RL2MR of step S13 of FIG. 8 will be described hereinbelow.

In case of this conversion RL2MR, a run-length code RL corresponding to 1 line of the raw data is first converted into an MR code by comparing this code RL of 1 line with another cumulative run-length Code (RL) of a reference line. When run-length codes of all bits of 1 line is read, the conversion is then finished. Further, interruptions are sampled each time a processing of each of vertical, horizontal and path modes is finished.

Figure 31:
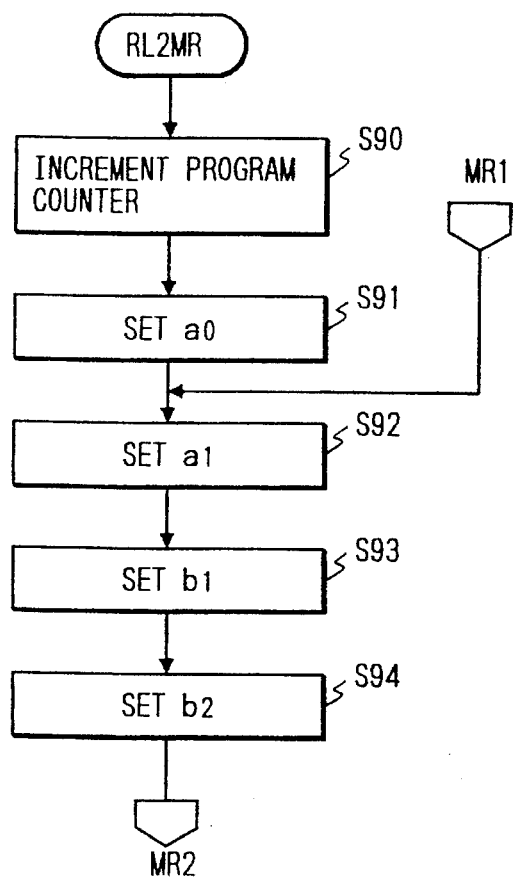
FIGS. 31 to 40 are flowcharts for illustrating an operation of converting a cumulative run-length code to an MR code.

FIGS. 31 to 40 are flowcharts for illustrating the conversion RL2MR. As shown in FIG. 31, when the facsimile is instructed to perform a conversion from a cumulative run-length code RL to an MR code, a program counter is incremented in step S90 in such a manner that the next program can be executed after this conversion processing is completed. Further, parameters (namely, pixels or points) $a_o$, $a_1$, $b_1$ and $b_2$, which are necessary for performing a conversion from the code RL to an MR code, are set in steps S91 to S94. Incidentally, the setting of these pixels will be described in detail later.

Figure 32:
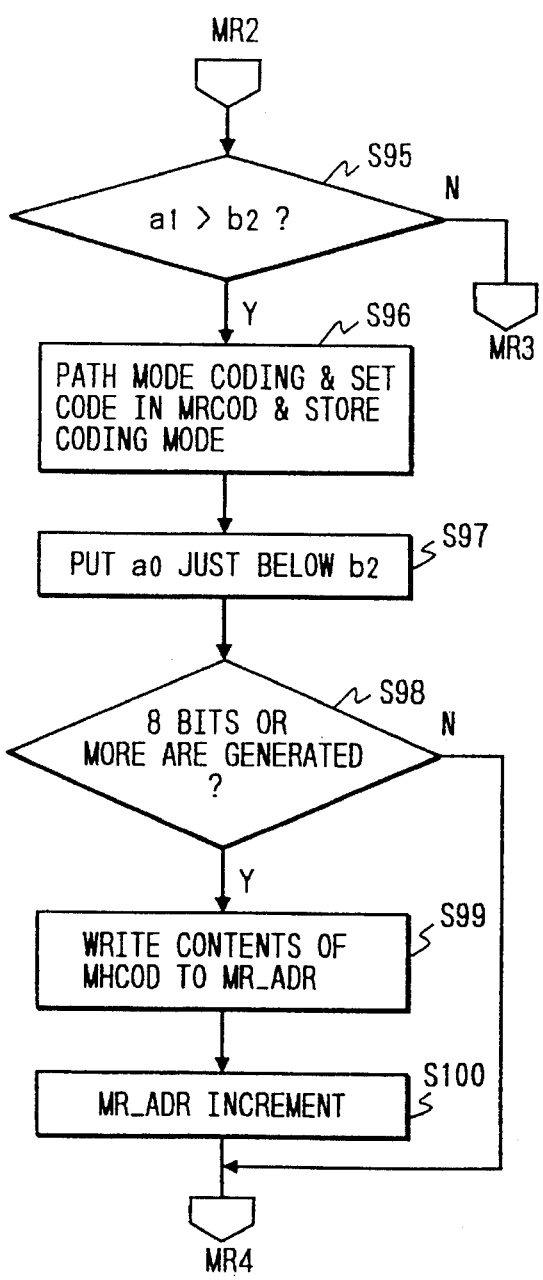

Subsequently, as shown in FIG. 32, it is checked in step S95 whether or not the parameter (namely, pixel or point) $a_1$ is larger than the parameter $b_2$, for the purpose of examining whether or not it is in a path mode. If in a path mode, a path-mode coding is effected and a result thereof is set in the area MRCOD in step S96. Subsequently, the point $a_o$ is put just below the point $b_2$ in step S97. If it is found in step S98 that the number of bits of the MR code is equal to or greater than 8, the data stored in the area MRCOD is written to the address "MR ADR" in step S99 and further the address "MR ADR" is incremented in step S100.

Figure 33:
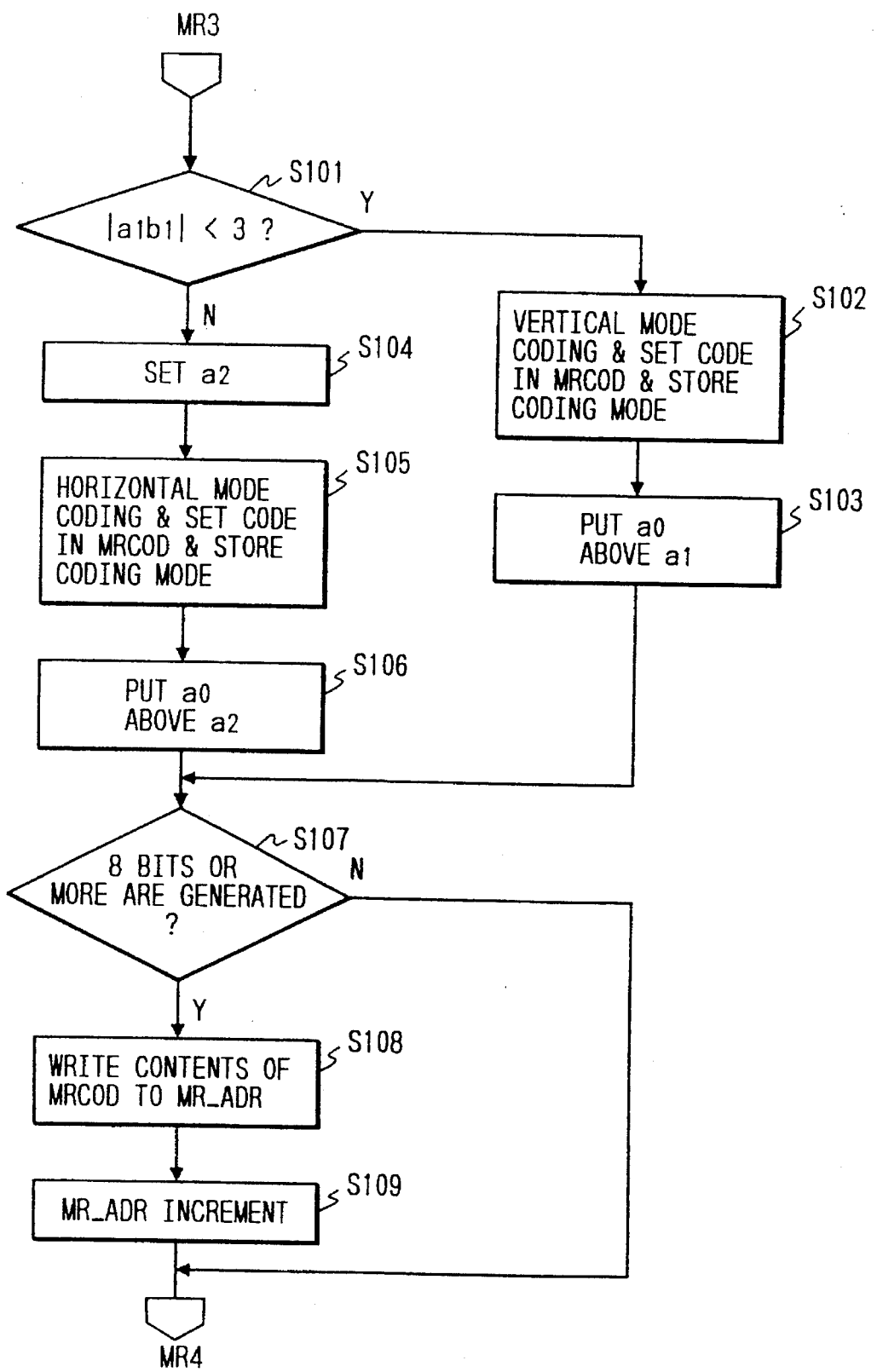

Then, as shown in FIG. 33, in case where it is found in step S95 that the facsimile is not in the path mode, it is checked in step S101 whether the facsimile is in a vertical mode. If in the vertical mode, a vertical-mode coding is effected and a result thereof is set in the area MRCOD in step S102. Thereafter, the point $a_o$ is put above the point $a_1$ in step S103. If not in the vertical mode, it is concluded that the facsimile is in a horizontal mode. Thus the point $a_2$ is set in step S104. Then, a horizontal-mode coding is effected and a result of thereof is set in the area MRCOD in step S105. Thereafter, the parameter or point $a_2$ becomes a new starting pixel $a_o$, so that the point $a_o$ is put on the point $a_2$ in step S196. If it is found in step S107 that the number of bits of the MR code is equal to or more than 8, 8 bits thereof are written to the address "MR ADR" in step S108. Moreover, in step S109, the address "MR ADR" is incremented.

Figure 34:
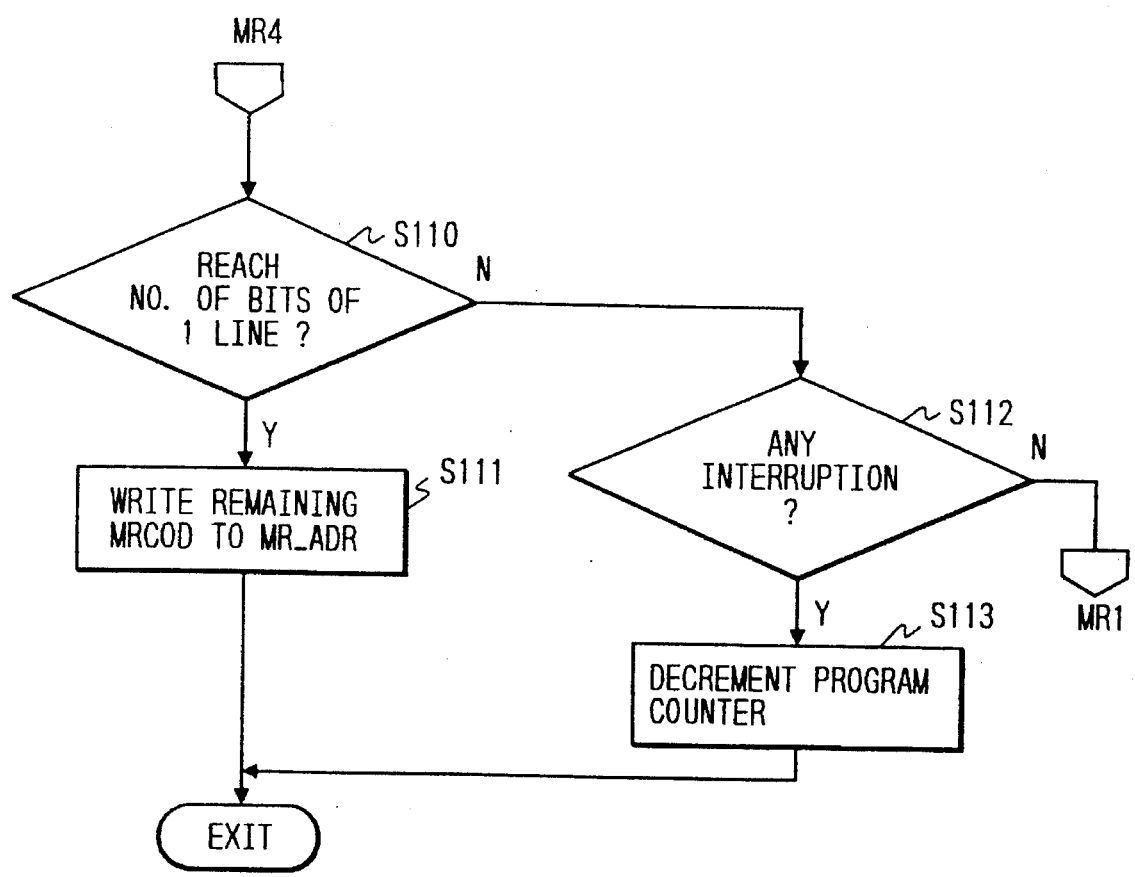

Subsequently, as shown in FIG. 34, it is checked in step S110 whether or not the number of bits of the MR code reaches the number of bits of 1 line, which is set in step S4c of FIG. 7. If reaches, the remaining of the bits of the area MRCOD are written to the address "MR ADR" in step S111. Then, the conversion is finished. In contrast, if not reach, it is further checked in step S112 whether or not an interruption occurs. If occurs, the program counter, which has been incremented in step S90 of FIG. 31, is decremented back in step S113.

Figure 35:
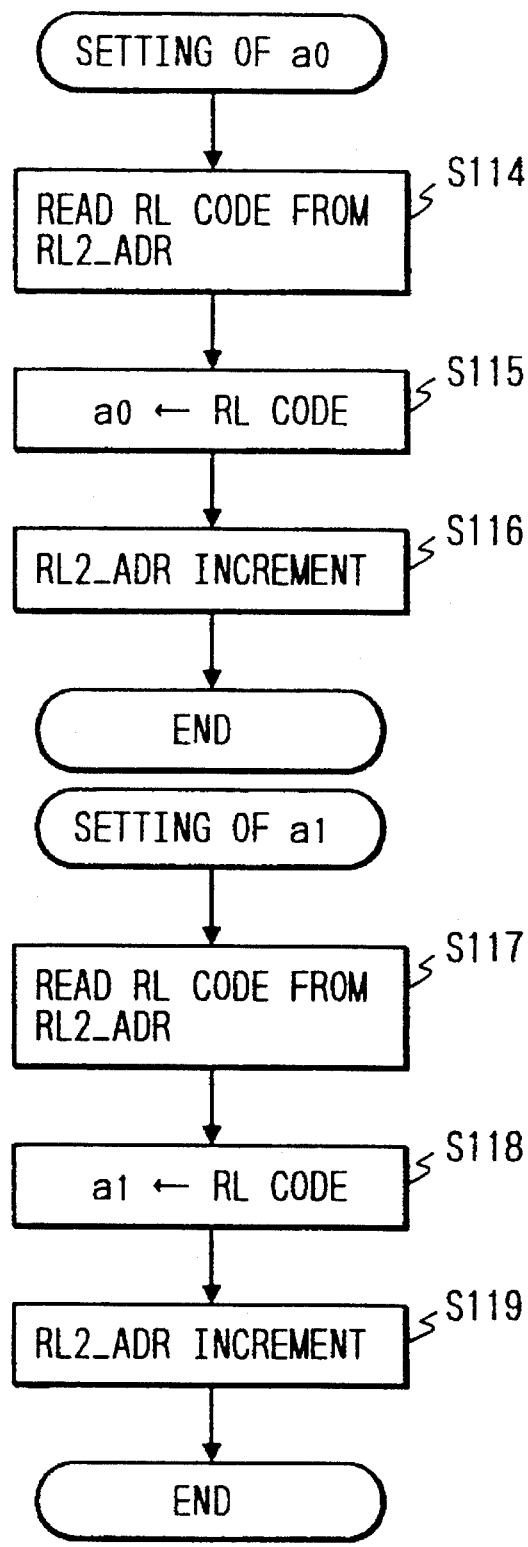

FIG. 35 illustrates how the parameters $a_o$ and $a_1$ of FIG. 31 are set. First, in step S114, the code RL is read from the address "RL2 ADR" corresponding to a line to be coded (hereunder referred to as a coded line), which is set in step S11b of FIG. 8. Then, this read cod RL is set as data representing the parameter $a_o$ in step S115. Subsequently, the address "RL2 ADR" is incremented in step S116.

Additionally, the parameter $a_1$ is set subsequently to the setting of the parameter $a_o$ as follows. First, the code RL is read from the address "RL2 ADR" corresponding to the coded line in step S117 and then ie set as data representing the parameter $a_1$ in step S118. Afterwards, the address "RL2 ADR" is incremented in step S119.

FIGS. 36 to 40 are flowcharts for illustrating how the parameter $b_1$ is set. Incidentally, when this parameter $b_1$ is definitely determined, the parameter $b_2$ can easily be set similarly as in case of setting the parameters $a_o$ and $a_1$ of FIG. 35.

Figure 36:
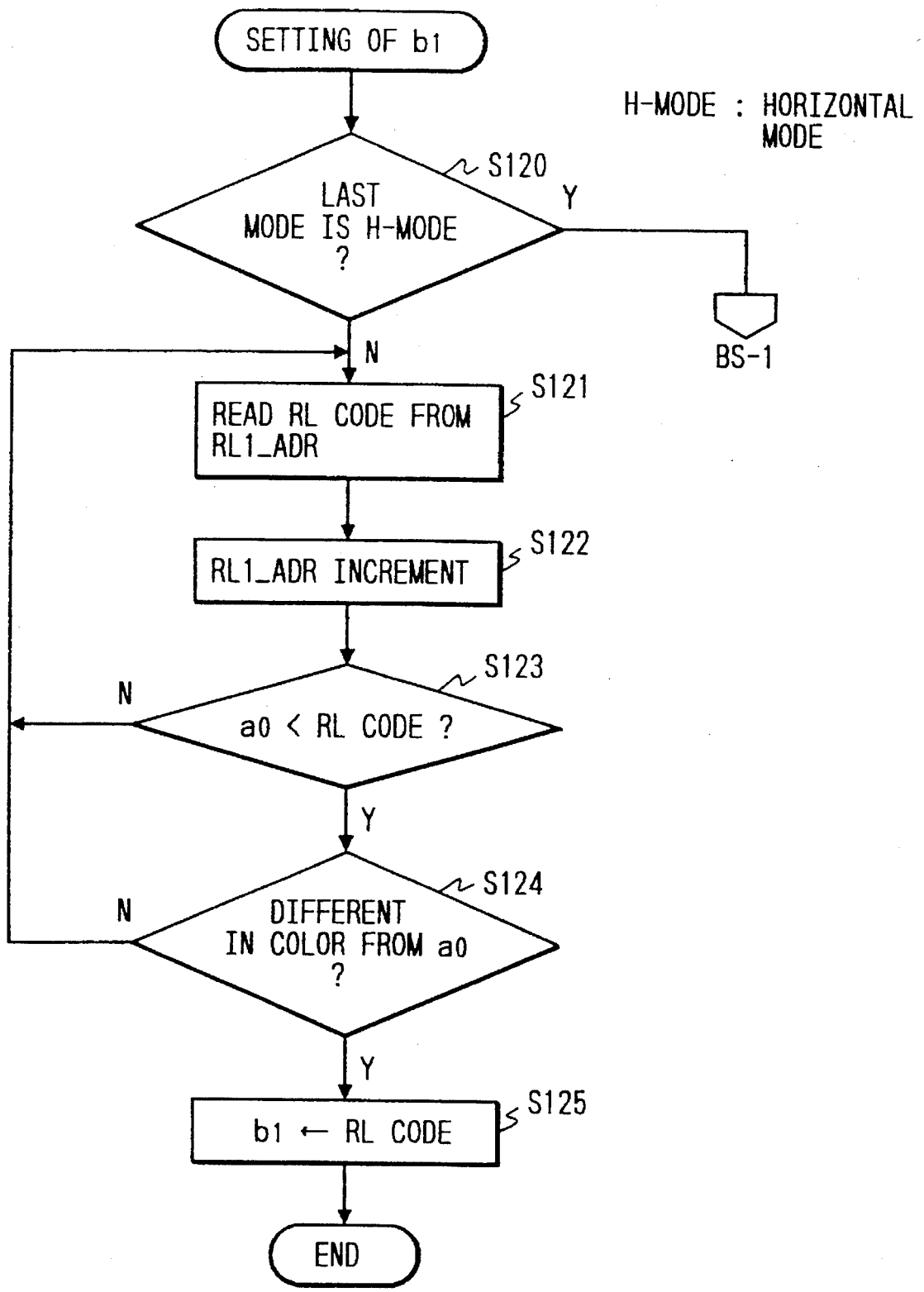

Then as illustrated in FIG. 36, it is checked in step S120 whether or not the last mode is the horizontal mode. If not, the code RL is read in step S121 from the address "RL1 ADR" corresponding to the reference line set in step S11a of FIG. 8. Then, the address "RL1 ADR" is incremented in step S122. If it is found in step 123 that the value indicated by the code RL is greater than the parameter $a_o$, and it is further found in step 124 that the color represented by the code RL is different from the color indicated by the parameter $a_o$, this code RL is set as the parameter $b_1$ in step S125.

Figure 37:
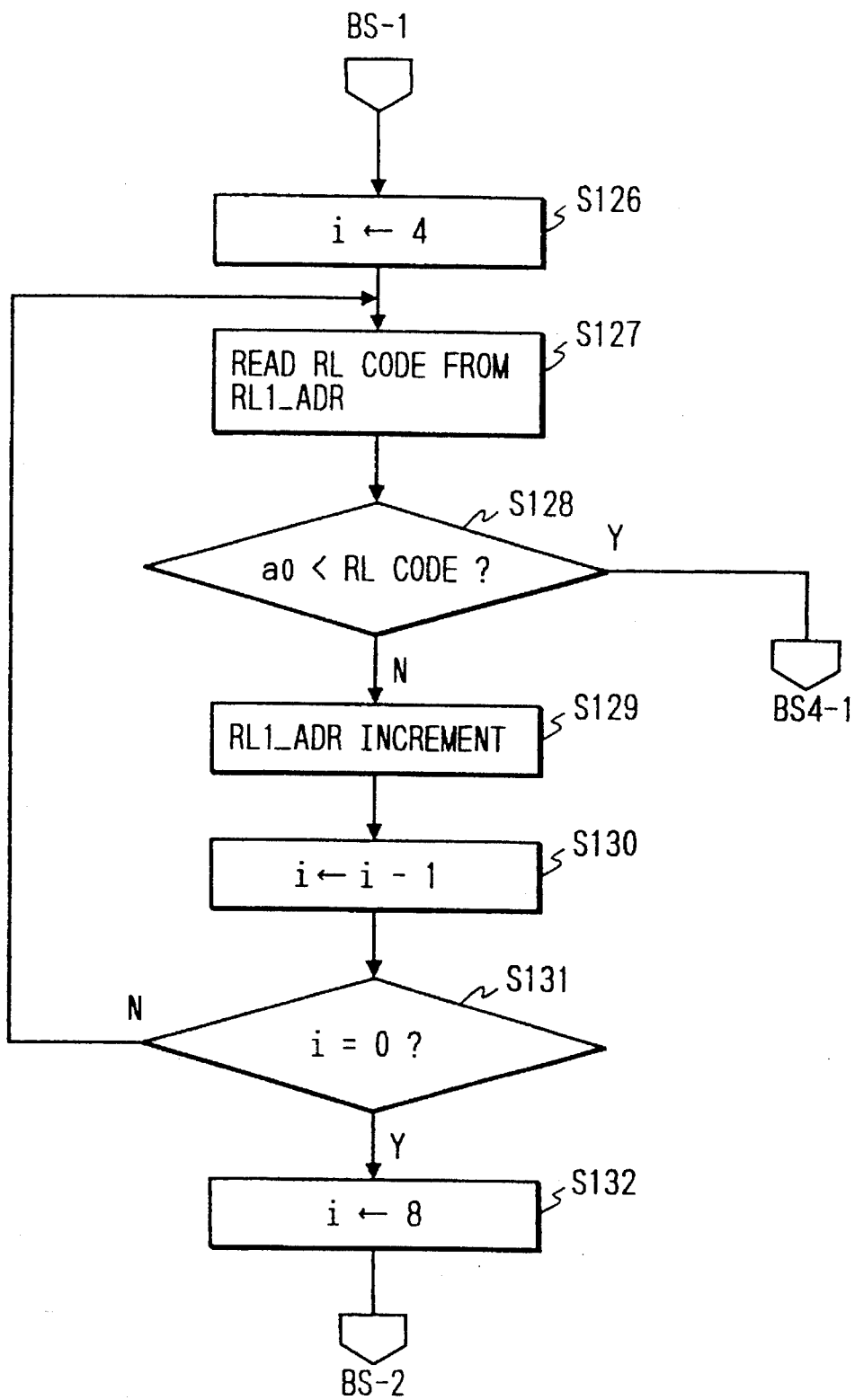

As shown in FIG. 37, if it is found in step S120 that the last mode is the horizontal mode, four of the codes RL from the code RL corresponding to the last reference line are serially read and are searched for the parameter $b_1$. The possibility of searching for or finding the code RL corresponding to the parameter $b_1$ is large. Even if not found, a binary search is performed.

Namely, first, the variable "i" representing the number of times of performing a binary search is set as 4 in step S126. Then, the code RL is read in step S127 from the address "RL1 ADR" corresponding to the reference line. Subsequently, it is checked in step S128 whether or not the code RL is greater than the parameter $a_o$. If less than the parameter $a_o$, the address "RL1 ADR" is incremented in step S129 and the variable "i" is decreased once in steps S130 and S131 for reading the next code RL. If the code RL is not greater than the parameter $a_o$ during this process is repeated four times, the variable "i" is set as 8 in step S132 in order to effect a binary search. The reason why the variable "i" is set as 8 is as follows. Namely, if the number of bits of 1 line is $2048=8\times2^8$, candidates for the parameter $b_1$ can be narrowed down to eight transition points at most. Thus the parameter $b_1$ can be surely detected by serially checking these eight transition points.

Figure 38:
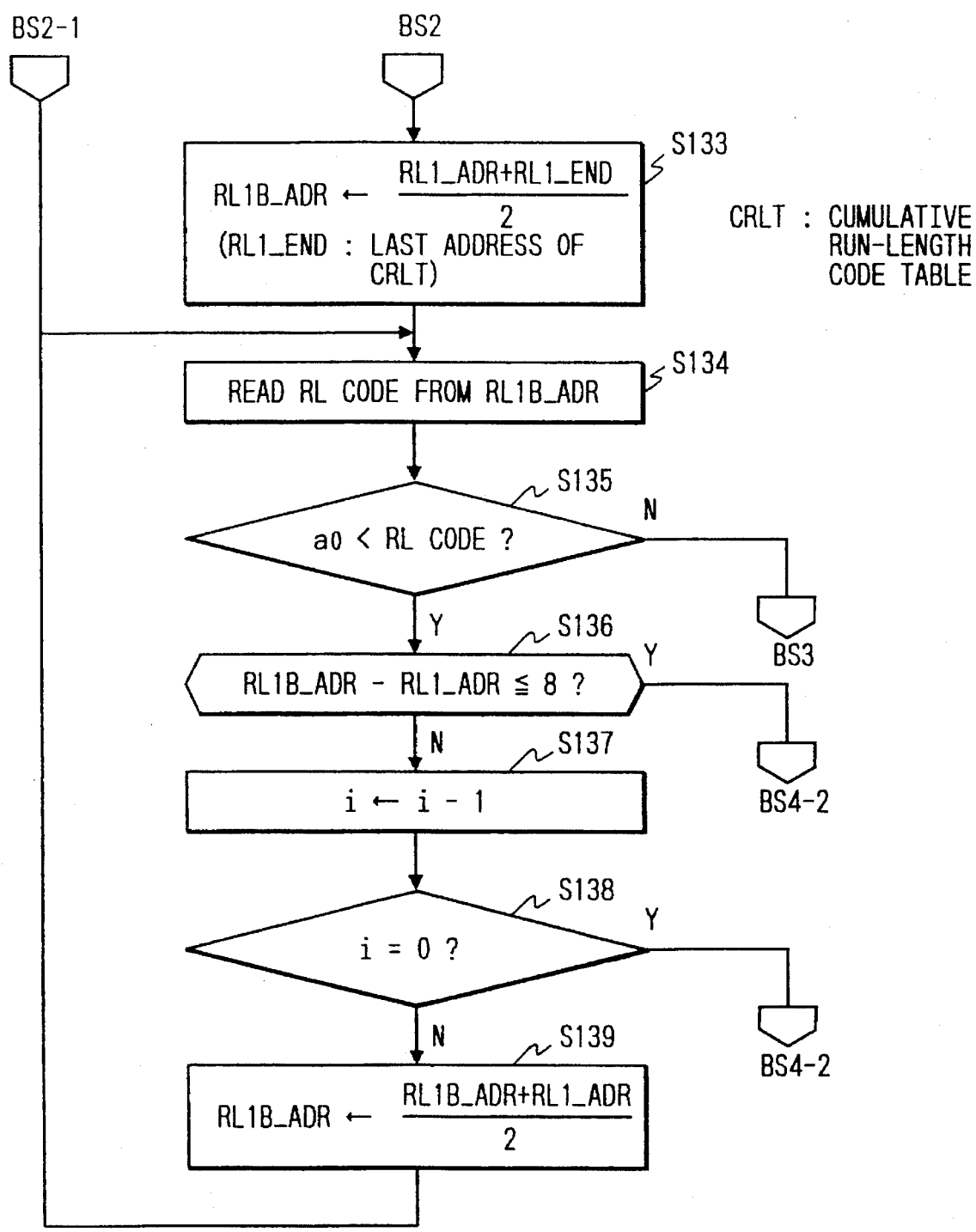

Subsequently, as shown in FIG. 38, an address corresponding to the midpoint between the address "RL1 ADR" set in step S127 and the last address "RL1 END" of the cumulative run-length code table (of FIG. 10(b)) is set as the address "RL1B ADR" in step S133. Next, the code RL at this address "RL1B ADR" is read in step S134. Then, it is determined in step S135 whether or not this code RL is larger than the parameter $a_o$. If larger, it is next determined in step S136 whether or not the difference between the addresses "RL1B ADR" and "RL1 ADR" is equal to or less than 8. If larger than 8, the variable "i" is reduced by 1 in step S137. Thereafter, a binary search is repeatedly performed until the program exits from one of steps S135, S136 and S138 (see steps S134 to S139).

Figure 39:
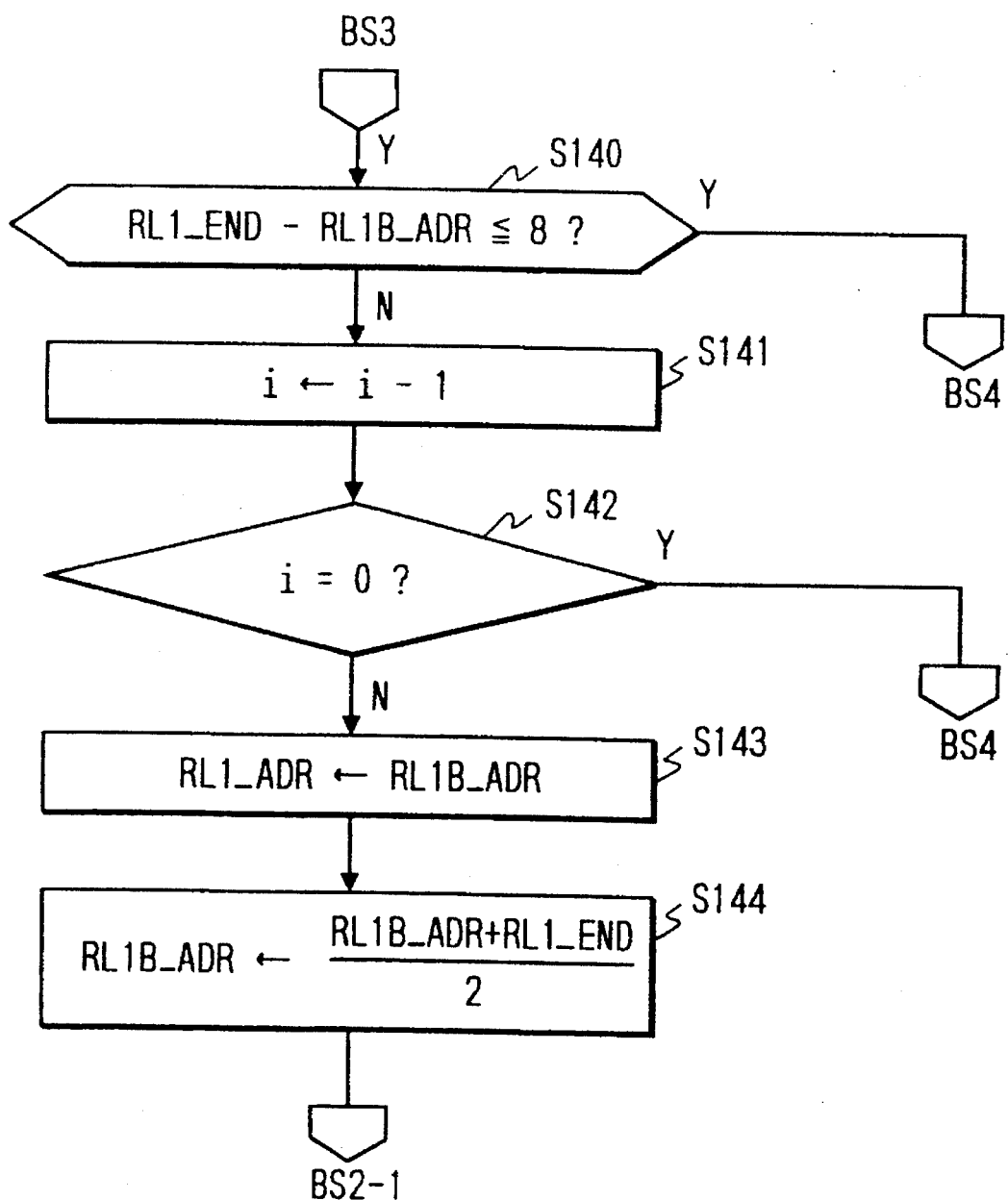

Further, FIG. 39 Illustrates a process to be performed in case where it is found in step S135 that the code RL is not larger than the parameter $a_o$. If the difference between the addresses "RL1B ADR" and "RL1 ADR" is larger than 8, the number "i" of times of effecting a binary search is decreased in step S141. The binary search is kept performed until the program exits from steps S140 or until the variable "i" becomes equal to 0 (see steps S140 to S144).

Figure 40:
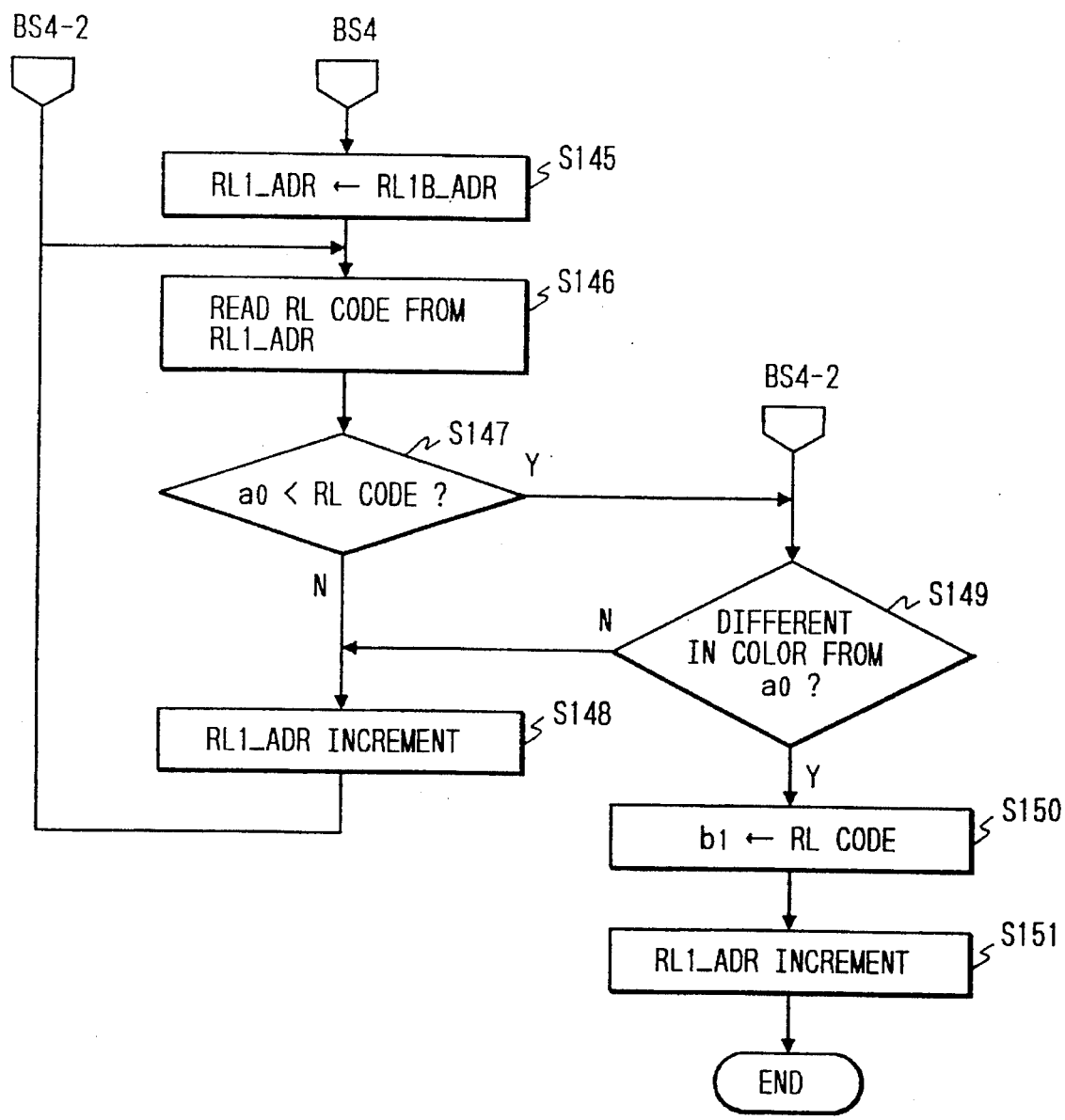

FIG. 40 is a flowchart for illustrating how the parameter $b_1$ is determined from outputs of steps of FIGS. 38 and 39. First, in step S145, objects to be searched are narrowed to the eight transition points, and the address "RL1B ADR" is replaced with the address "RL1 ADR" corresponding to the reference line. Then, a cumulative run-length code RL is read from this address in step S146. If it is found in step S147 that the parameter $a_o$ is not less than the code RL, the address "RL1 ADR" is incremented in step S148. This process is effected repeatedly until the program exits-from step S147 through Y-branch. If it is found in steps S128 and 147 that the parameter $a_o$ becomes less than the code RL, it is checked in step S149 whether or not the color corresponding to the parameter $a_o$ is different from that corresponding to the code RL. If the same, the program advances to step S148. If different, the parameter $b_1$ is definitely determine and thus the code RL is set as the parameter $b_2$ in step S150. Then, the address "RL1 ADR" is incremented in step S151.

Next, the conversions to be performed in the reception, which are illustrated in FIGS. 11 to 13, will be described in detail hereinbelow. Incidentally, EOLSRC of steps S24 of FIG. 11 is an operation of searching for an EOL code.

More particularly, EOLSRC is an operation of searching coded data (or compressed data), which is received by the facsimile, for an EOL and notifying of a tag bit. Further, EOLSRC is finished when an EOL is detected. Furthermore, interruptions are sampled each time eight bits are read from the data buffer.

Figure 41:
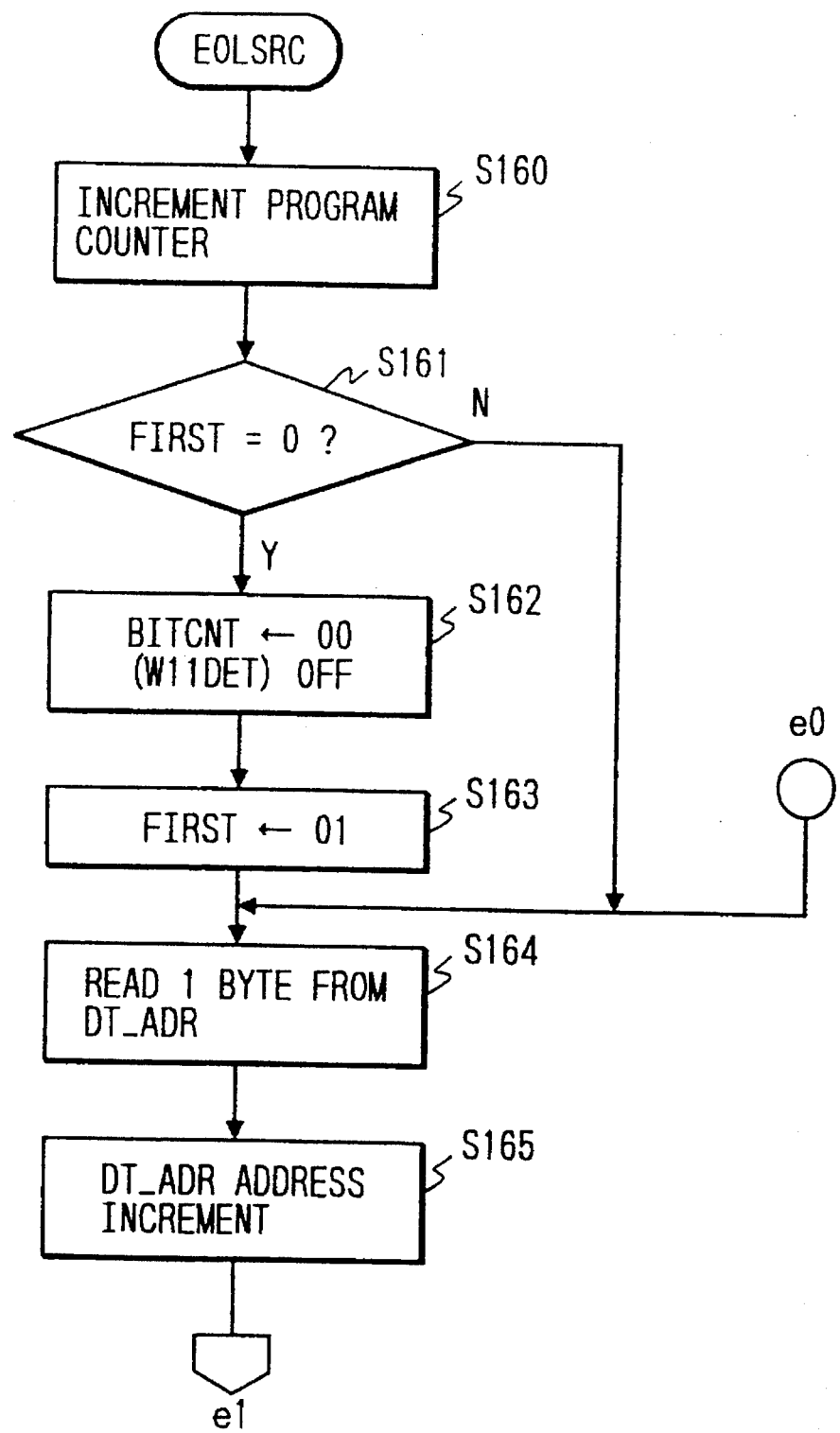
FIGS. 41, 42 and 43 are flowcharts for illustrating an operation of retrieving or searching for an EOL.
Figure 42:
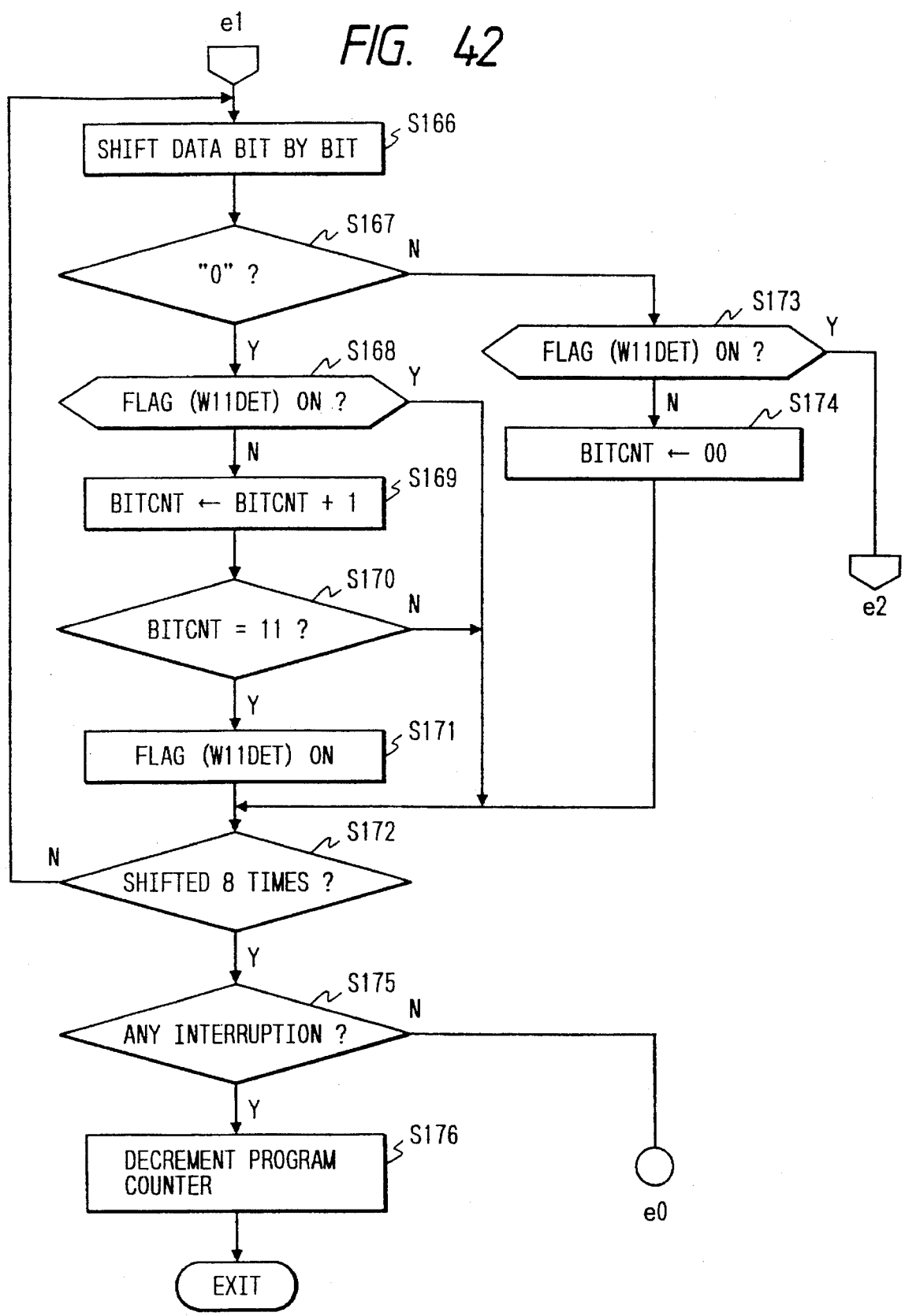
Figure 43:
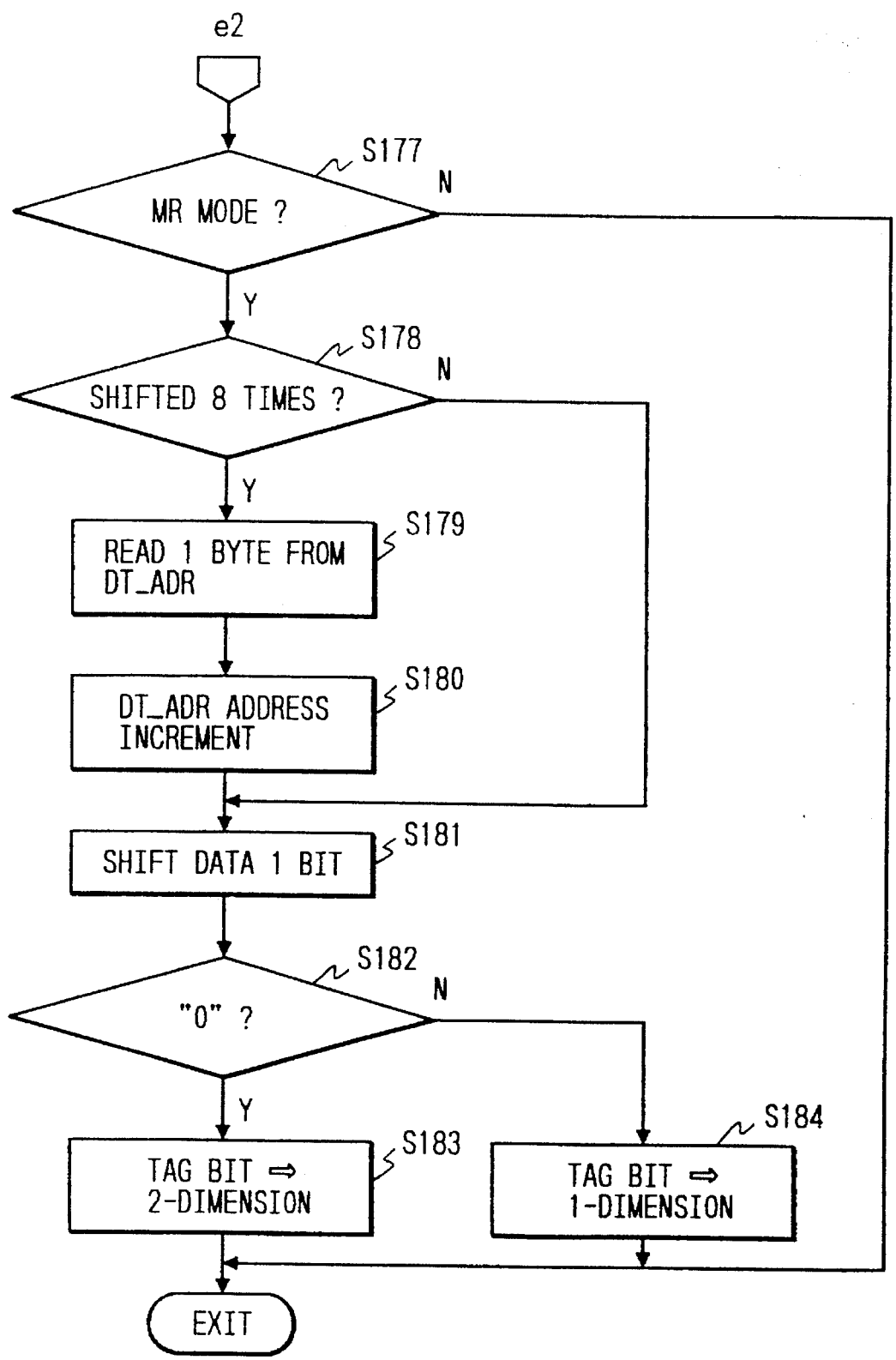

FIGS. 41 to 43 are flowcharts for illustrating an EOL detecting operation. When the facsimile is instructed to perform a detection of an EOL signal from the received coded-data, the program counter is incremented in step S160. Then, it is checked in step S161 whether or not the 1-bit area "first" for representing whether or not this bit is a leading bit of 1 line, which has been set in step S23b of FIG. 11, is equal to 0. If equal to 0, this bit is the leading bit of 1 line. Thus, 0 is set in a counter BITCNT to be used for counting 0 bits of the received data, and a flag W11DET for indicating whether or not eleven zero-bits of EOL are detected is made to be off in step S162. Subsequently, 1 is set in the area "first" in step 2163. Next, 1 byte of the received data is read in step S164 from the address "DT ADR", which has been set in step S23a of FIG. 11, and then the address "DT ADR" is incremented in step S165.

Subsequently, as shown in FIG. 42, the data read in step S164 is shifted right one-bit by one-bit in step S166. Then, in step S167, the read data is fetched one-bit by one-bit and it is checked whether or not the fetched bit is equal to 0. If equal to 0, it is further checked in step S168 whether or not the flag W11DET detects the eleven zero bits. If not, the counter BITCNT is incremented by 1 in step S169. Further, in step S170, it is examined whether or not the counter BITCNT indicates 11. If this counter comes to indicate 11, the counter W11DET is made to be on in step S171. Then, in step S172, it is checked whether or not the received data is shifted by one byte. If not, the program returns in step S172 to step S166.

Moreover, if it is detected in Step S167 that the fetched bit is not 0, it is checked in step S173 whether or not the flag W11DET is on. If not on, this bit is not of EOL and further 0 is set in the counter BITCNT in step S174. Furthermore, it is checked in step S175 whether or not an interruption occurs if the shifting of a bit is effected eight times in step S172. If occurs, the program counter is decremented in step S176.

FIG. 43 is a flowchart for illustrating a process to be performed after the flag W11DET is made to be on and an EOL is detected in step S145. Subsequently, in step S177, it is examined whether the facsimile is in an MR mode or an MH mode. If in the MR mode, it is verified in step S178 whether the shifting of 1 bit is effected eight times. If effected eight times, 1 byte of the next received data is read from the address "DT ADR" in step S179, and then the address "DT ADR" is incremented in step S180. Next, the data is shifted by 1 bit in step S181. This is an operation of judging according to a bit subsequent to EOL whether or not this code is one-dimensional or two-dimensional. Namely, if the bit subsequent to EOL is 1, it is determined that this code is one-dimensional code (namely, MH code). In contrast, if the bit subsequent to EOL is 0, it is determined that this code is two-dimensional code (namely, MR code). Namely, if the bit obtained as a result of shifting and fetching in step S183 is 0, the tag-bit indicates in step S183 that this code is two dimensional. If equal to 1, the tag-bit indicates in step S184 that this code is one-dimensional.

Next, the conversion MH2RL of step S29 of FIG. 12 will be described hereinbelow.

In case of this conversion MH2RL, a received MH code is first converted into a cumulative run-length code RL corresponding to 1 line by referring to a conversion or translation table. When MH codes of all bits of 1 line is read, the conversion is then finished. Further, interruptions are sampled each time a cumulative run-length code corresponding to a transition point is output.

Figure 44:
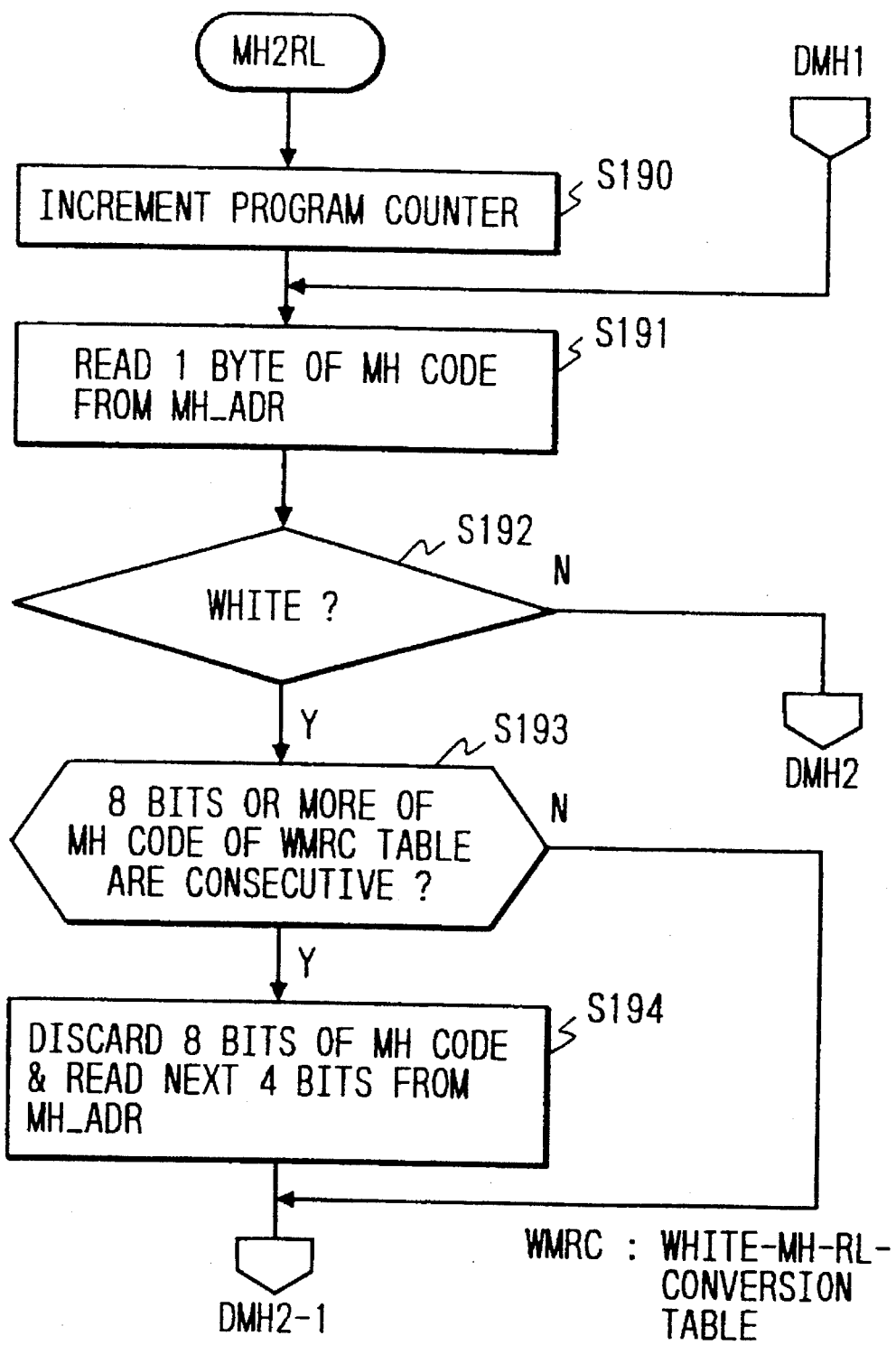
FIGS. 44, 45 and 46 are flowcharts for illustrating an operation of converting an MH code into a cumulative run-length code.
Figure 45:
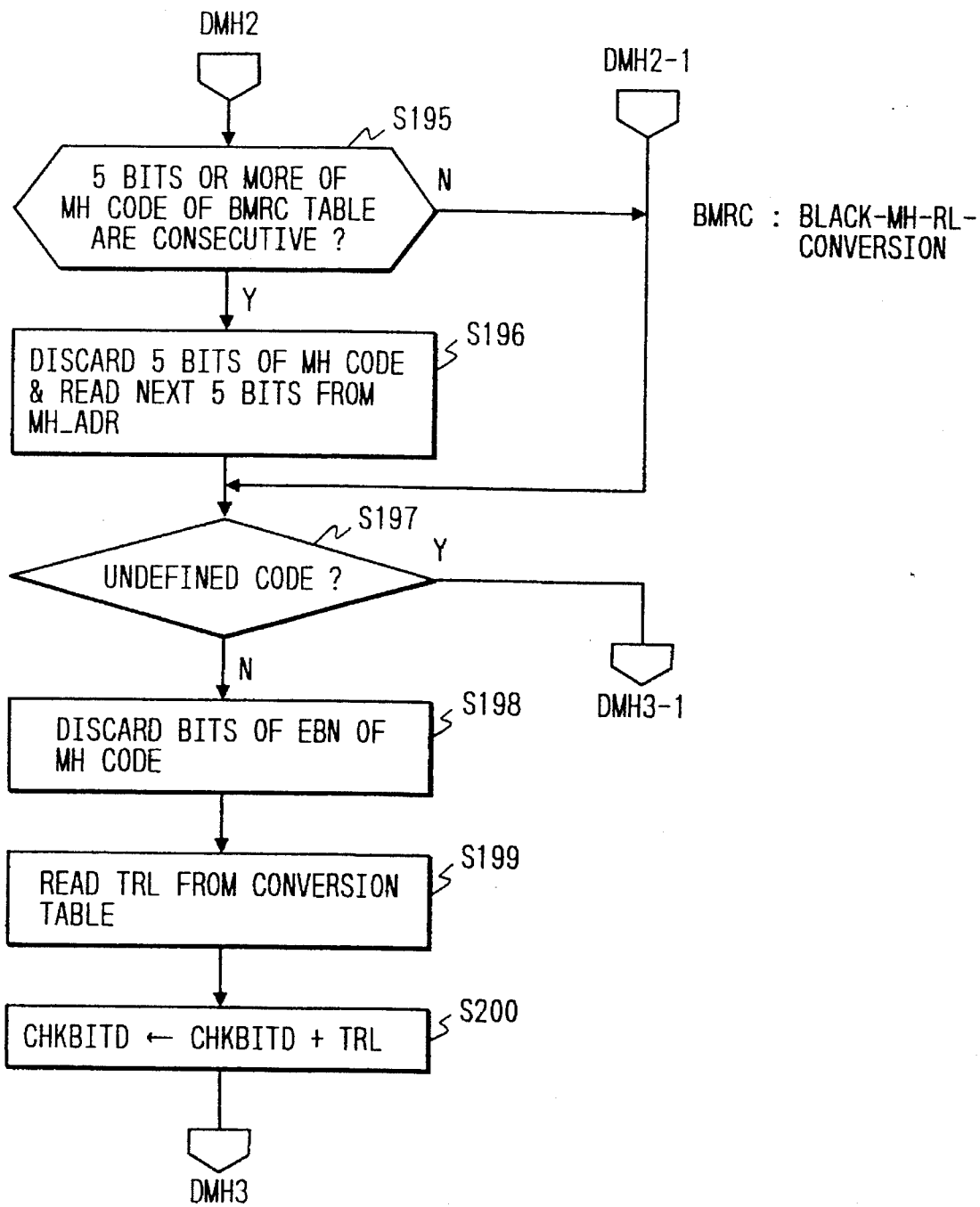
Figure 46:
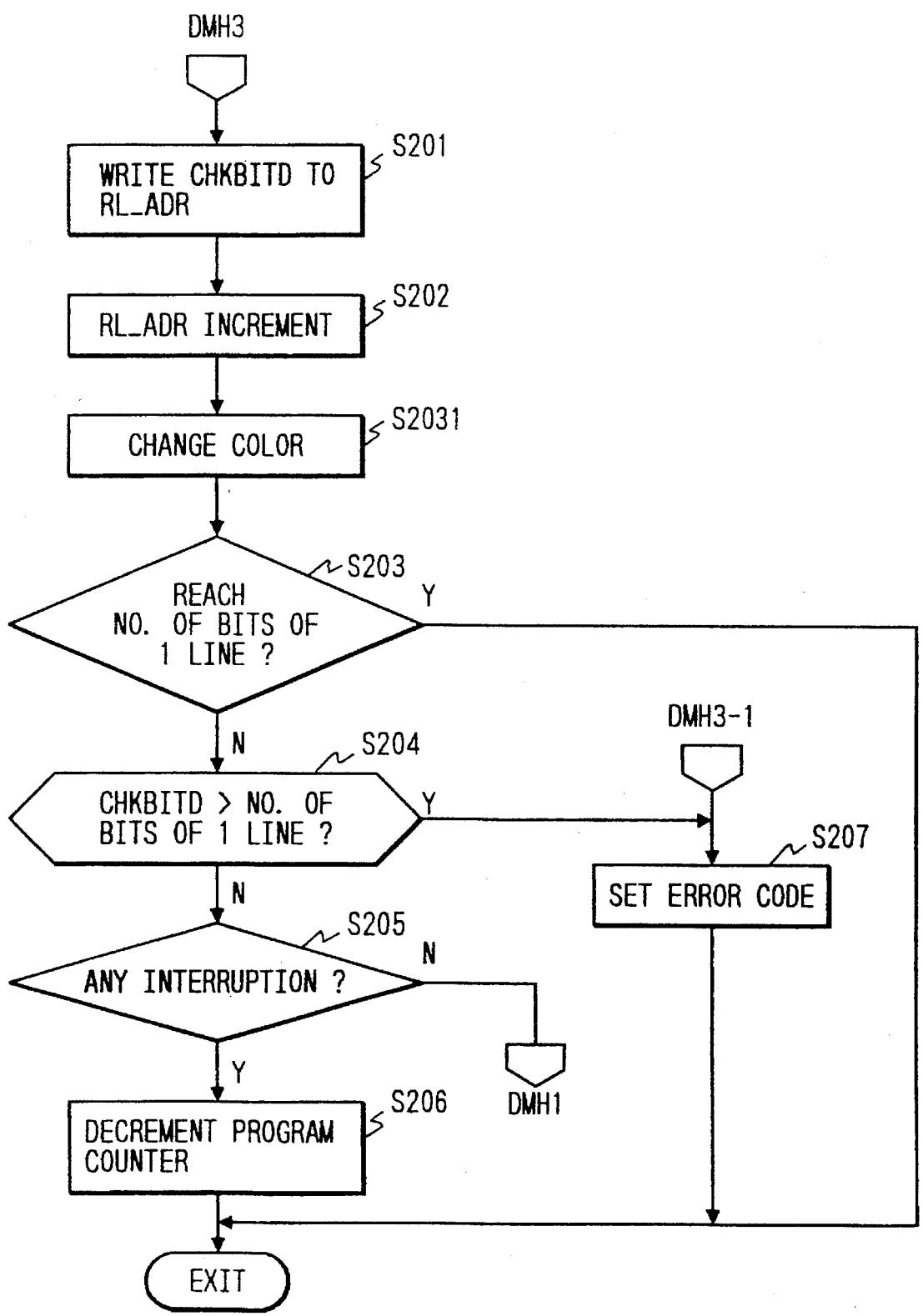

FIGS. 44 to 46 are flowcharts for illustrating the conversion MH2RL.

As shown in FIG. 44, when an instruction for performing a conversion from an MH code to an code RL, a program counter is incremented in step S190 in such a manner that the next program can be executed after the execution of the current program is finished. Then, 1 byte is read in step S191 from the address "MH ADR" set in step S28b of FIG. 12, and it is judged in step S192 whether this 1-byte data corresponding to white or black pixels.

FIG. 47 shows an example of a table used for converting an MH code, which corresponds to white pixels, (hereunder sometimes referred to as a white MH code) into a tentative run-length code (hereunder sometimes referred to as a tentative RL code). Note that the MH code can be represented by using 12 bits at most. In case of FIG. 47(a), in each cell of a column of MH code, which, is represented by using not more than 8 bits, a corresponding tentative RL code is described. Further, effective bit No. represents the number of bits effectively composing an MH code among 8 bits. Furthermore, a sow, of which the effective bit No. is 00, of FIG. 47(a) is linked with a table of FIG. 47(b), in which an MH code is represented by using 4 bits. Releasing to FIG. 47(b), there are ten kinds of tables (namely, table codes). By using the tables of FIGS. 47(a) and 47(b), a white MH code can be tentative RL code. Incidentally, each HH code is represented in what is called the "LSB First" manner. Further, a code corresponding to the effective bit NO. of 80 is an undefined code.

FIG. 48 shows an example of a table used for converting an HH code, which corresponds to black pixels, (hereunder sometimes referred to as a black MH code) into a tentative RL code. Note that the black MH code can be represented by using 13 bits at most. In both cases of FIGS. 48(a) and 48(b), each MH code is represented by using 8 bits. Furthermore, a row, of which the effective bit No. is 00, of FIG. 48(a) is linked with a table of FIG. 48(b). Further, a code corresponding to the effective bit NO. of 80 is an undefined code. Furthermore, tentative RL codes of FIGS. 47 and 48 are for instance, B3 and W2 of raw data of FIG. 2.

Turning back to FIG. 44, in case where white MH data is read, it is first checked in step S193 by using the table of FIG. 47 to be used for converting a white MH code to an RL code whether or not there are consecutive eight bits or more of the MH code. If 8 bits or more thereof are consecutive, 8 bits of the MH code are discarded and the next 4 bits are read from the address "MH ADR" in step S194.

Then, as shown in FIG. 45, in case where black MH data is read, it is first checked in step S195 by using the table of FIG. 48 to be used for converting a black MH code to an RL code whether or not there are consecutive five bits or more of the MH code. If 5 bits or more thereof are consecutive, 5 bits of the MH code are discarded and the next 5 bits are read from the address "MH ADR" in step S196 to make new 8 bits of the MH code. Next, it is checked in step S197 whether or not the read code is an undefined code. If not, bits of the effective bit No. of the MH code are discarded in step S198. Then, a tentative RL code is read from the conversion table in step S199. Further, the area CHKBITD is updated in step S200 by adding the tentative RL code to the area CHKBITD set in step S28c of FIG. 12.

Subsequently, as shown in FIG. 46, the contents of the area CHKBITS are written in step S201 to the address "RL ADR" set in step S28a of FIG. 12. Then, the address "RL ADR" is incremented in step S201. Further, the color corresponding to the next RL code is naturally different from that corresponding to the current RL code. Thus a color-changing operation is effected in step S203. Next, it is checked in step S2031 whether or not the number of bits of the MH code reaches the number of bits of 1 line. If reaches, this conversion is finished. If not, it is further checked in step S204 whether or not the number of bits of the area CHKBITD exceeds the number of bits of 1 line. If exceeds, the conversion is finished. In contrast, if not, it is checked in step S204 whether or not the number of bits of the data stored in the area CHKBITD exceeds the number of bits of 1 line. If exceeds, it is determined that an error OCCURS and an error code is set in step S207.

in contrast, if not, it is checked in step S205 whether or not an interruption is caused. If caused, the program counter is decremented in step S206.

Next, the conversion MR2RL of step S27 of FIG. 12 will be described hereinbelow.

In case of this conversion MR2RL, an MR code is first converted into a run-length code RL corresponding to 1 line by comparing decoded line (MR code) of 1 line with another cumulative run-length code (RL) of a reference line. When MR codes of all bits of 1 line is read, the conversion is then finished. Further, interruptions are sampled each time a decoding processing of each of vertical, horizontal and path modes is finished.

FIGS. 49 to 54 are flowcharts for illustrating the conversion MR2RL.

Figure 49:
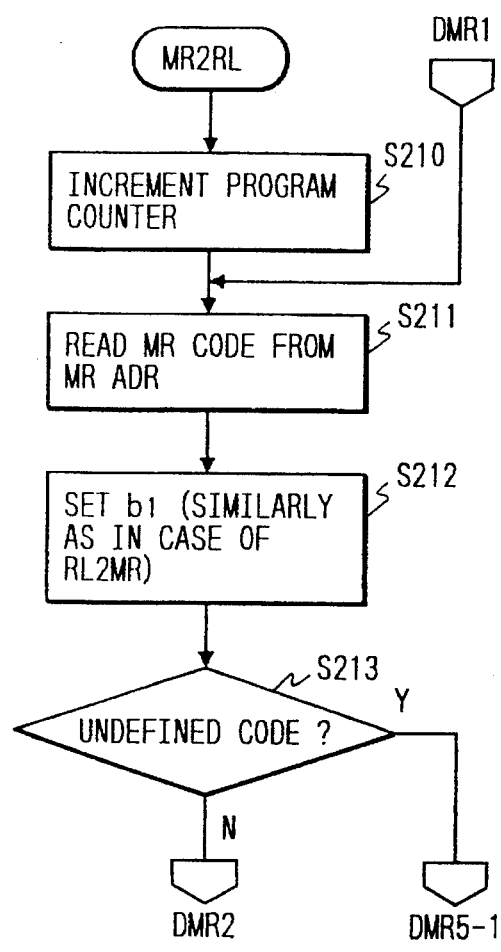
FIGS. 49 to 54 are flowcharts for illustrating an operation of converting an MR code into a cumulative run-length code.

As shown in FIG. 49, when the facsimile is instructed to perform a conversion from an MR code to a cumulative run-length code RL, a program counter is incremented in step S210. Then, received data (namely, an MR code) is read from the address "MR ADR" set in step S26c of FIG. 12. Further, the parameter $b_1$ is set in step S212 by performing the similar process as in case of the conversion RL2MR. Next, it is checked in step S213 whether or not the MR code is an undefined code. If is an undefined code, it is determined that an error occurs.

Figure 50:
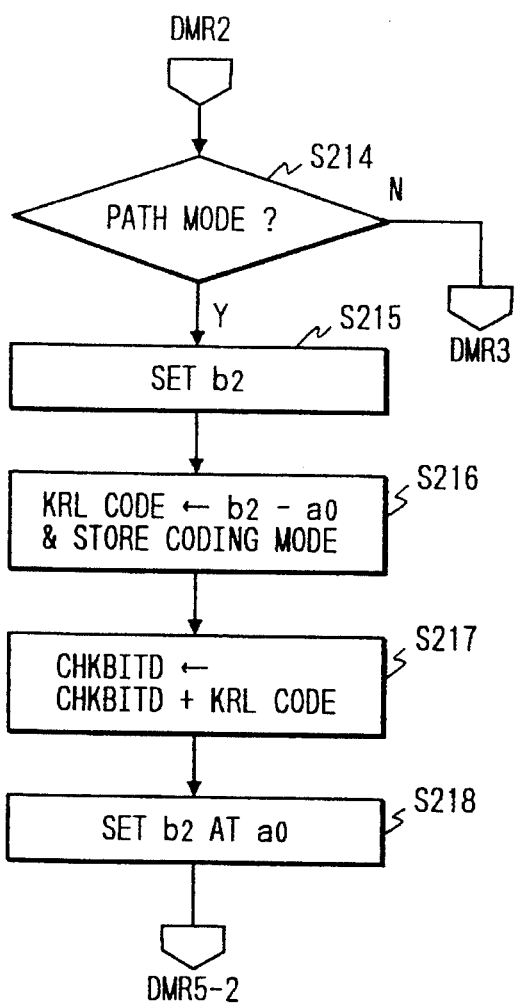

Subsequently, as shown in FIG. 50, it is checked in step S214 whether or not it is in a path mode. If in a path mode, the parameter $b_2$ is set in step S215. Then, in step S216, the difference between the parameters $b_2$ and $a_o$ is obtained and the obtained difference is set as a KRL code. Subsequently, the data stored in the working area CHKBITD established in step S26d of FIG. 12 is added to the KRL code and further the area CHKBITD is updated in step S217. Next, the value of the parameter $b_2$ is set in the parameter $a_o$ in step S218.

Figure 51:
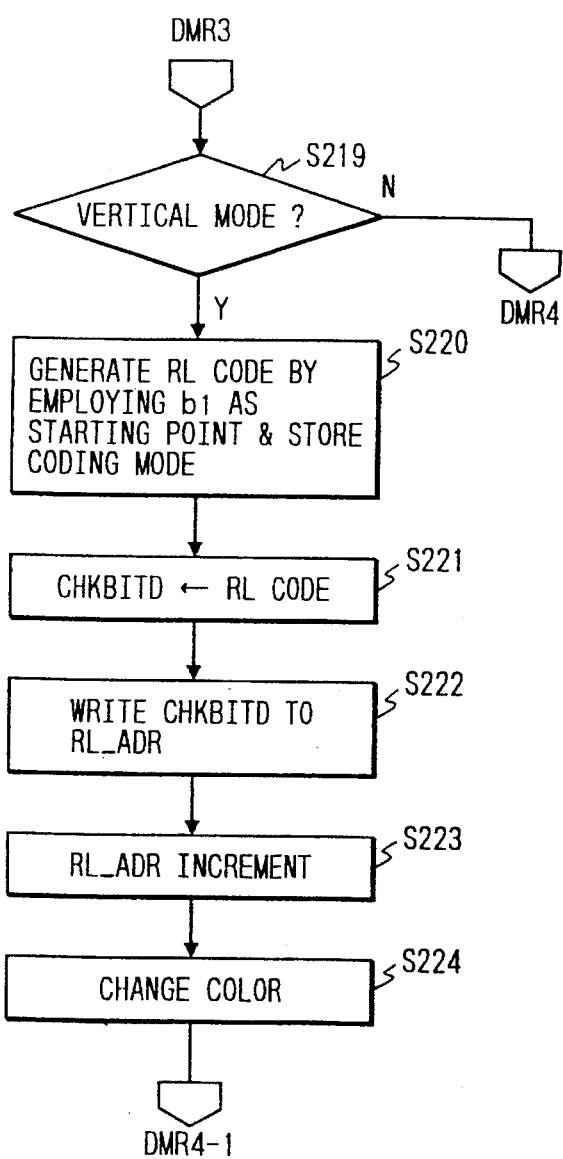

Then, as shown in FIG. 51, in case where it is found in step S214 of FIG. 50 that the facsimile is not in the path mode, it is checked in step S219 whether the facsimile is in a vertical mode. If in the vertical mode, an RL code is generated in step S220 by employing the parameter or point $b_1$ set in step S212 as a starting point. Then, this RL code is set in the area CHKBITD in step S221, and the data stored in the area CHKBITD is written to the address "RL ADR" set in step S26c of FIG. 12. Subsequently, the address "RL ADR" is incremented in step S223 and further a color-changing operation is effected in step S224.

Figure 52:
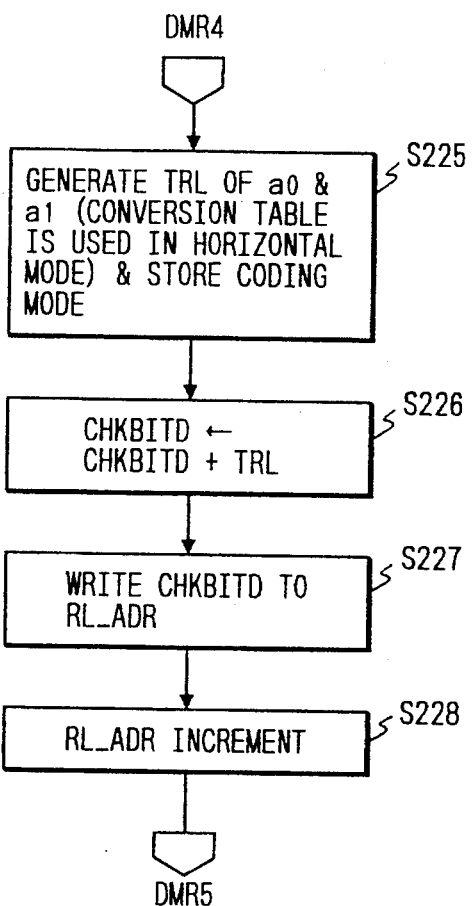

Subsequently, as shown in FIG. 52, if it is found in step S219 of FIG. 51 that the facsimile is in a horizontal mode, tentative RL codes of the points $a_o$ and $a_1$ are produced in step S225. The horizontal mode is the same as that in case of the conversion MH2RL. Thus the tentative RL code is generated by using the conversion tables of FIGS. 47 and 48. Next, this RL code is added to the data stored in the area CHKBITD and further the data stored in the area CHKBITD is updated in step S226. Then, the contents of or data stored in the area CHKBITD are written to the address "RL ADR" in step S227. Subsequently, the address "RL ADR" is incremented in step S228.

Figure 53:
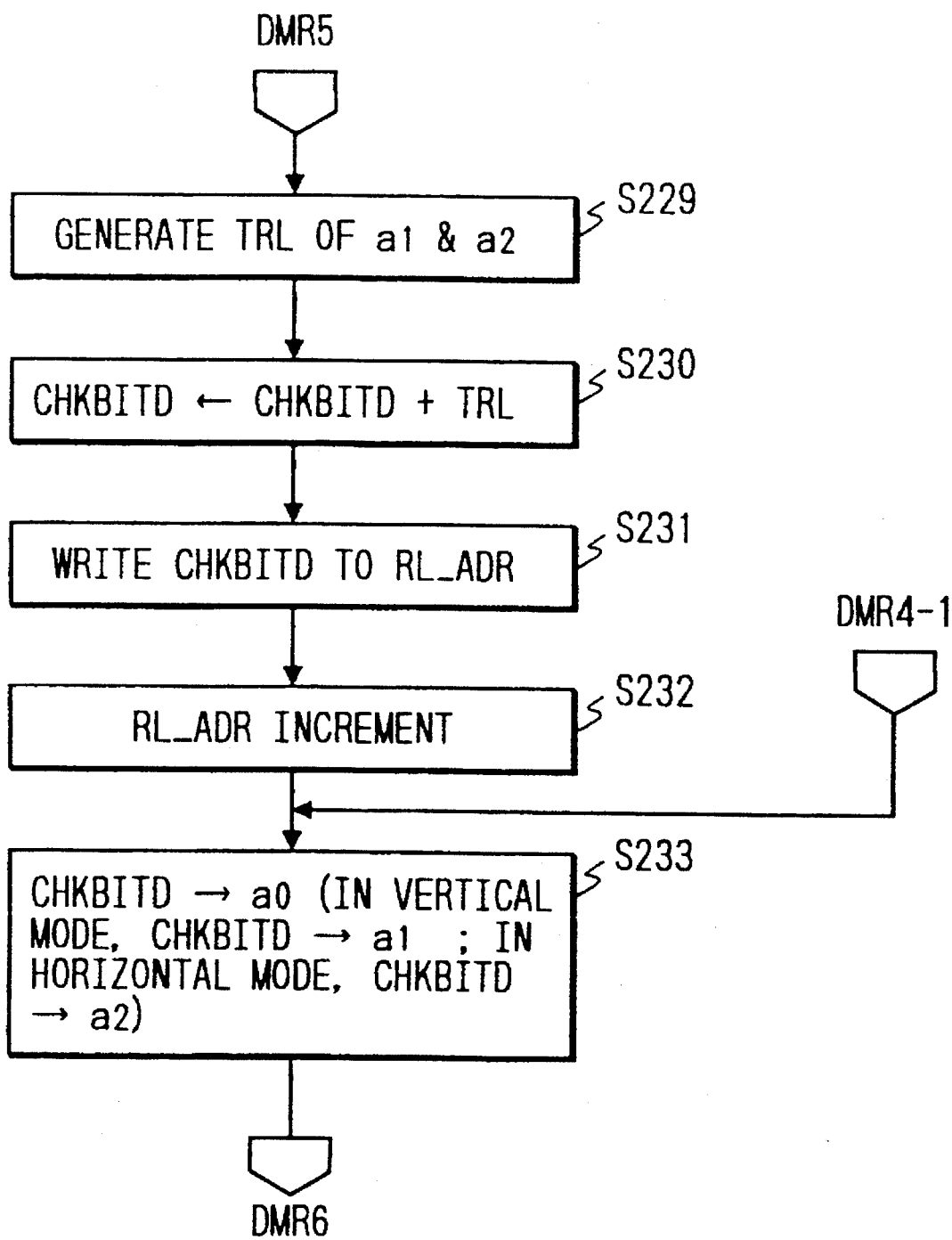

Then, as shown in FIG. 53, a tentative RL code corresponding to each of the parameters $a_1$ and $a_2$ is generated similarly as in step S225. This tentative RL code is added to the contents of the area CHKBITD and then the contents of the area CHKBITD are updated in step S230. Subsequently, the contents of the area CHKBITD are written to the address "RL ADR" in step S231. Then, the address "RL ADR" is incremented. Next, the contents of the area CHKBITD are set in the parameter $a_o$ in step S233. In case of the vertical mode, the contents of the area CHKBITD are the parameter $a_1$. Further, in case of the horizontal mode, the contents of the area CHKBITD are the parameter $a_2$.

Figure 54:
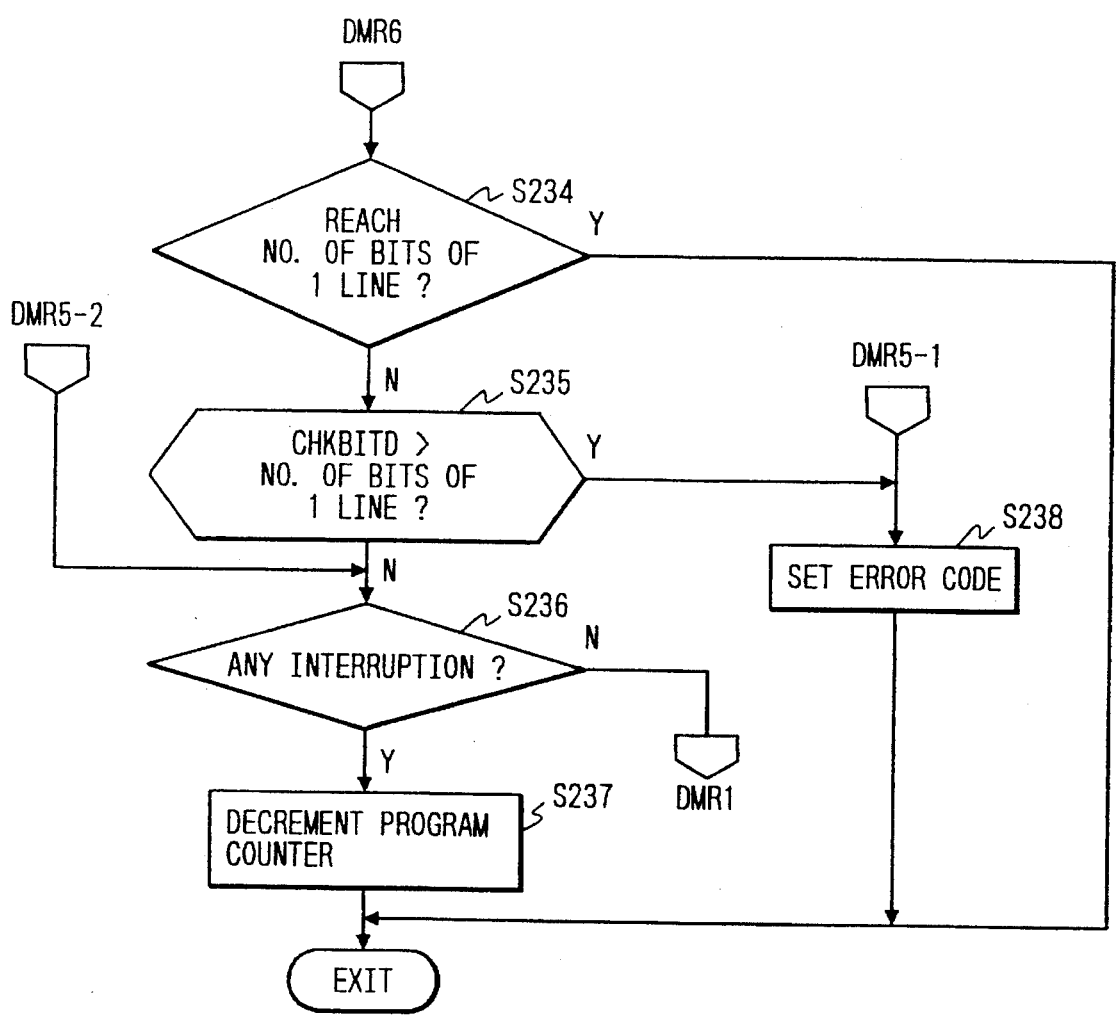

Then, as shown in FIG. 54, it is checked in step S234 whether or not the number of bits of the MR code reaches the number of bits of 1 line. If reaches, the conversion is finished. IF not, it is further checked in step S235 whether or not the number of bits of the contents of the CHKBITD exceeds the number of bits of 1 line. If exceeds, an error code is set in step S238. If not, it is moreover checked in step S236 whether or not an interruption occurs. If occurs, the program counter is decremented in step C237.

Next, the conversion RL2NC of step S35 of FIG. 13 will be described hereinbelow. In case of the conversion RL2NC, cumulative run-length code RL of 1 line is converted into raw data NC. As shown in FIG. 2, if a terminating code (8000) is read, this conversion is finished. Further, interruptions are sampled each time cumulative run-length codes corresponding to more 16 bits of raw data are read from a run-length code table.

Figure 55:
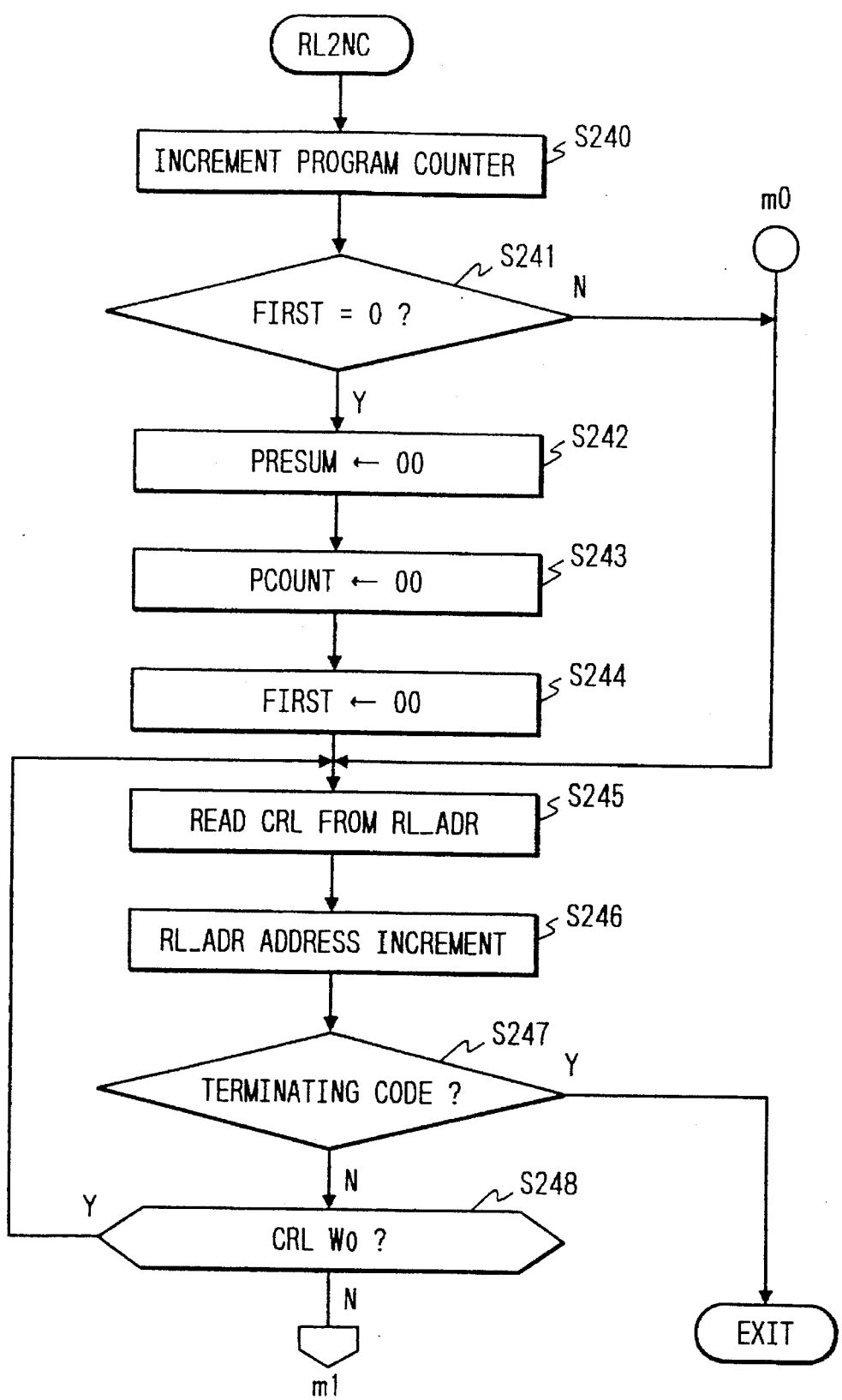
FIGS. 55, 56, 57 and 58 are flowcharts for illustrating an operation of converting a cumulative run-length code into raw data.

As shown in FIG. 55, when an instruction for performing the conversion RL2NC is output, the program counter is incremented in step S240 in such a manner that the next program can be performed after this instruction is executed. Then, it is checked in step S241 whether the flag "first" indicating that this is first data of 1 line is equal to 0. If equal to 0, current data to be processed is a leading bit and thus data 00 is set in step S242 in a working area PRESUM to which cumulative run-length code is stored. Raw data NCDAT to be converted is fetched 16 bits by 16 bits by addressing them. First, data 00 is set in a counter PCOUNT used for counting 16 bits in step S243. Next, the flag "first" is set as indicating data 01 in step@ S244. Subsequently, cumulative run-length data is read in step S245 from the address "RL ADR" set in step S34a of FIG. 13. Then, the address "RL ADR" is incremented for the next reading operation in step S246. Further, it is verified in step S247 whether or not a terminating code is read. In case-where data of 1 line to be converted is started with bit corresponding to a black pixel (hereunder sometimes referred to as a black bit), it is checked before starting the conversion whether a bit to be checked is white zero-run-length code added as a white bit in order to meet the above described condition that a code of 1 line to be converted is started with a white run-length code. If so, a conversion processing is started in step S248 from the next data practically.

Figure 56:
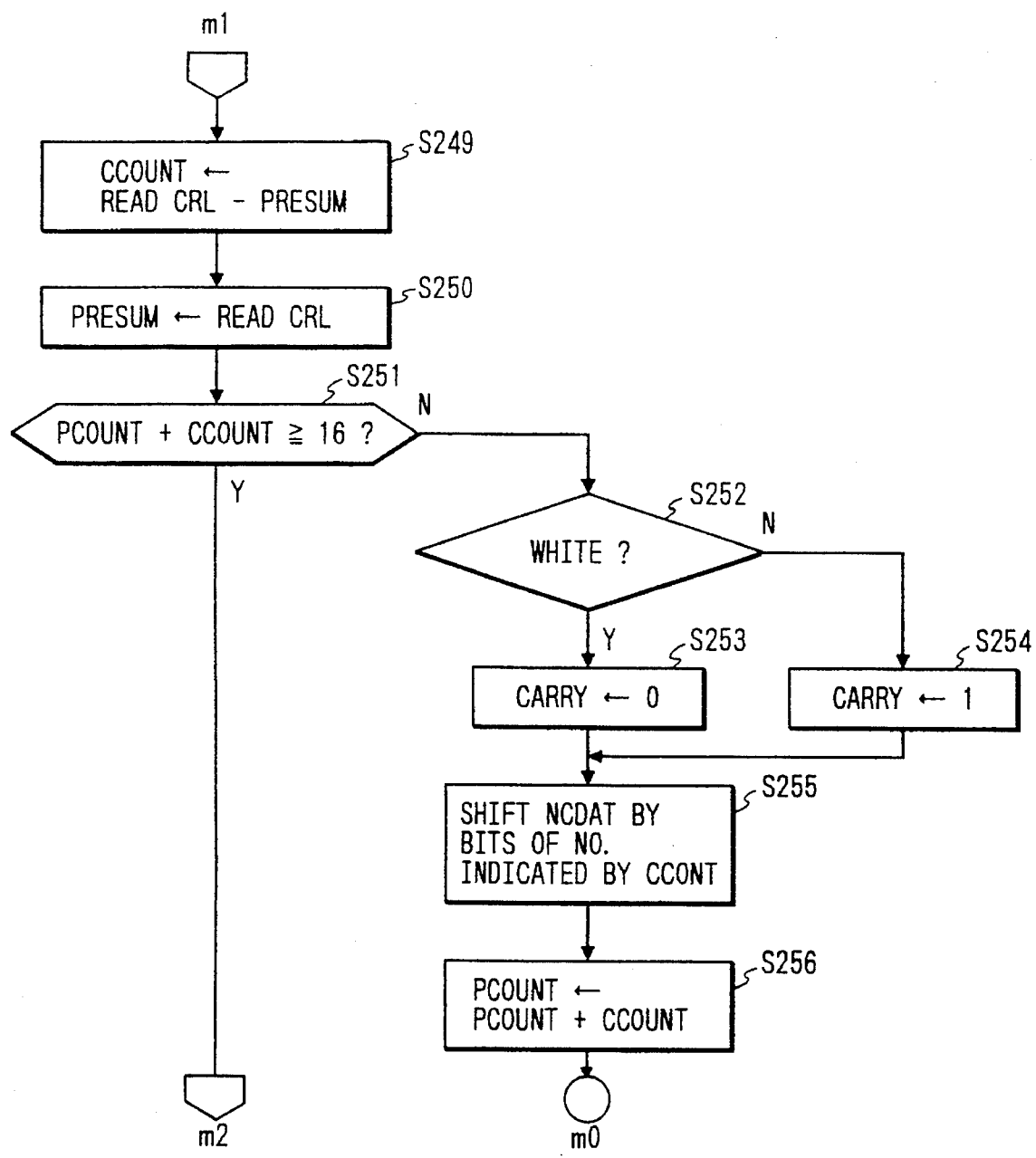

Turning to FIG. 56, the last cumulative run-length code previously read is subtracted from the cumulative run-length code read in step S245 and the result is counted by a counter CCOUNT in step S249. This count value obtained by the counter CCOUNT is a tentative run-length code representing B3, W2 or the like of the raw data of FIG. 2. The cumulative run-length code read in step S245 is stored in the area PRESUM for making preparations for a processing to be performed next time. Next, it is checked in step S251 whether or not the length of a sum of the data stored in the counters PCOUNT and CCOUNT is equal to or more than 16 bits. If less than 16 bits, it is further checked in step S252 which of white and black pixels the read cumulative run-length code corresponds to. If corresponding to a white pixel, data 0 is input in an area CARRY in step S253. In contrast, if corresponding to a black pixel, data 1 is input in the area CARRY in step S254.

Figure 59:
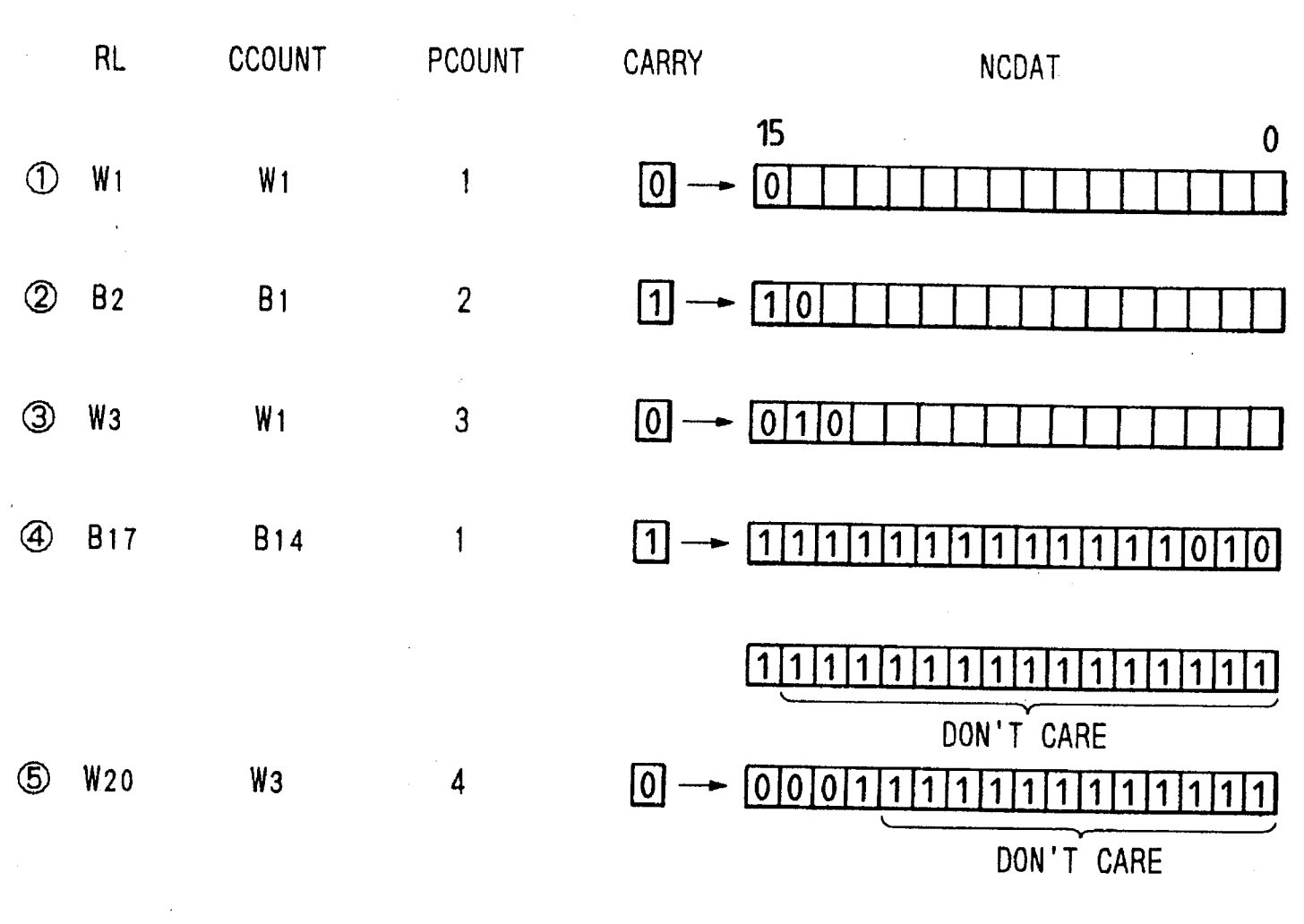

FIG. 59 illustrates a practical example of the conversion RL2NC. In this figure, the cumulative run-length code RL, the contents of the counters PCOUNT and CCOUNT and those of the areas CARRY and NCDAT are shown. The area CARRY is a 1-bit area provided prior to the area NCDAT. If the RL code corresponds to white pixels, data 0 is set in the area CARRY. Further, if the RL code corresponds to black pixels, data 1 is set in the area CARRY. Further, if the length of the sum of the contents of the counters PCOUNT and CCOUNT is less than 16 bits, the area CARRY is available for shifting bits to the area NCDAT by bits of the number indicated by the counter CCOUNT. In this figure, in case of ①, the RL code corresponds to white pixels and the contents of the area CARRY and the counter CCOUNT are 0 and 1, respectively. Therefore, data 0 is shifted by 1 bit. Further, in case of ⑤, the contents of the counter CCOUNT are 3. Thus the data is shifted by 3 bits. Turning back to FIG. 56, the data stored in the area NCDAT is shifted in step S255 by bits of the number indicated by the counter CCOUNT in step S255. Then, in step S256, the contents of the counter PCOUNT are updated by inputting the sum of the contents of the counters PCOUNT and CCOUNT thereto.

Figure 57:
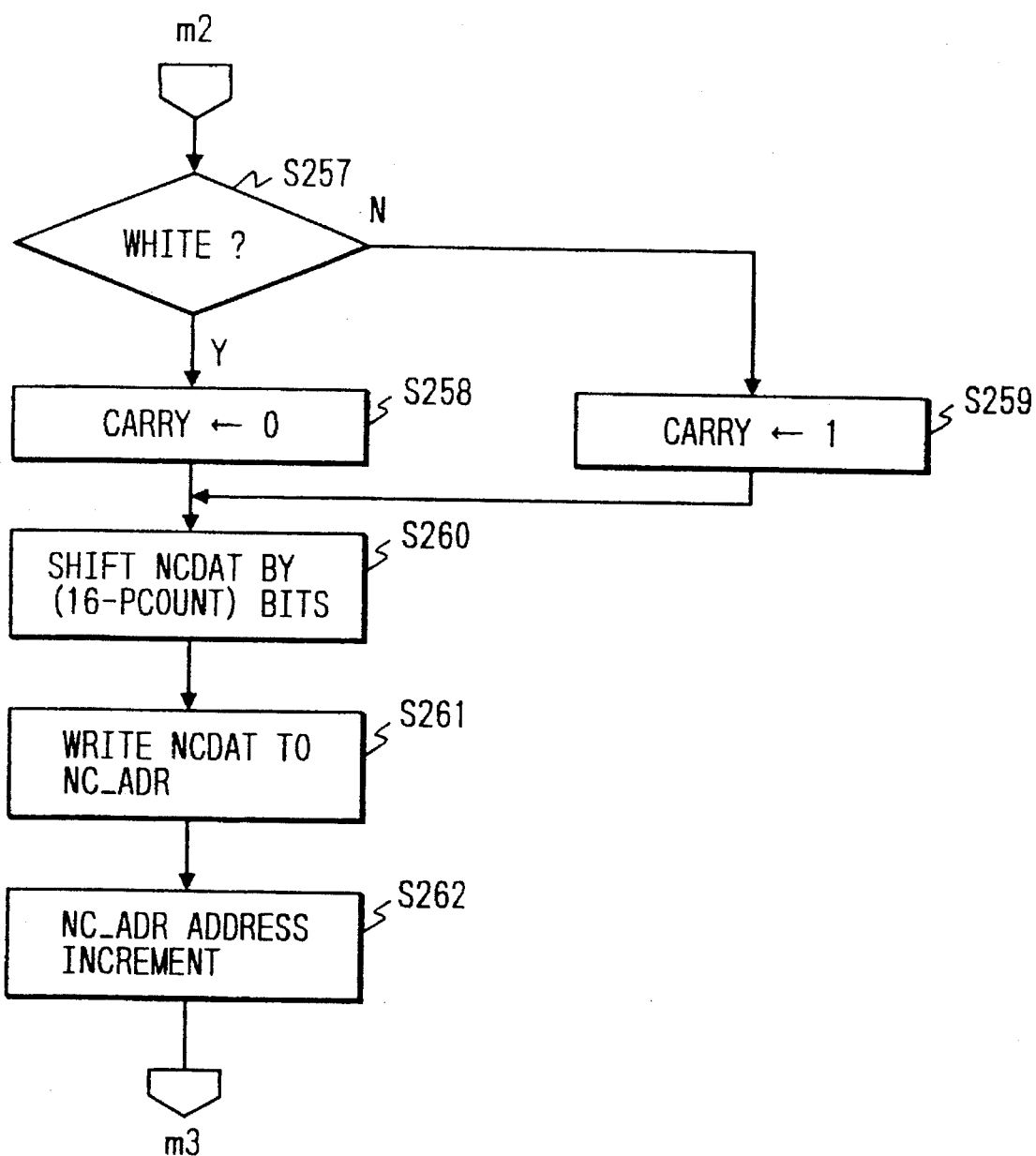

If it is found in step S251 that the length of the sum of the contents of the counters PCOUNT and CCOUNT is equal to or more than 16 bits, it is checked in step S257 which of white and black pixels the RL code read in step S245 corresponds to, as shown in FIG. 57. If corresponding to white pixels, data 0 is set in the area CARRY in step S258. In contrast, if corresponding to black pixels, data 1 is set in the area CARRY in step S259. The data stored by the area CARRY is shifted to the area NCDAT by (16 —the contents of the counter PCOUNT) in step S260. The value obtained as the contents of the area NCDAT at that time is written to the address "NC ADR" and then the address "NC ADR" is incremented in step S262. In FIG. 59, in case of ④, the sum of the contents of the counters PCOUNT and CCOUNT is larger than 16 because 3+14=17>16. Therefore, the black bit 1 of the CARRY is shifted by (16–3) bits=13 bits.

Figure 58:
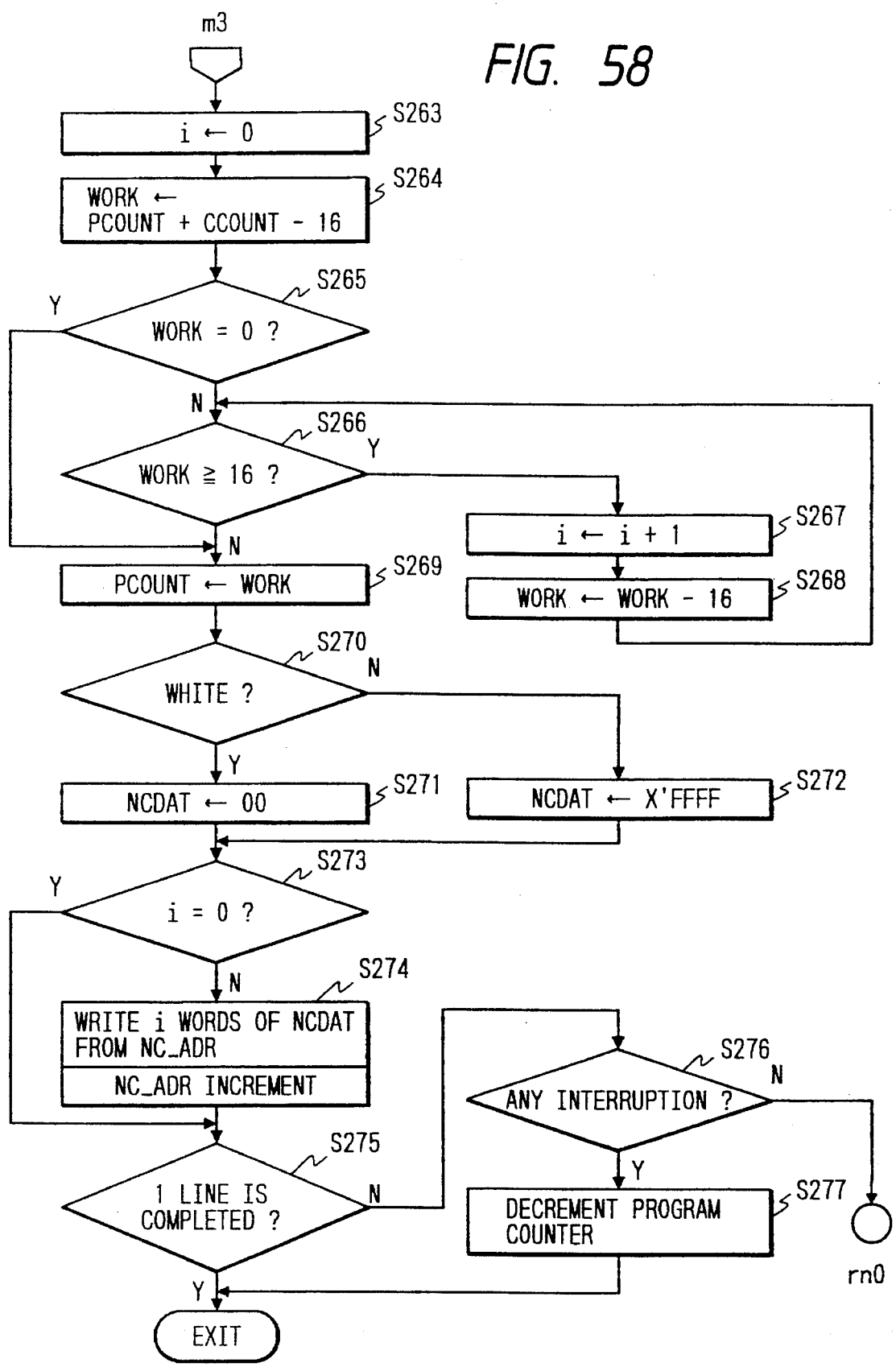

Then, as shown in FIG. 58, data 0 is set in step S263 in the counter "i" which counts a value in units of 16. Further, a value obtained by calculating (the contents of the counters PCOUNT and CCOUNT—16) is stored in a working area WORK in step S264. Subsequently, it is checked in step S265 whether or not the contents of the area WORK are 0. If not equal to 0, it is further checked in step S267 whether or not the contents of the area WORK is equal to or more than 16. Then, in steps S267 and S268, a counter "i" counts or determines how many units (namely, 16 in this case) are included in the data stored in the area WORK. Thus the value indicated by the data stored in the area WORK comes to be less than 16. Thus the contents of the counter PCOUNT are updated with this value in step S269. Subsequently, in step 270, the facsimile repeatedly effects judgement as performed in step S257 regarding which of white and black pixels the read code RL corresponds to. If corresponding to a white pixel, all of 16 bits of the area NCDAT are 0. In contrast, if corresponding to a black pixel, all of 16 bits of the area NCDAT are 1. If the counter "i" indicates 0, the value indicated by the area NCDAT is unchanged. If the value indicated by the counter "i" is equal to or more than 1, areas, all of the bits of which are 1 or 0 similarly as the area NCDAT, of the number, which is the same as the value indicated by the counter "i", are produced by incrementing the address "NC ADR" in step S274.

The process described hereinabove is further explained by referring to FIG. 59 ④ as a practical example. In case of ④, the sum of the contents of the counters PCOUNT and CCOUNT becomes greater than 16. Namely, 3+14=17>16. This corresponds to the case of step S272. Thus, the area NCDAT, 16 bits of which are 1, is generated. Further, the counter PCOUNT is updated as having a value of 1 in step S269. In this case, among 16 bits of 1, only the leftmost bit is effective. Thus 15 bits arranged at the right side of the leftmost bit are discarded (namely, are in the state "DON'T CARE" as described in this figure). If a white RL code 20 as indicated by ⑤ is input when the facsimile is in such a state, the contents of the counter CCOUNT becomes W3. Further, the area CARRY has a value of 0. Thus the bits of the area NCDAT is shifted right three bits. As a result, four bits placed at the left side of the shifted bit "1" corresponding to the leftmost one of bits of the "DON'T CARE" region (which are put in the state "DON'T CARE") in case of ④ become effective. Consequently, the contents of the area NCDAT is being converted or changed into correct raw data by putting 12 bits arranged at the right side of the shifted bit "1" corresponding to the leftmost one of bits of the "DON'T CARE" region.

Turning back to FIG. 58, it is checked in step S275 whether or not a conversion of 1 line is completed. If completed, the conversion is finished. If not completed, it is further checked in step S276 whether or not an interruption is caused. If an interruption is caused, the program counter is decremented in step S277. If no interruption is caused, the program returns to step S245 and the next data is read.

Next, a memory transmission operation will be described hereinafter. By way of example, such an operation will be described in case where a draft image, the size of which is B4, is stored in the form of an MR code in a memory and thereafter an image, which has the size of A4 and is obtained by reducing the stored draft image, is sent in the form of an MH code to a facsimile of a called party, which has a communication capability of processing MH codes.

FIGS. 60 to 63 are flowcharts for illustrating a memory transmission operation.

Figure 60:
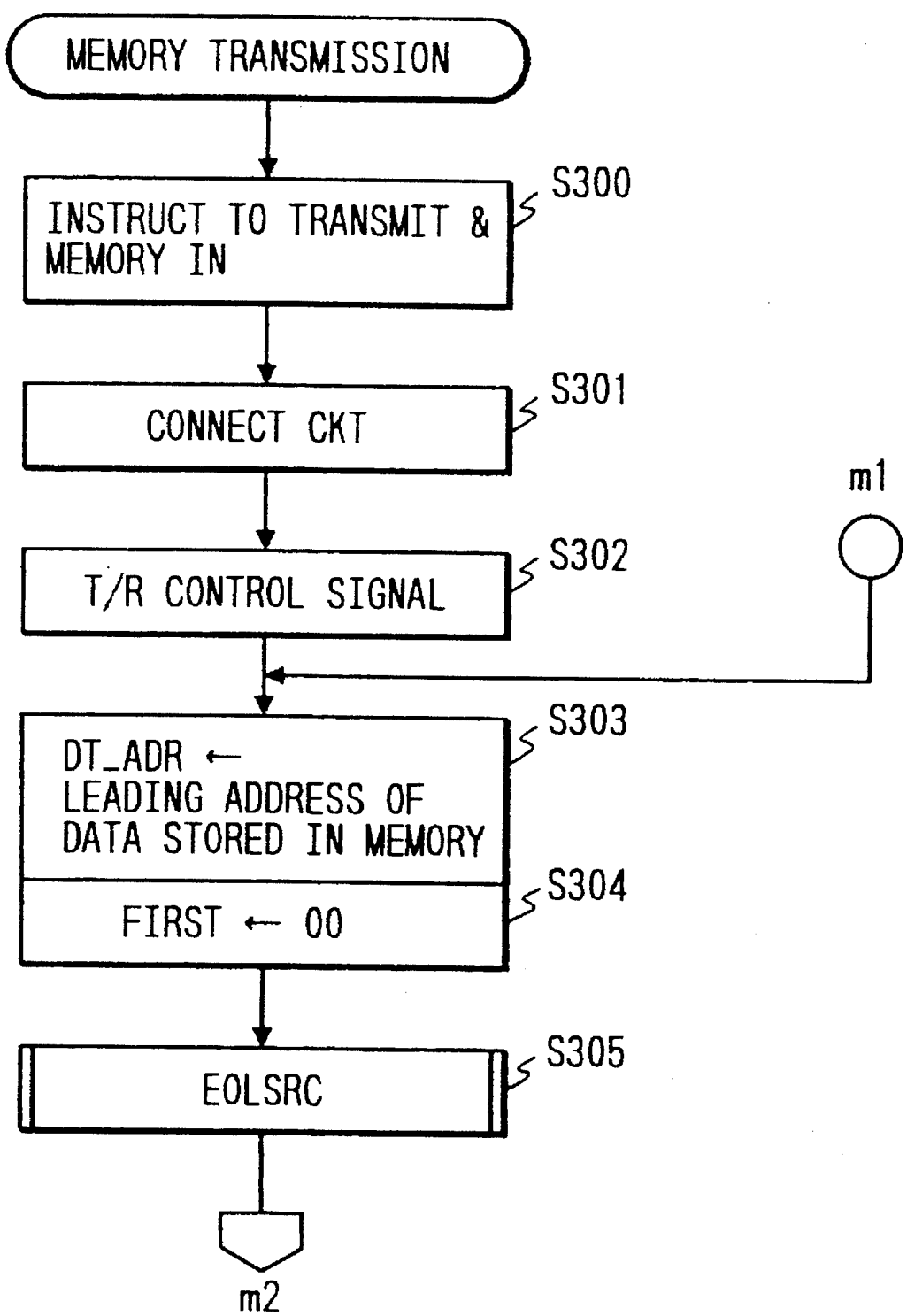
FIGS. 60 to 63 are flowcharts for illustrating a memory transmission operation.

As shown in FIG. 60, when the facsimile is instructed by an operator to perform a transmission, data is read from a draft by a scanner. Then the data is coded and the obtained codes are stored in a memory (e.g., a dynamic random access memory (DRAM)). Upon completion of storing the codes in the memory, a call is sent to the called part in step S300. Thereafter, when a circuit is connected between the calling and called parties in step S301, a transmission/reception of a control signal is effected and a communication mode is determined in step S302. Subsequently, a leading address of the data or code to be transmitted (hereunder sometimes referred to as transmission data), which is stored in the memory, is set in step S303. Simultaneously, data 00 is set in the flag "first" indicating whether or not a currently processed bit is a leading bit of 1 line. Next, EOL is detected in step S305 by performing EOLSRC previously described by referring to FIGS. 41 to 43.

Figure 61:
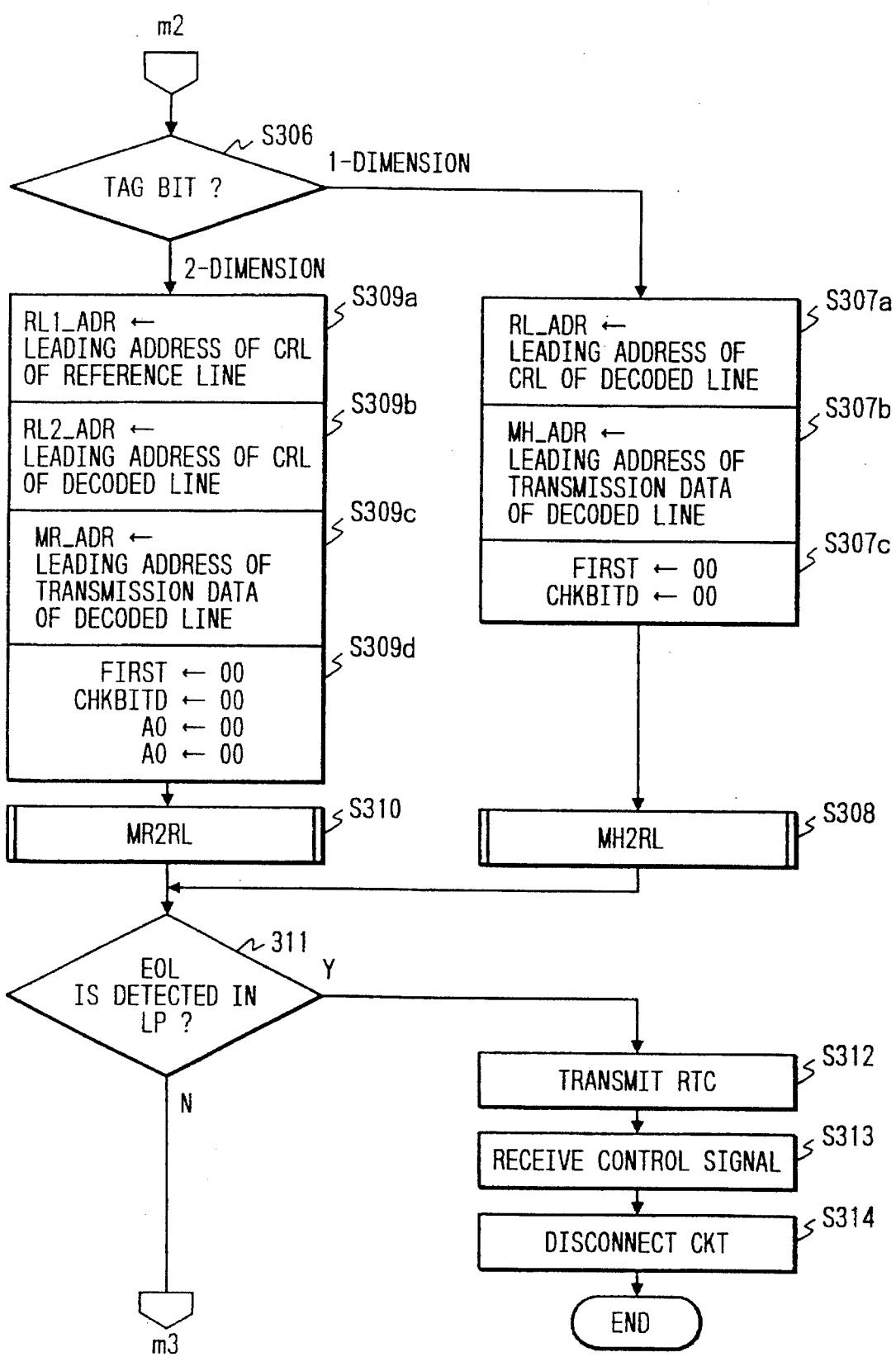

Next, as shown in FIG. 61, if a tag bit subsequent to EOL is 1, it is determined in step S306 that the transmission data is one-dimensional data (namely, MH data). If the transmission data is MH data, a leading address of a cumulative run-length code RL of a line to be decoded (hereunder sometimes referred to as a decoded line) and stored in the RAM is set in step S307a. Further, a leading address of transmission data of a decoded line is set in step S307b. Data 00 is set In each of the flag "first" and the working area CHKBITD in step S307c.

Then, the MH code is converted in step S308 into a cumulative run-length code RL by performing the conversion MH2RL described by referring to FIGS. 44 to 46. If it is found in step S306 that the tag bit is 0, the transmission data is two-dimensional data (namely, MR data). Thus a leading address of a cumulative run-length code of a reference line is set in step S309a. Further, a leading address of a cumulative run-length code of a decoded line is set in step S309b. Moreover, a leading address of transmission data of a decoded line is set in step S309c. Furthermore, data 00 is set in each of the flag "first", the area CHKBITD and the parameters $a_o$ and $b_o$ in step S309d. Next, the conversion MR2RL described by referring to FIGS. 49 to 54 is effected in step S310 to obtain a code RL. Each of the conversions MH2RL and MR2HL is performed on each line. Upon completion of a decoding processing of 1 line, it is determined instep S311 whether another EOL is detected in a leading portion of decoded data. If detected, the detected signal is a terminating signal. Thus RTC is issued in step S312. Thereafter, a control signal is transmitted in step S313 and the circuit is disconnected in step S314.

Figure 62:
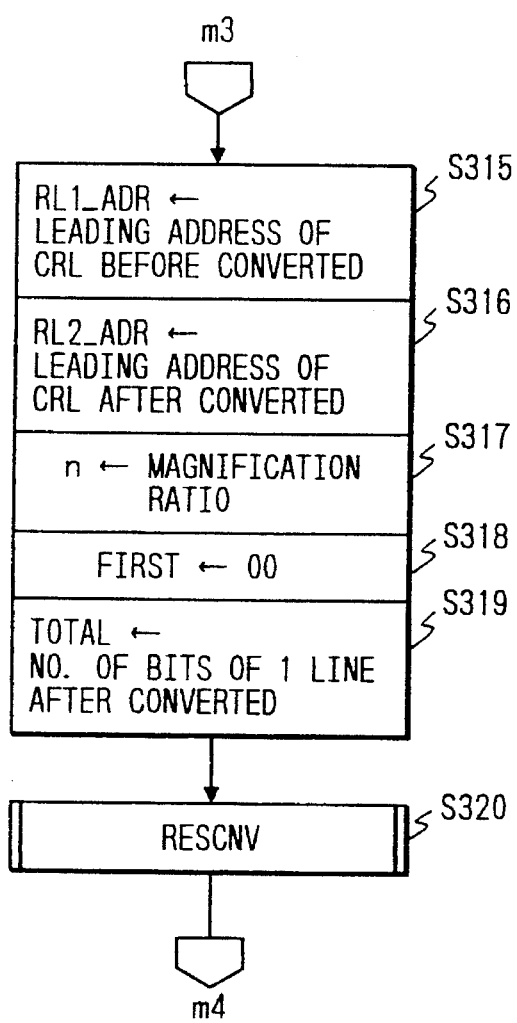
Figure 63:
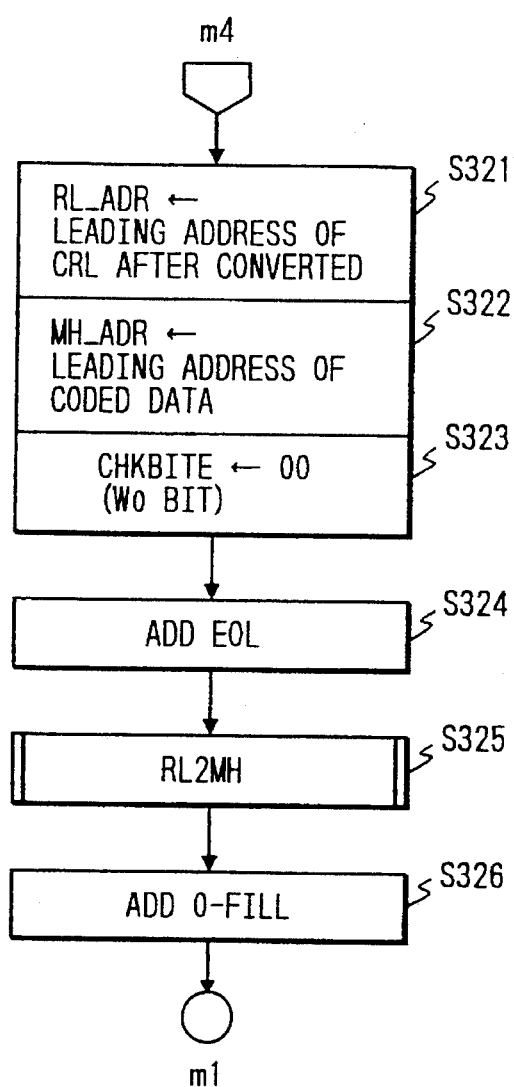

If EOL is not detected in the leading portion in step S311, the facsimile starts performing a RESCNV processing, which is a linear-density conversion processing and will be described later in detail, as illustrated in FIG. 62. As a preparation for performing this processing, a leading address of a cumulative run-length code before converted is first set in step S315. Further, a leading address of a cumulative run-length code after converted is set in step S316. Moreover, a conversion ratio n (e.g., 1728 bits/2048 bits) is set in step S317. Furthermore, data 00 is set in the flag "first" in step S318. Additionally, the number of bits of 1 converted line is set in step S319. Thereafter, the RESCNV conversion is effected in step S320.

Subsequently, the thus converted transmission data is further converted into MH code and moreover a leading address of a cumulative run-length code, on which the linear-density conversion has been performed, is set in step S322. Further, data 00 is set in the area CHKBITE in step S323. Then, EOL is added in step S324. Afterwards, the conversion RL2MH described by referring to FIGS. 21 to 28 is effected in step S325, and further 0-Fill is added to the result in step S326. Finally, the resultant data is transmitted.

Next, the conversion RESCNV will be described hereinbelow. In case of the conversion RESCNV, a cumulative run-length code RL is enlarged or reduced in size (e.g., a reduction of the size of a draft from A3 to A4 or from B4 to A4). When an terminating code corresponding to input code RL is read, or when the number of bits of an output code RL reaches the number of bits of 1 line, this conversion is finished. Incidentally, interruptions are sampled each time a cumulative run-length code RL corresponding to a transition point is output.

Figure 64:
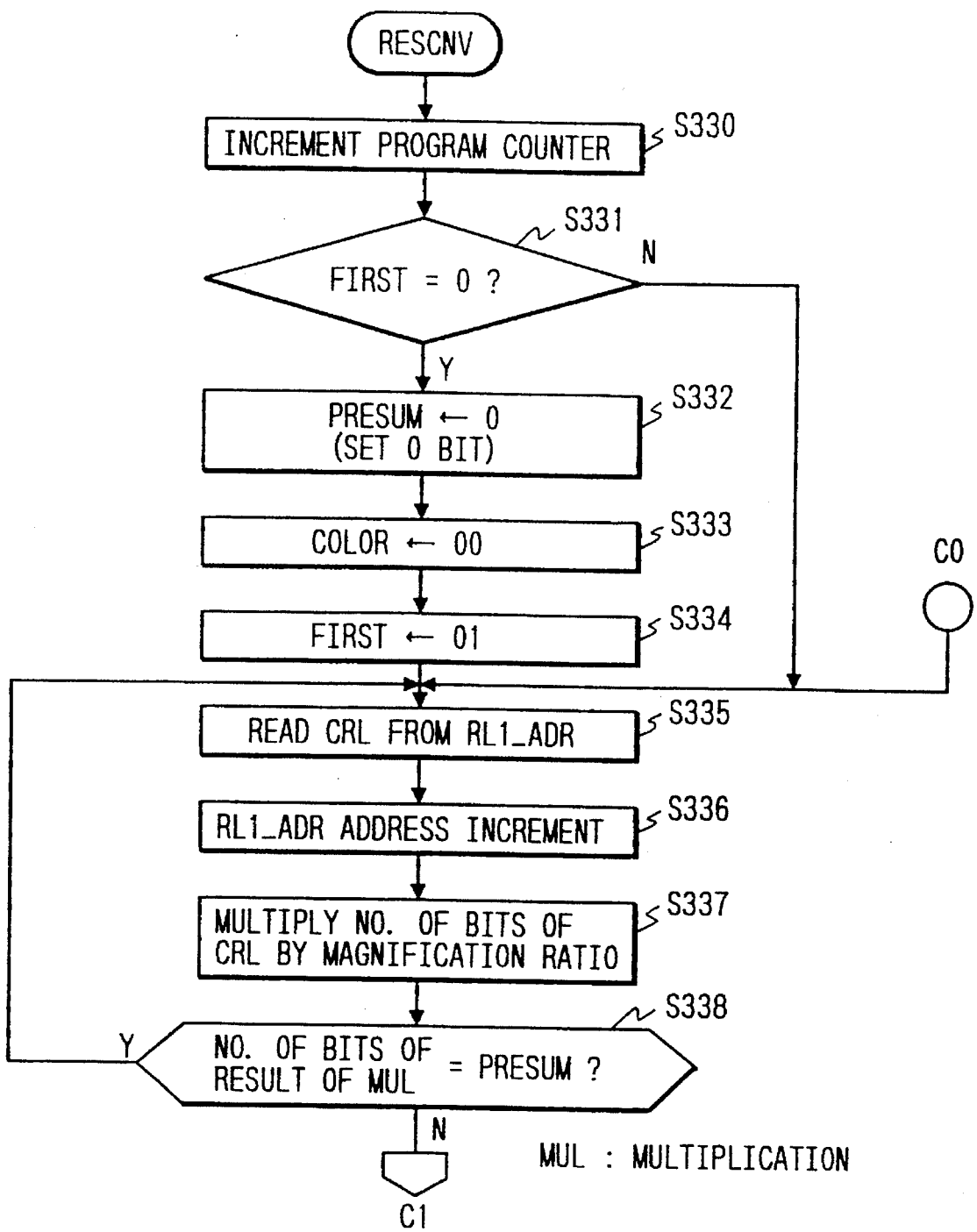
FIGS. 64 and 65 are flowcharts for illustrating a conversion of linear density of a cumulative run-length code.

As shown in FIG. 64, when the facsimile is instructed by an operator to perform a linear-density conversion processing, the program counter is incremented in step S330. Then, it is examined in step S331 whether or not the flag "first" indicates 0. If the flag "first" indicates the presence of a leading bit, data 0 is set in the area PRESUM for storing the latest number of bits, on which a multiplication processing is performed, in step S332. Subsequently, data 0 (corresponding to white) is set at a color bit, namely, LSB of FIG. 15(a) in step S333. Further, the flag "first" is set in step S334 as 01. Then, a cumulative run-length code is read in step S335 from the address "RL1 ADR" set in step S315 of FIG. 62. Next, the address "RL1 ADR" is incremented in step S336. Thereafter, in step S337, a multiplication processing is effected, namely, the number of bits of the read code RL is multiplied by the conversion ratio n set in step S317 of FIG. 62. Further, a decimal portion of a result of the multiplication is discarded. Then, it is checked in step S338 whether or not the result of the multiplication performed on the last code RL is the same as that of the multiplication performed on the current code RL. If the same, the program returns to step S335.

Figure 65:
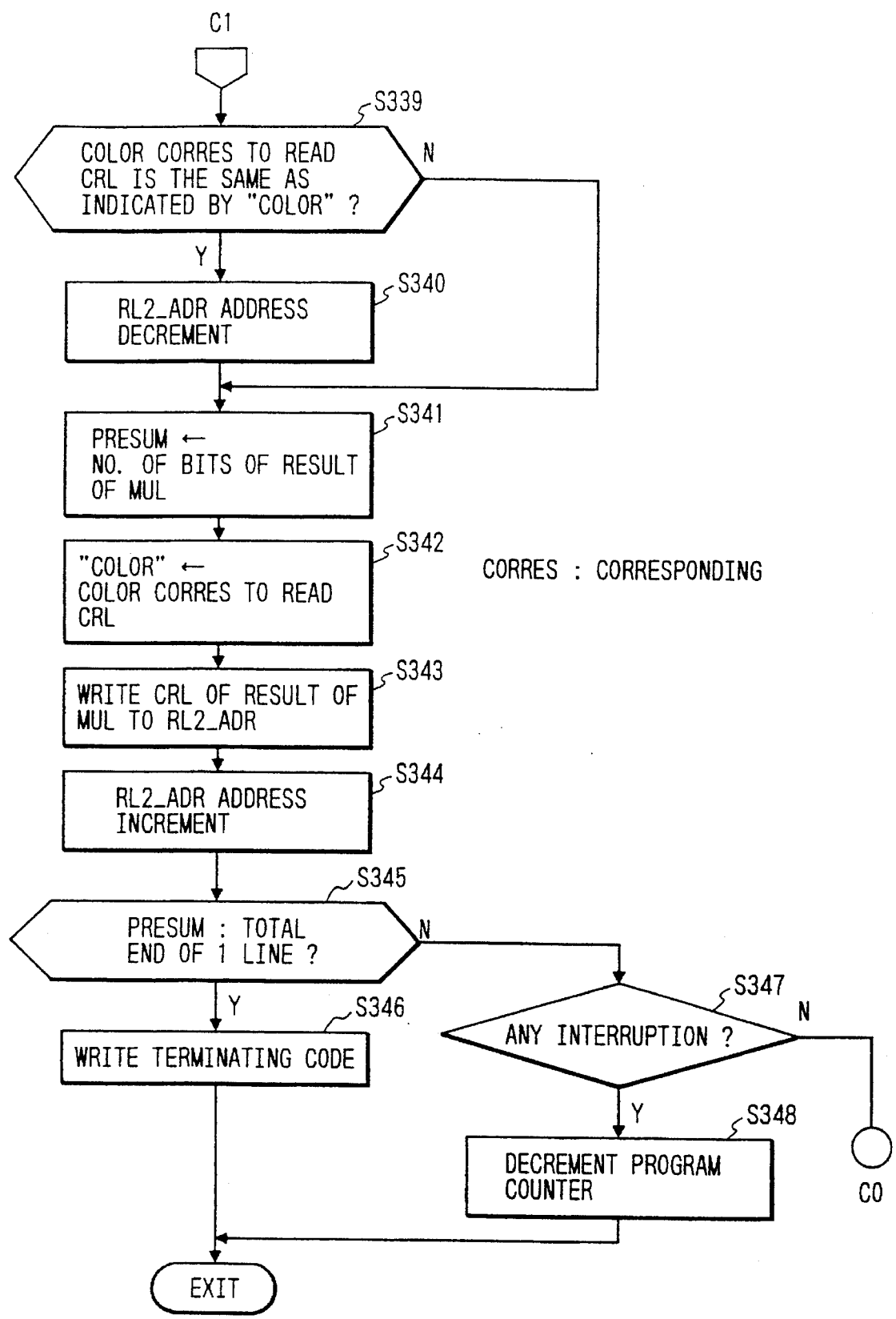

Subsequently, as shown in FIG. 65, it is checked in step S339 whether or not the color corresponding to the read code RL is the same as that indicated by the data COLOR set in step S333. For instance, when decimal parts are discarded in step S338, white RL 10 and black RL 11 come to represent the same color. Further, when the next white RL 20 is read, white RL 10 and white RL 20 represent the same color. In such a case, black RL 11 is omitted. Moreover, a result of a multiplication between white RL 20 and the ratio n is made to be written to an address, to which a result of a multiplication between white RL 10 and the ratio n is expected to be written. Thus the address "RL2 ADR" is decremented in step S340. Next, the result of the multiplication is set in the area PRESUM in step S341. Then, the color corresponding to the code RL read in step S335 is set in the data COLOR in step S342. Further, a cumulative run-length code obtained as the result of the multiplication is written in step S343 to the address "RL2 ADR" set in step S316 of FIG. 62. Subsequently, the address "RL2 ADR" is incremented in step S344. Next, in step S335, the number of bits currently set in the area PRESUM is compared with that of bits of 1 line, which is set in step S319 of FIG. 62. If matched, a terminating code is written in step S346. If not matched, it is checked in step S347 whether or not an interruption is caused. If caused, the program counter is decremented in step S348. If not caused, the program returns to step S335 of FIG. 64.

Figure 66:
FIG. 66 is a diagram for illustrating an example of a cumulative run-length table code used for converting an input draft, the size of which is B4, into a reduced image, the size of which is A4.

FIG. 66 is a diagram for illustrating an example of a cumulative run-length table code used for converting an input draft, the size of which is B4, into a reduced image, the size of which is A4.

While a preferred embodiment of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A computer implemented method of encoding and decoding image data used in facsimile for converting raw data representing an image to Modified Huffman code data representing the image, comprising the steps of:

(1) performing by the computer a first program sequence from a memory for converting the raw data to cumulative run-length coded data including a plurality of run data representing runs of pixels in the image, and for including in the run data for a run:
      (a) first data representing whether all pixels in the run are white or black; and
      (b) second data representing where the run lies in the image; and
   (2) performing by the computer a second program sequence from the memory for converting the cumulative run-length code data into Modified Huffman code data representing the image.

2. In a programmed computing apparatus for encoding and decoding first signals from a facsimile scanner and including raw image data representing an image to third signals containing Modified Read code data representing the image including: (1) storage means comprising a ROM for storing a first program sequence including a first sequence of operational steps representing a first procedure to be performed with the aid of a computer for converting the first signals containing said raw image data to second signals containing cumulative run-length coded data including a plurality of run data representing runs of pixels in the image, the run data including (a) first data representing whether all pixels in the run are white or black, and (b) second data representing where the run lies in the image, said storage means further storing a second program sequence including a second sequence of operational steps representing a second procedure to be performed with the aid of the computer for converting the second signals containing said cumulative run-length coded data into the third signals containing said Modified Read code data representing the image; and (2) a central processing unit (CPU) for executing the first procedure and the second procedure in accordance with said first program sequence and said second program sequence, a computer implemented method of encoding and decoding facsimile image data by converting said first signals from a facsimile scanner, said first signals containing said raw image data representing the image to said third signals containing said Modified Read code data representing the image, comprising the steps of:
(1) performing by the CPU said first program sequence from said storage means for converting said first signals containing the raw data to said second signals containing said cumulative run-length coded data including said plurality of run data representing runs of pixels in the image, and for including in the run data for a run:
 (a) said first data representing whether all pixels in the run are white or black; and
 (b) said second data representing where the run lies in the image;
(2) performing by the CPU said second program sequence from said storage means for converting said second signals containing the cumulative run-length coded data into said third signals containing said Modified Read code data; and
(3) providing said third signals containing said Modified Read code data representing the image.

3. In a programmed computing apparatus for encoding and decoding facsimile image data by converting Modified Huffman code data representing an image to raw image data representing the image, including: (1) storage means comprising a ROM for storing a first program sequence including a first sequence of operational steps representing a first procedure to be performed with the aid of a computer for converting the Modified Huffman code data to cumulative run-length coded data including a plurality of run data representing runs of pixels in the image, the run data including (a) first data representing whether all pixels in the run are white or black, and (b) second data representing where the run lies in the image, said storage means further storing a second program sequence including a second sequence of operational steps representing a second procedure to be performed with the aid of the computer for converting the cumulative run-length coded data into the raw image data representing the image; and (2) a central processing unit (CPU) for executing the first procedure and the second procedure in accordance with said first program sequence and said second program sequence, a computer implemented method of encoding and decoding facsimile image data by converting the Modified Huffman code data representing an image to the raw image data representing the image, comprising the steps of:
(1) performing by said CPU the first program sequence from said storage means for converting the Modified Huffman code data to the cumulative run-length coded data including the run data representing runs of consecutive pixels having a constant value in the image, the run data including
 (a) said first data representing whether all pixels in the run are white or black, and
 (b) said second data representing where the run lies in the image, and
(2) performing by said CPU the second program sequence from said storage means for converting the cumulative run-length coded data into the raw image data.

4. In a programmed computing apparatus for encoding and decoding facsimile image data by converting first signals containing Modified Read code data representing an image to second signals containing raw image data representing the image, including: (1) storage means comprising a ROM for storing a first program sequence including a first sequence of operational steps representing a first procedure to be performed with the aid of a computer for converting said Modified Read code data included in the first signals to cumulative run-length coded data including a plurality of run data representing runs of pixels in the image, the run data including (a) first data representing whether all pixels in the run are white or black, and (b) second data representing where the run lies in the image, said storage means further storing a second program sequence including a second sequence of operational steps representing a second procedure to be performed with the aid of the computer for converting said cumulative run-length coded data into said raw image data representing the image in the third signals; and (2) a central processing unit (CPU) for executing the first procedure and the second procedure in accordance with said first program sequence and said second program sequence, a computer implemented method of encoding and decoding facsimile image data by converting said first signals containing said Modified Read code data representing an image to said second signals containing said raw image data representing the image, comprising the steps of:
(1) performing by said CPU the first program sequence from said storage means for converting said first signals containing said Modified Read code data to said cumulative run-length coded data including the run data representing runs of consecutive pixels having a constant value in the image, the run data including
 (a) said first data representing whether all pixels in the run are white or black, and
 (b) said second data representing where the run lies in the image;
(2) performing by said CPU the second program sequence from said storage means for converting said cumulative run length coded data into said raw image data; and
(3) providing said third signals containing said raw image data representing the image.

5. A computer implemented method of encoding and decoding facsimile image data by converting first signals containing Modified Huffman code data representing an image to third signals containing Modified Read code data representing the image, comprising the steps of:

(1) performing by the computer a first program sequence for converting the first signals containing said Modified Huffman code data to second signals containing cumulative run-length coded data including a plurality of run data representing runs of pixels in the image, and for including in the run data for a run:
  (a) first data representing whether all pixels in the run are white or black; and
  (b) second data representing where the run lies in the image;
(2) performing by the computer a second program sequence for converting the second signals containing said cumulative run-length coded data into said third signals containing said Modified Read code data; and
(3) providing said third signals containing said Modified Read code data representing the image.

6. A computer implemented method of encoding and decoding facsimile image data by converting first signals containing Modified Read code data representing an image to second signals containing Modified Huffman code data representing the image, comprising the steps of:
(1) performing by the computer a first program sequence for converting the Modified Read code data from said first signals to cumulative run-length coded data including a plurality of run data representing runs of pixels in the image, and for including in the run data for a run:
  (a) first data representing whether all pixels in the run are white or black; and
  (b) second data representing where the run lies in the image;
(2) performing by the computer a second program sequence for converting the cumulative run-length intermediate code data into Modified Huffman code data; and
(3) providing said second signals containing said Modified Huffman code data representing the image.

* * * * *

UNITED STATES PATENT AND TRADEMARK OFFICE
CERTIFICATE OF CORRECTION

PATENT NO. : 5,587,798

DATED : December 24, 1996

INVENTOR(S) : Kazuo KURITA et al.

It is certified that error appears in the above-identified patent and that said Letters Patent is hereby corrected as shown below:

On the title page, item [30] should read as follows:

--[30]  Foreign Application Priority Data

Aug 1, 1991  [JP] Japan. . . .   . . . . 3-192919--

Signed and Sealed this

Sixth Day of May, 1997

Attest:

BRUCE LEHMAN

*Attesting Officer*    *Commissioner of Patents and Trademarks*